(12) United States Patent
Ward

(10) Patent No.: US 11,364,558 B2
(45) Date of Patent: Jun. 21, 2022

(54) HOLE SAW ARBOR HAVING AN ADJUSTABLE CONNECTION MECHANISM

(71) Applicant: MILWAUKEE ELECTRIC TOOL CORPORATION, Brookfield, WI (US)

(72) Inventor: Bryan C. Ward, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 16/760,926

(22) PCT Filed: Nov. 2, 2018

(86) PCT No.: PCT/US2018/059021
§ 371 (c)(1),
(2) Date: May 1, 2020

(87) PCT Pub. No.: WO2019/090123
PCT Pub. Date: May 9, 2019

(65) Prior Publication Data
US 2021/0197296 A1    Jul. 1, 2021

Related U.S. Application Data

(60) Provisional application No. 62/719,244, filed on Aug. 17, 2018, provisional application No. 62/581,105, filed on Nov. 3, 2017.

(51) Int. Cl.
*B23B 51/04* (2006.01)
*B23B 51/12* (2006.01)
*B23Q 3/12* (2006.01)

(52) U.S. Cl.
CPC .......... *B23B 51/0473* (2013.01); *B23B 51/12* (2013.01); *B23Q 3/12* (2013.01)

(58) Field of Classification Search
CPC . B23B 51/0473; B23B 51/12; B23B 51/0406; B23B 51/0426; B23B 31/11; B23Q 3/12; B28D 1/041
See application file for complete search history.

(56) References Cited

U.S. PATENT DOCUMENTS

| 9,751,135 | B1 | 9/2017 | Terris |
| 10,478,904 | B2 * | 11/2019 | Broekman ............... B27B 5/32 |
| 2004/0161313 | A1 * | 8/2004 | Nordlin ............... B23B 31/1071 408/204 |
| 2007/0160434 | A1 | 7/2007 | Gillissen |
| 2009/0279972 | A1 * | 11/2009 | Novak ............... B23B 51/0473 408/239 R |

(Continued)

OTHER PUBLICATIONS

International Search Report and Written Opinion for Application No. PCT/US2018/059021 dated Feb. 15, 2019 (12 pages).

*Primary Examiner* — Chwen-Wei Su
(74) *Attorney, Agent, or Firm* — Michael Best & Friedrich LLP

(57) ABSTRACT

An arbor for a hole saw includes an arbor shaft configured to be coupled to a power tool. The arbor shaft defines a longitudinal axis. The arbor also includes an arbor stem supported by the arbor shaft. The arbor stem includes at least one arm having a threaded portion configured to engage the hole saw. The arbor further includes an actuator supported by the arbor shaft. The actuator is operable to move the threaded portion of the at least one arm relative to the longitudinal axis.

23 Claims, 34 Drawing Sheets

(56) References Cited

U.S. PATENT DOCUMENTS

| | | |
|---|---|---|
| 2014/0017023 A1 | 1/2014 | Grollmund et al. |
| 2014/0126973 A1 | 5/2014 | Pamatmat |
| 2014/0248101 A1 | 9/2014 | Kazda et al. |
| 2016/0279717 A1* | 9/2016 | Batho ................. B23B 51/0426 |

* cited by examiner

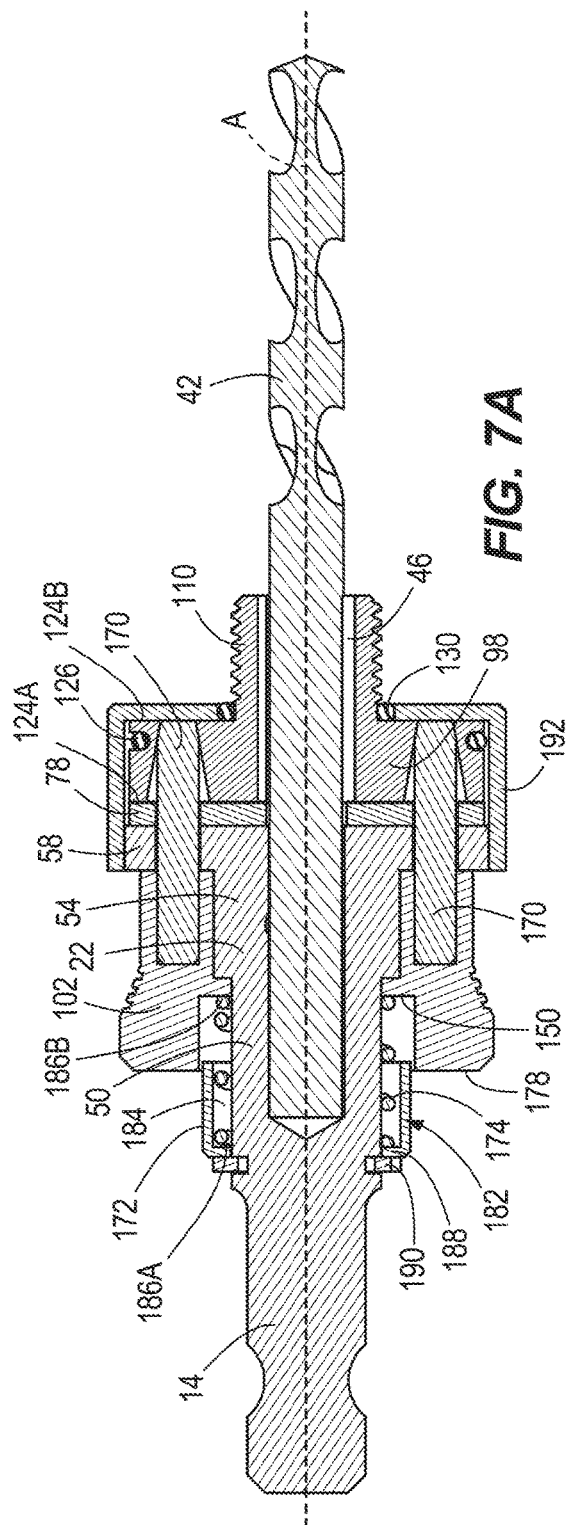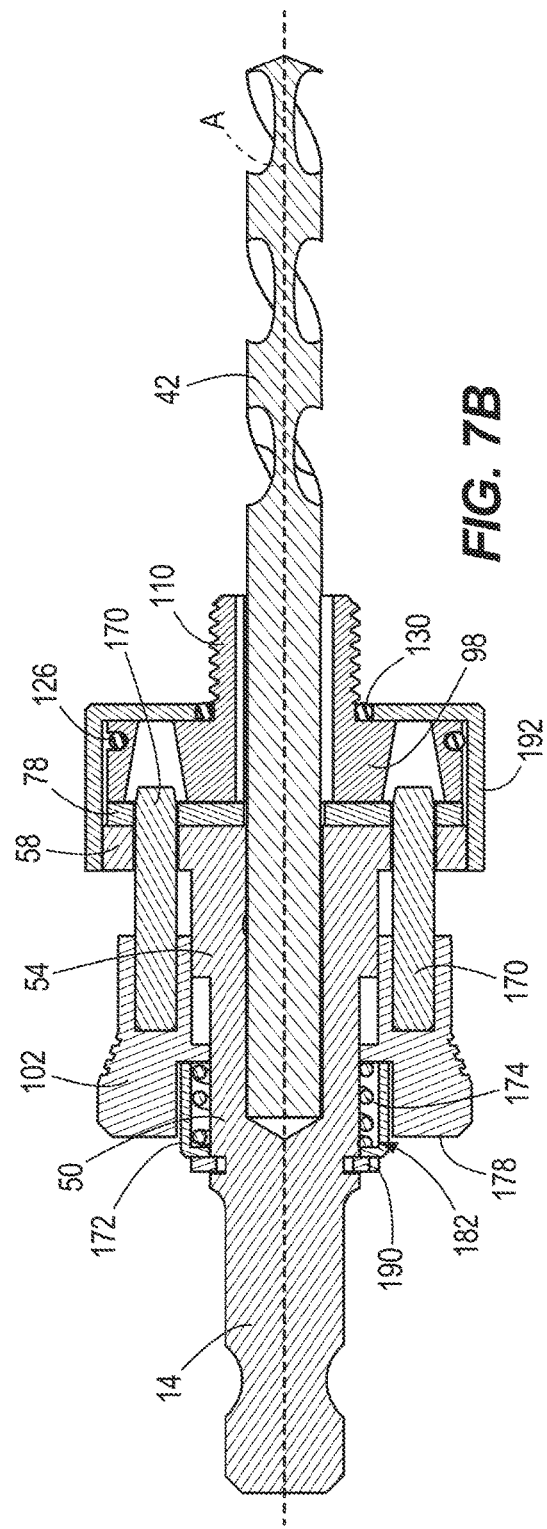

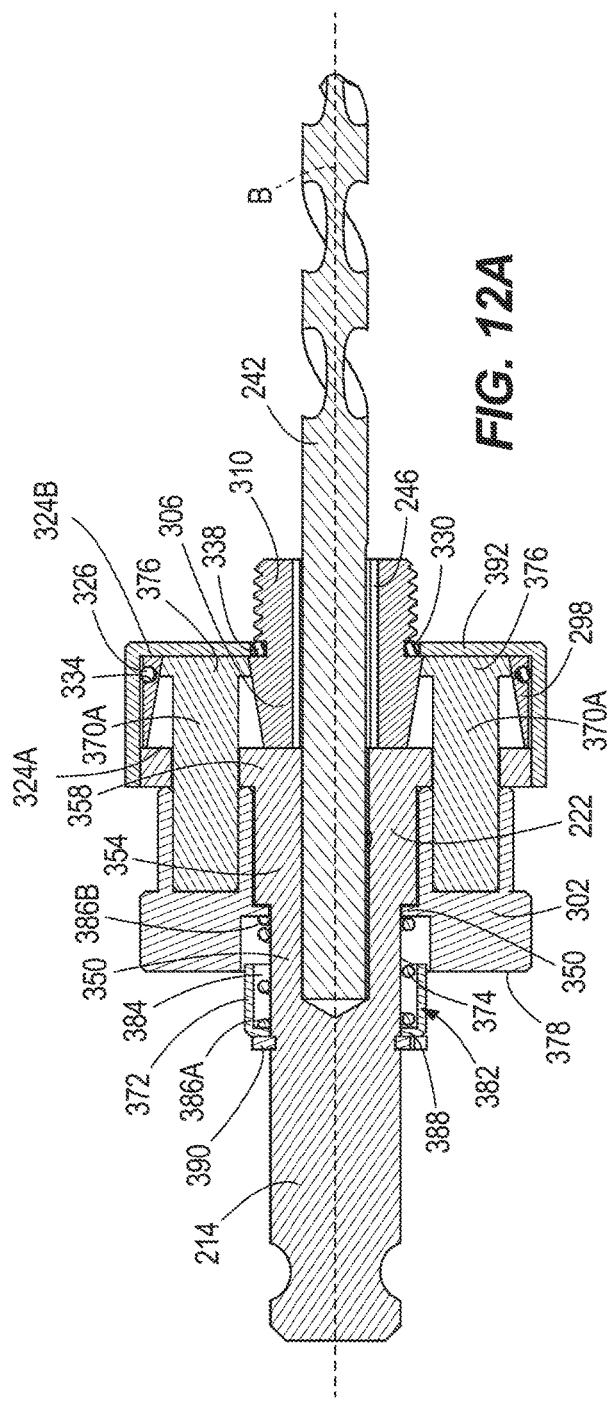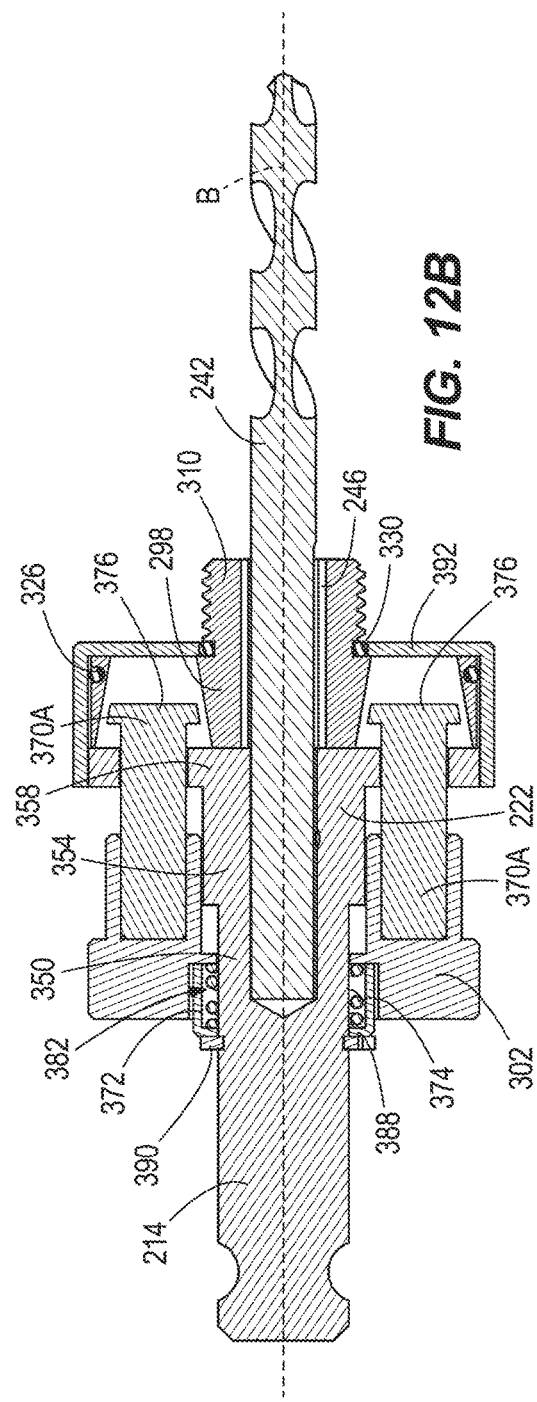

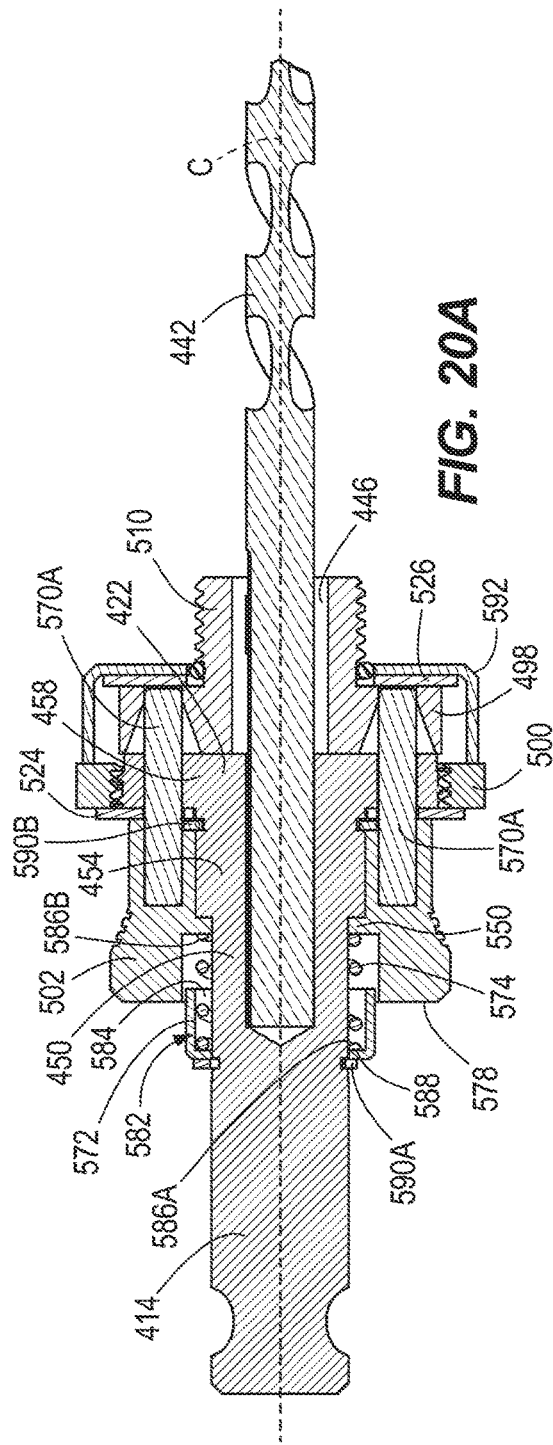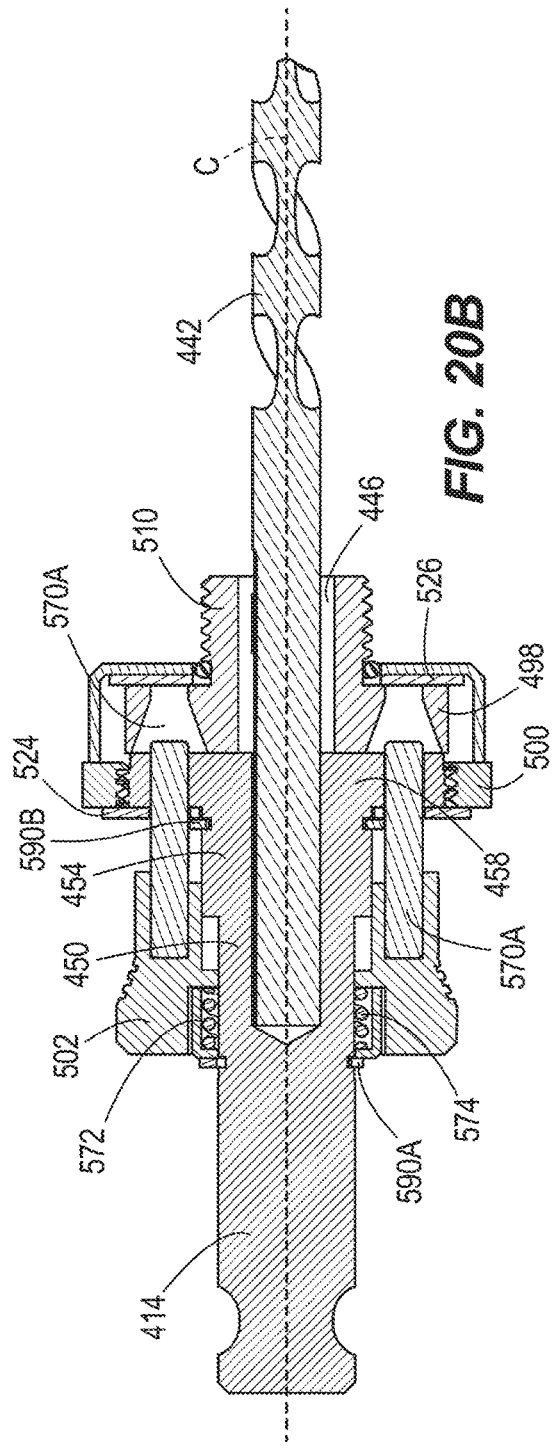

HOLE SAW ARBOR HAVING AN ADJUSTABLE CONNECTION MECHANISM

CROSS-REFERENCE TO RELATED APPLICATIONS

This application is a national phase filing under 35 U.S.C. 371 of International Application No. PCT/US2018/059021 filed Nov. 2, 2018, which claims priority to U.S. Provisional Patent Application No. 62/719,244, filed on Aug. 17, 2018, and to U.S. Provisional Patent Application No. 62/581,105, filed on Nov. 3, 2017, the entire contents of which are incorporated by reference herein.

BACKGROUND OF THE INVENTION

The present invention relates to holes saw arbors and, more particularly to, an adjustable connection mechanism for removably coupling a hole saw to an arbor.

Typically, a hole saw is coupled to a rotating power tool using an arbor. An aperture defined by the hole saw is configured to receive a stem of the arbor. Furthermore, the aperture corresponds to threads on the stem of the arbor such that the hole saw is rotatably coupled to threads of the stem of the arbor.

SUMMARY OF THE INVENTION

In one embodiment, the invention provides an arbor for a hole saw. The arbor includes an arbor shaft configured to be coupled to a power tool. The arbor shaft defines a longitudinal axis. The arbor also includes an arbor stem supported by the arbor shaft. The arbor stem includes at least one arm having a threaded portion configured to engage the hole saw. The arbor further includes an actuator supported by the arbor shaft. The actuator is operable to move the threaded portion of the at least one arm relative to the longitudinal axis.

In another embodiment, the invention provides a method of operating an arbor for a hole saw. The arbor includes an arbor shaft configured to be coupled to a power tool. The arbor shaft defines a longitudinal axis. The arbor also includes an arbor stem supported by the arbor shaft. The arbor stem includes at least one arm having a threaded portion configured to engage the hole saw. The arbor further includes an actuator supported by the arbor shaft. The method includes threading the hole saw onto the threaded portion of the at least one arm, actuating the actuator, and moving the threaded portion of the at least one arm relative to the longitudinal axis in response to actuating the actuator to release the hole saw from the threaded portion of the at least one arm.

In yet another embodiment, the invention provides an arbor for a hole saw. The arbor includes an arbor shaft configured to be coupled to a power tool. The arbor shaft defines a longitudinal axis. The arbor also includes an arbor stem supported by the arbor shaft. The arbor stem includes a plurality of arms. Each arm has a threaded portion configured to engage the hole saw, a base portion extending from the threaded portion, and a hole defined by the base portion. The arbor further includes a collar supported by and slidable along the arbor shaft, and a plurality of pins extending from the collar toward the base portions of the plurality of arms. A portion of each pin is receivable within the hole of a respective arm. The arbor also includes a biasing member coupled to the plurality of arms. The collar is movable relative to the arbor shaft between a first position, in which the plurality of pins is received in the holes of the plurality of arms to maintain the threaded portions of the plurality of arms away from the longitudinal axis to engage the hole saw, and a second position, in which the plurality of pins are moved at least partially out of the holes of the plurality of arms such that the biasing member moves the threaded portions of the plurality of arms toward the longitudinal axis to release the hole saw.

Other aspects of the invention will become apparent by consideration of the detailed description and accompanying drawings.

BRIEF DESCRIPTION OF THE DRAWINGS

FIG. 7A is a cross-sectional view of the arbor taken along lines 7A-7A in FIG. 1, illustrating the arbor in a first position.

FIG. 7B is another cross-sectional view of the arbor of FIG. 7A, illustrating the arbor in a second position.

FIG. 12A is a cross-sectional view of the arbor taken along lines 12A-12A in FIG. 8, illustrating the arbor in a first position.

FIG. 12B is another cross-sectional view of the arbor of FIG. 12A, illustrating the arbor in a second position.

FIG. 20A is a cross-sectional view of the arbor taken along lines 20A-20A in FIG. 13, illustrating the arbor in a first position.

FIG. 20B is another cross-sectional view of the arbor of FIG. 20A, illustrating the arbor in a second position.

Figure 1:
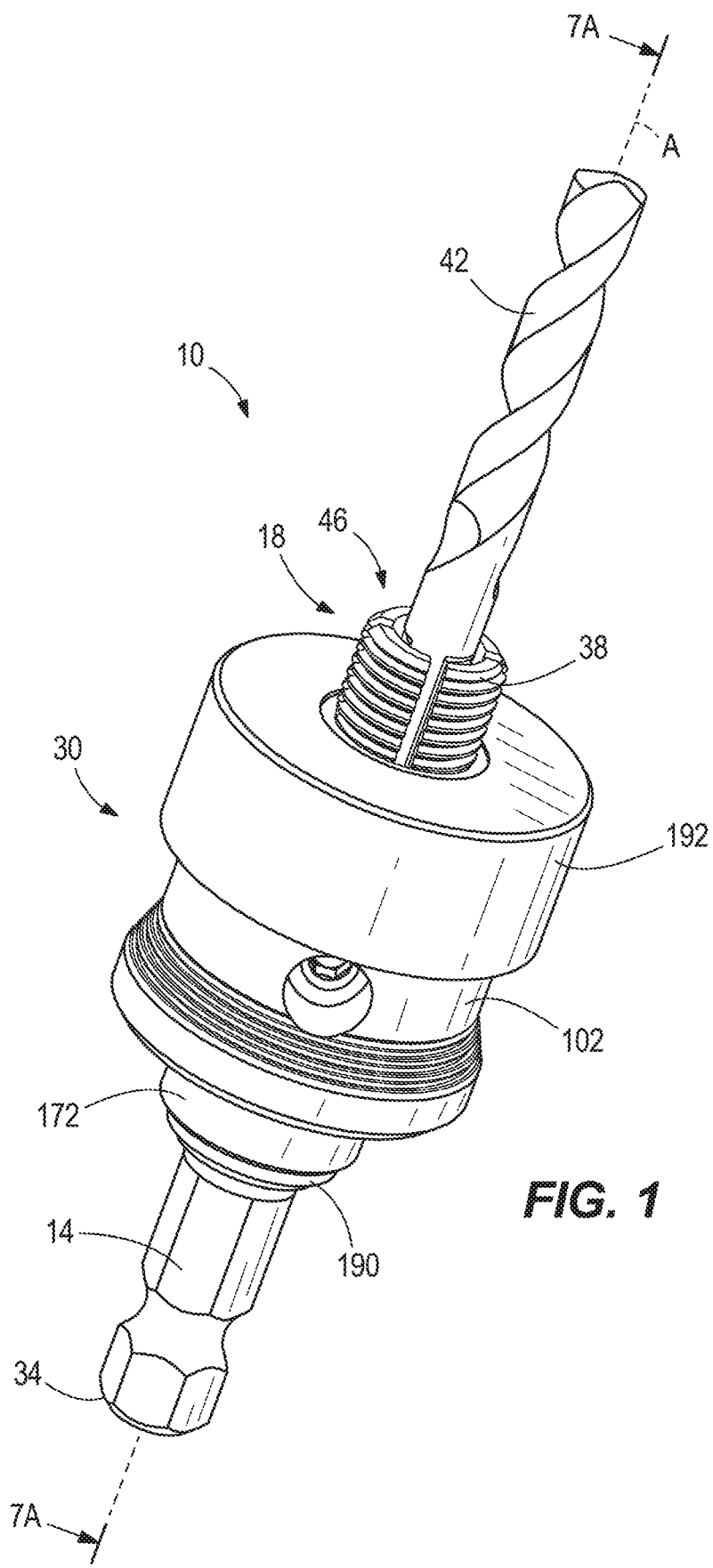
FIG. 1 is a perspective view of an arbor embodying the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

FIGS. 1-7B illustrate an arbor 10 for a hole saw embodying the invention. The arbor 10 includes an arbor shaft 14, a threaded arbor stem 18, and a body 22 coupled between the arbor shaft 14 and the arbor stem 18. The arbor shaft 14 is couplable to a power tool, such as a drill. The threaded arbor stem 18 is couplable to the hole saw. Specifically, the threaded arbor stem 18 includes threads that correspond to an aperture defined by the hole saw for coupling the hole saw to the arbor 10. In the illustrated embodiment, the threaded arbor stem 18 has a ½"-20 thread. In other embodiments, the arbor stem 18 may have a thread of a different size. The arbor 10 further includes an adjustment mechanism 30 to facilitate the release of the hole saw from the arbor 10.

The arbor 10 includes a first end 34 and a second end 38 opposite the first end 34 (FIG. 1). The first end 34 has the arbor shaft 14. The second end 38 has the threaded arbor stem 18. A longitudinal axis A, defined by the arbor 10, extends between the first end 34 and the second end 38.

The arbor 10 further includes a pilot bit 42 coupled to the arbor 10. The pilot bit 42 is positioned partially within and extends axially from the arbor 10 (e.g., the body 22; FIGS. 7A-7B). Furthermore, the arbor stem 18 defines an opening 46 having a circumference. The pilot bit 42 extends axially through the opening 46. In some embodiments, the pilot bit 42 may be omitted.

Figure 2:
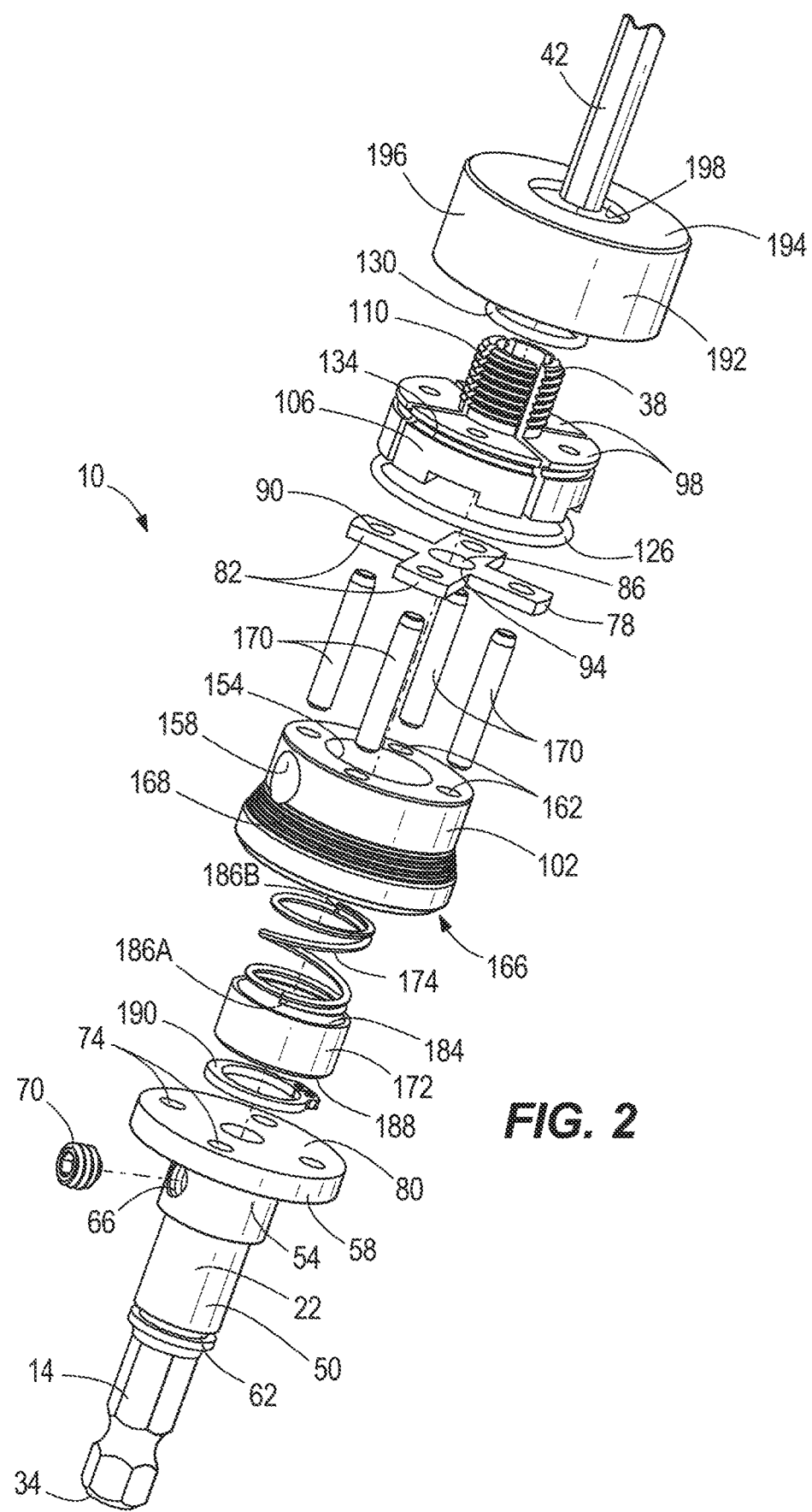
FIG. 2 is an exploded view of the arbor of FIG. 1, the arbor including a collar and a plurality of arms.

With reference to FIG. 2, the body 22 of the arbor 10 has a generally cylindrical structure and includes a plurality of sections 50, 54, 58 extending axially between the shaft 14 and the stem 18 along the longitudinal axis A. The illustrated body 22 includes a first section 50 adjacent the arbor shaft 14, a second section 54, and a third section 58 between the second section 54 and the arbor stem 18. The first section 50 defines an annular groove 62. The second section 54 defines a bore 66 configured to receive a set screw 70 for removably coupling the pilot bit 42 to the arbor 10. In other embodiments, the pilot bit 42 may be permanently coupled to the arbor 10. The third section 58 defines a plurality of holes 74. In the illustrated embodiment, the third section 58 includes four holes 74 spaced circumferentially about the longitudinal axis A.

Figure 5:
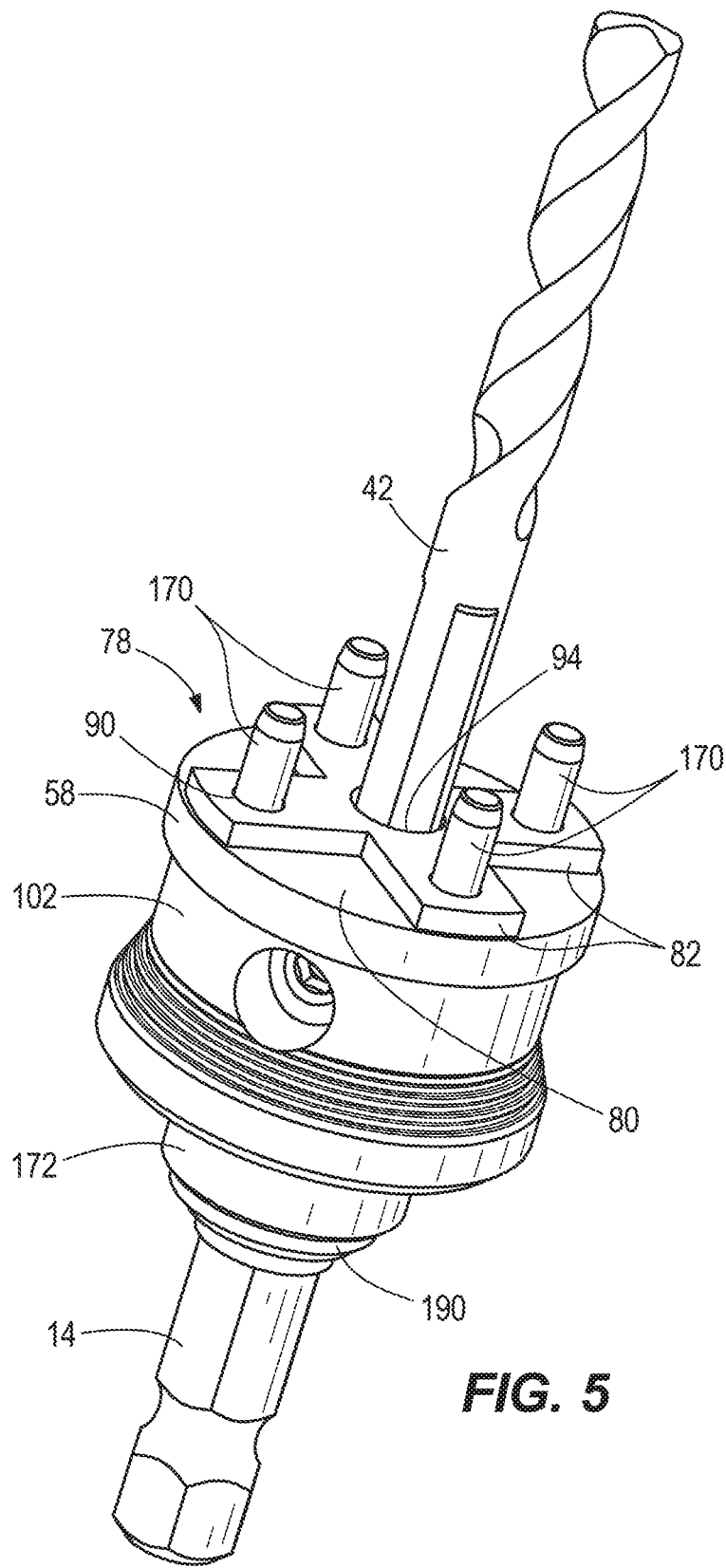
FIG. 5 is a perspective view of the arbor of FIG. 1 with portions of the arbor removed including the plurality of arms of FIG. 2.

With reference to FIGS. 2 and 5, the arbor 10 includes a guide 78. The illustrated guide 78 is positioned on a top 80 of the third section 58. The guide 78 is formed by a plurality of segments 82 extending from a center portion 86 positioned on the longitudinal axis A. The illustrated guide 78 includes four segments 82. Each segment 82 defines a hole 90 corresponding to each hole 74 of the third section 58 of the body 22. Furthermore, the guide 78 includes an aperture 94 defined by the center portion 86. The pilot bit 42 is configured to extend through the aperture 94. The guide 78 is coupled to the top 80 of the third section 58. In other embodiments, the guide 78 is integral with the body 22.

Figure 3:
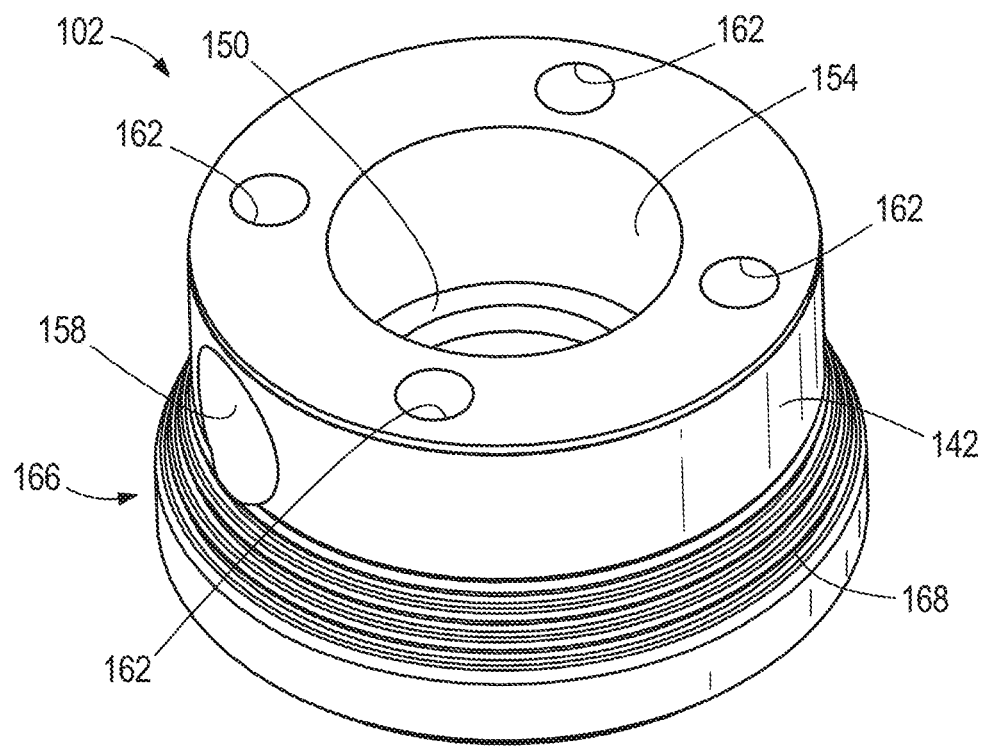
FIG. 3 is a perspective view of the collar of FIG. 2.
Figure 4:
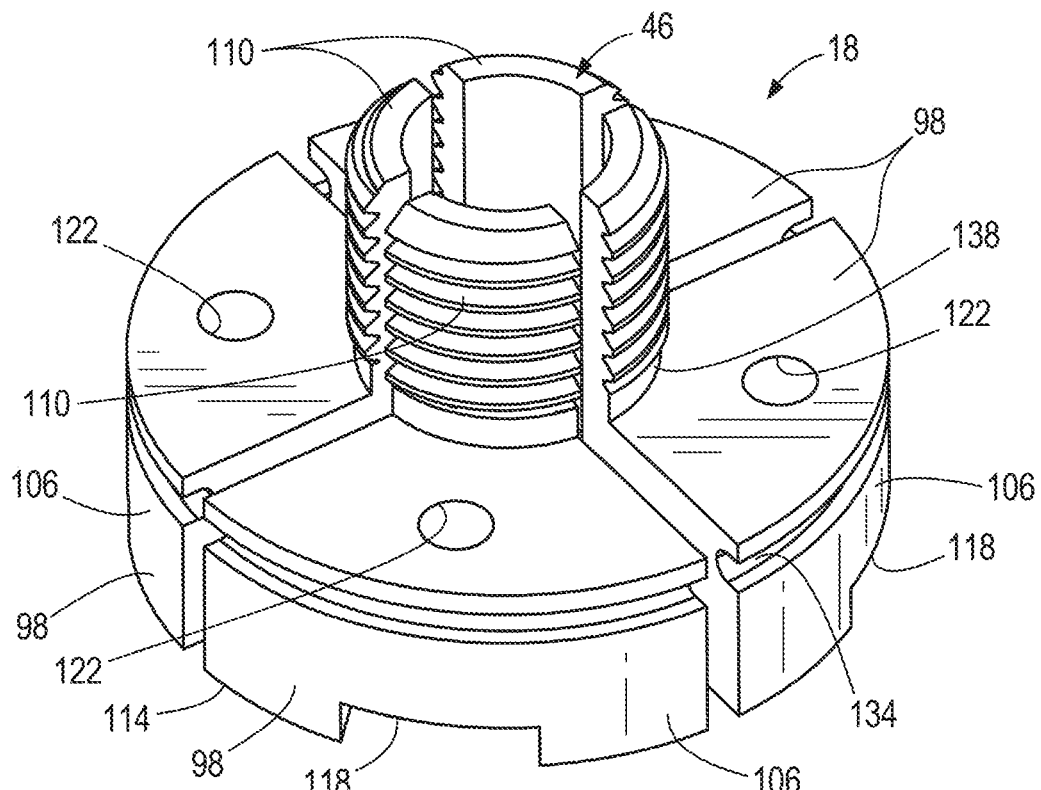
FIG. 4 is a perspective view of the plurality of arms of FIG. 2.

With reference to FIGS. 2-4, the adjustment mechanism 30 includes a plurality of arms 98 and an actuator 102. The plurality of arms 98 correspond to the plurality of segments 82 of the guide 78. In the illustrated embodiment, the arbor 20 includes four arms 98 and four segments 82. In other constructions, the arbor 10 may have at least two or more segments 82 and arms 98.

With reference to FIG. 4, each arm 98 includes a base portion 106 and a threaded portion 110. The illustrated base portion 106 includes a bottom 114 defining a channel 118. Each segment 82 of the guide 78 is receivable within the respective channel 118. In addition, each base portion 106 defines a hole 122 corresponding to each hole 74 of the third section 58 of the body 22 and each hole 90 of each segment 82 of the guide 78. The threaded portion 110 of each arm 98 extends generally perpendicular from the base portion 106 along the longitudinal axis A (FIG. 7A). Furthermore, the threaded portion 110 of each arm 98 forms a part the threaded arbor stem 18. Specifically, the threaded portions 110 form the opening 46 for the pilot bit 42 to extend therethrough. A size (e.g., the circumference) of the opening 46 is adjustable by the adjustment mechanism 30, as further discussed below. Stated another way, an outer circumference of the threaded arbor stem 18 is adjustable by the adjustment mechanism 30.

Figure 6:
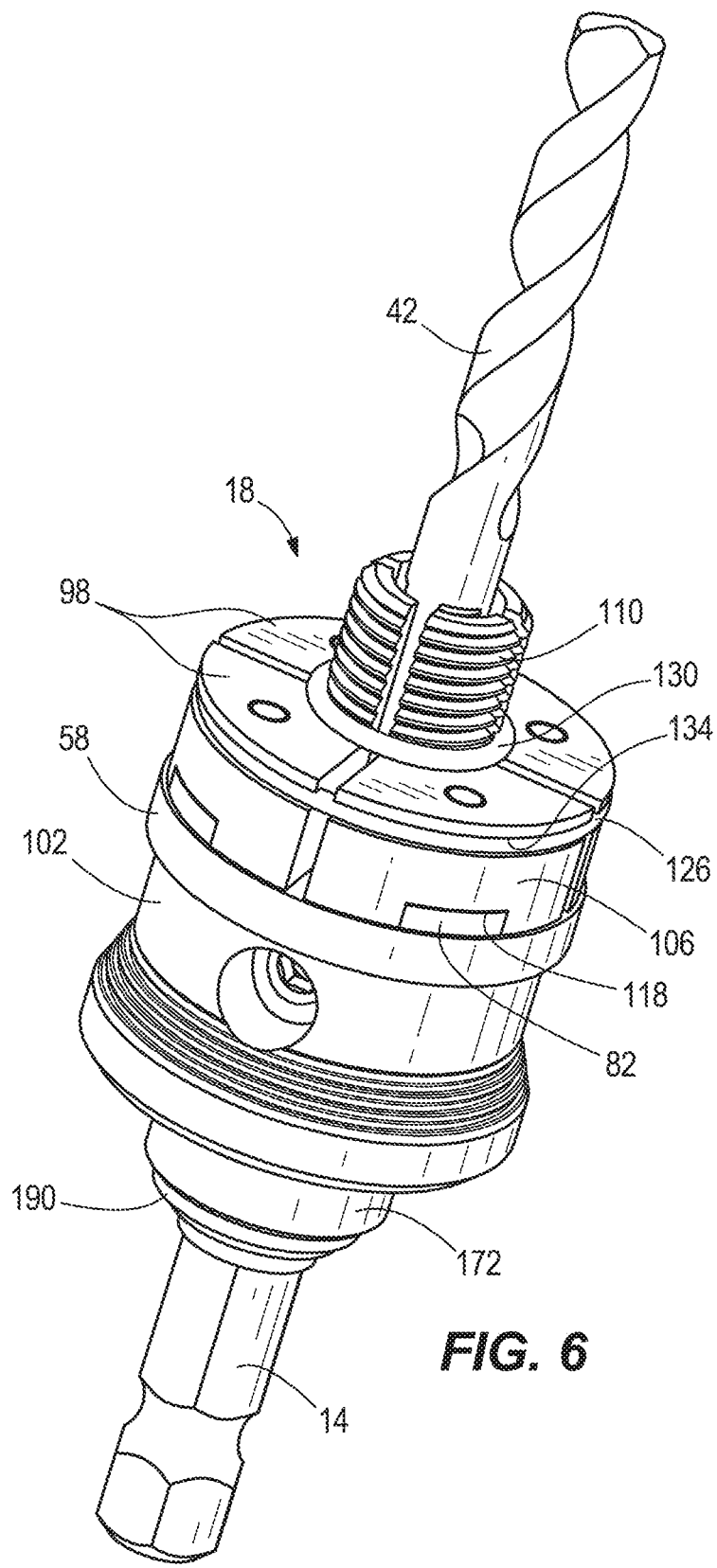
FIG. 6 is another perspective view of the arbor of FIG. 1 with portions of the arbor removed.

With reference to FIGS. 2, 4, and 6, the arbor 10 includes first and second biasing members 126, 130. In the illustrated embodiment, the biasing members 126, 130 are retaining rings. In one example, the retaining ring may be an elastic ring such as an o-ring. In other embodiments, the biasing members 126, 130 may be other types of annular elastic members or springs. The plurality of arms 98 defines an annular groove 134, and the first o-ring 126 is receivable within the groove 134. Specifically, each base portion 106 defines a portion of the groove 134 such that the first o-ring 126 surrounds each base portion 106 within the groove 134

(FIG. 6). The second o-ring 130 is positioned around each of the threaded portions 110. Specifically, the second o-ring 130 is positioned at a bottom end 138 of each threaded portion 110 (e.g., where the threaded portion 110 extends from the base portion 106). In some embodiments, the arbor 10 may only include one biasing member (e.g., the o-ring 126 or the o-ring 130).

With reference to FIGS. 1, 3, and 7A, the arbor 10 includes the actuator 102. In the illustrated embodiment, the actuator 102 is a collar. The collar 102 has an annular body portion 142 surrounding an upper portion of the first section 50 of the body 22 and the second section 54 of the body 22 (FIG. 7A). The collar 102 includes an annular flange 150 (FIG. 3) extending from an inner surface 154 of the collar 102. Furthermore, the collar 102 includes a bore 158 corresponding to the bore 66 of the second section 54 of the body 22 configured to receive the set screw 70. The collar 102 further includes a plurality of holes 162 corresponding to the holes 74 of the third section 58 of the body 22, the holes 90 of the guide 78, and the holes 122 of the arms 98.

The collar 102 is configured to move axially relative to the body 22 along the longitudinal axis A. In the illustrated embodiment, the collar 102 slides linearly along the body 22. In other embodiments, the collar 102 may include threads positioned on an inner diameter of the collar 102 to engage the threads of the body 22. In such embodiments, the collar 102 may move axially along the body 22 by rotating the collar 102 about the threads of the body 22. Furthermore, the illustrated collar 102 includes a grip section 166. The grip section 166 has ridges 168 and forms a portion of the annular body portion 142 of the collar 102. In particular, the ridges 168 are configured to provide a textured surface to be used by fingers of the user to help move (i.e., slide) the collar 102 on the body 22 along the longitudinal axis A. The grip section 166 may have other textured surfaces to aid the user in moving the collar 102.

With reference to FIGS. 2 and 5, the arbor 10 includes pins 170 extending axially from the collar 102. The pins 170 correspond to the holes 162 of the collar 102, the holes 74 of the third section 58 of the body 22, the holes 90 of the guide 78, and the holes 122 of the arms 98. Specifically, the pins 170 are received within the holes 162 of the collar 102 and extend through the holes 74 of the third section 58 of the body 22 and the holes 90 of the guide 78. In addition, the pins 170 are received within the holes 122 of the arms 98 (e.g., the base portions 106). The pins 170 are fixed to the collar 102 such that the pins 170 are movable with the collar 102 relative to the body 22. In particular, movement of the collar 102 along the longitudinal axis A moves the pins 170 axially along the longitudinal axis A into or out of the holes 122 of the arms 98.

With reference to FIGS. 1, 2, and 7A-7B, the arbor 10 further includes a retaining member 172 and a spring 174. The retaining member 172 is positioned adjacent a bottom end 178 (FIG. 7A) of the collar 102. In addition, the retaining member 172 surrounds a lower portion of the first section 50 of the body 22. The collar 102 may enclose a portion of the retaining member 172 (FIG. 7B). The spring 174 is positioned in a cylindrical gap 182 defined between the first section 50 of the body 22 and an inner surface 184 of the retaining member 172. The spring 174 includes a first end 186A adjacent a bottom 188 of the retaining member 172 and a second end 186B adjacent the annular flange 150 of the collar 102. In the illustrated embodiment, the spring 174 is a coil spring wrapped around the body 22. In other embodiments, the arbor 10 may additionally or alternatively include other types of springs. The collar 102 is configured to slide axially on the body 22 parallel to the longitudinal axis A such that the spring 174 axially compresses or expands relative to the retaining member 172.

With reference to FIGS. 7A-7B, the collar 102 is adjustable between first and second positions. The spring 174 is configured to bias the collar 102 toward the first position in which the pins 170 are received within the holes 122 of the arms 98. The collar 102 is adjustable to the second position by movement of the collar 102 on the body 22 axially to the left from the frame of reference of FIG. 7A by the user such that the pins 170 are moved at least partially within the holes 122. Furthermore, each hole 122 tapers from a first end 124A to a second end 124B. As such, when the collar 102 is in the first position, a top of each of the pins 170 are positioned closer to the second end 124B. Alternatively, when the collar 102 is in the second position, the top of each of the pins 170 are positioned closer to the first end 124A.

With continued reference to FIGS. 1, 2, and 7A-7B, the arbor 10 includes a retaining ring 190. Specifically, the annular groove 62 defined by the first section 50 of the body 22 receives the retaining ring 190. The retaining ring 190 is positioned adjacent the bottom 188 of the retaining member 172. The retaining ring 190 is configured to axially hold the retaining member 172 on the body 22.

With reference to FIGS. 1 and 2, the arbor 10 includes a cover 192. The illustrated cover 192 includes a top 194 and an annular side 196 extending from the top 194. The top 194 is positioned adjacent the base portion 106 of each of the arms 98. In addition, the top 194 defines an aperture 198 for the threaded portion 110 of each of the arms 98, and the pilot bit 42 to extend through. The annular side 196 is configured to surround an end of each of the base portions 106 of the arms 98. The cover 192 substantially encloses the other components of the adjustment mechanism 30 to inhibit saw dust, dirt, and other debris from interfering with movement of the adjustment mechanism 30.

In operation, the spring 174 biases the collar 102 (and the pins 170) toward the first position (FIG. 7A), in which the pins 170 are positioned within the respective holes 122 (i.e., at the second end 124B) of the arms 98. The pins 170 hold the arms 98 in an expanded state by the bias of the spring 174 forcing the collar 102 and the pins 170 to the right from the frame of reference of FIG. 7A. The arbor 10 is in a resting state when the collar 102 is in the first position.

The user adjusts the collar 102 from the first position to the second position (FIG. 7B) by sliding the collar 102 on the body 22 along the longitudinal axis A. Simultaneously, the spring 174 is axially compressed by the sliding movement of the collar 102. The pins 170, coupled to the collar 102, move axially to the left from the frame of reference of FIG. 7A with the sliding movement of the collar 102. Once the pins 170 are at least partially moved within the respective holes 122 (i.e., toward the first end 124A) of the arms 98, the first and second o-rings 126, 130 pull the arms 98 together (i.e., toward the longitudinal axis A) into a retracted or collapsed state. Specifically, each base portion 106 of the respective arm 98 slides radially along the respective segment 82 of the guide 78 by the o-rings 126, 130. In other embodiments, the arms 98 may be configured to pivot or move at an angle relative to the longitudinal axis A to adjust the arms 98 between the expanded state and the collapsed state.

In the illustrated embodiment, all of the arms 98 move together between the expanded state and the retracted state. In other embodiments, the arbor 10 may be configured such that only some of the arms 98 move while the remaining arms 98 are stationary. For example, with reference to the arbor 10, one of the arms 98 moves with the adjustment of the collar 102 between the first and second positions, while the remaining three arms 98 are stationary.

The adjustment mechanism 30 adjusts the size (e.g., circumference) of the arbor stem 18 when the collar 102 is adjusted between the first and second positions. Specifically, the circumference of the arbor stem 18 is larger when the arms 98 are in the expanded state than when in the collapsed state. The adjustment mechanism 30 facilitates the removal of the hole saw from the arbor 10 by adjusting the circumference of the arbor stem 18. Specifically, the collapsed position of the arms 98 makes the arbor stem 18 smaller so that the hole saw can be more easily removed (e.g., unthreaded or slid off) from the arbor 110.

FIGS. 8-12B illustrate another arbor 210 embodying the invention. The arbor 210 includes an arbor shaft 214, a threaded arbor stem 218, and a body 222 coupled between the arbor shaft 214 and the arbor stem 218. In the illustrated embodiment, the threaded arbor stem 218 has a ⅝"-18 thread. In other embodiments, the arbor stem 218 may have a thread of a different size. The illustrated arbor 210 further includes an adjustment mechanism 230 to facilitate the release of a hole saw from the arbor 210, similar to the arbor 10, described above. The arbor 210 defines a longitudinal axis B extending from a first end 234 to a second end 238 of the arbor 210. The first end 234 has the shaft 214, and the second end 238 has the arbor stem 218.

The arbor 210 further includes a pilot bit 242 coupled to the arbor 210. The pilot bit 242 is positioned partially within and extends axially from the arbor 210 (e.g., the body 222; FIGS. 12A-12B). Furthermore, the arbor stem 218 defines an opening 246 having a circumference. The pilot bit 242 extends axially through the opening 246. In some embodiments, the pilot bit 242 may be omitted.

Figure 9:
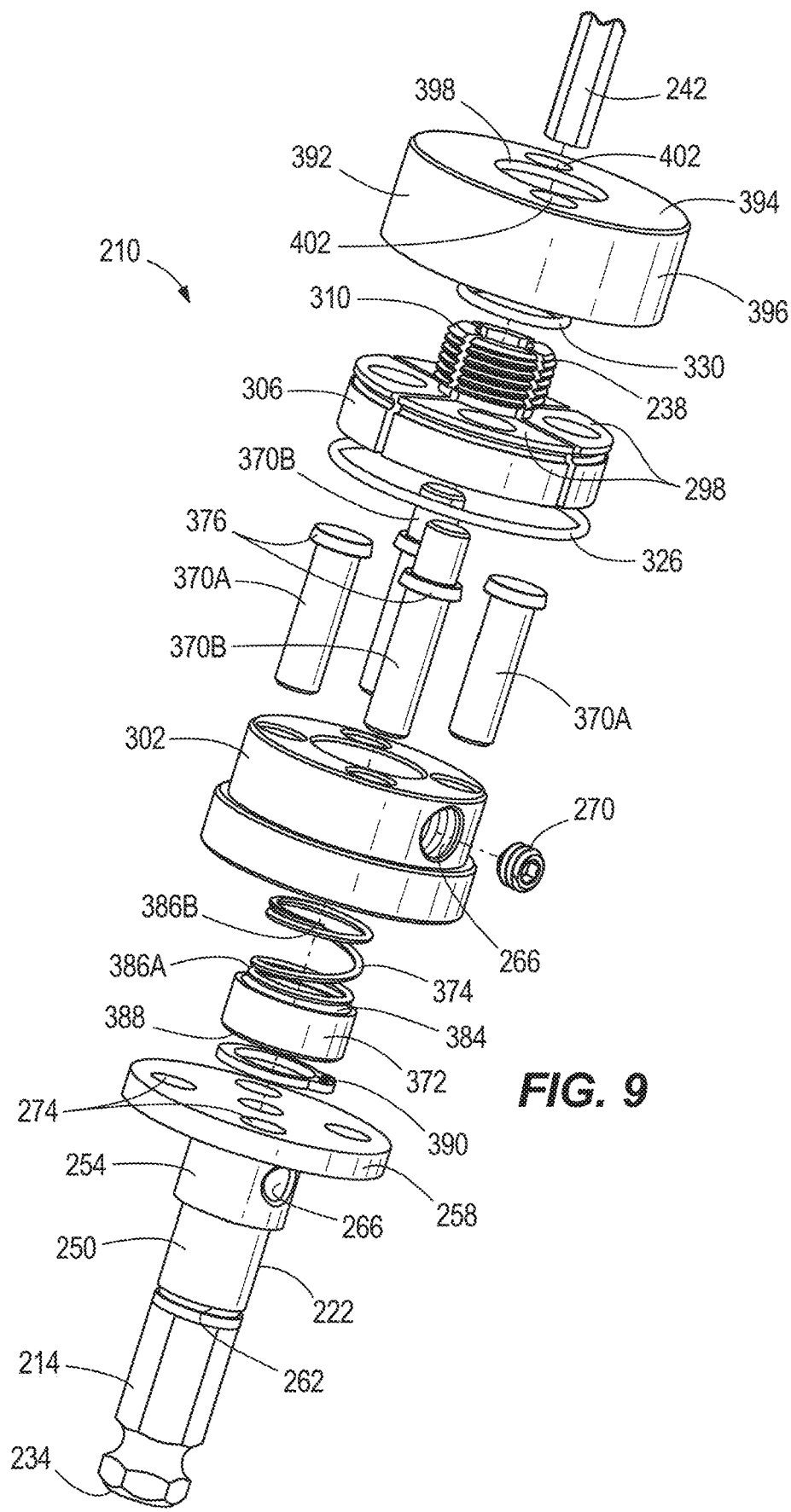
FIG. 9 is an exploded view of the arbor of FIG. 8, the arbor including a collar and a plurality of arms.

With reference to FIG. 9, the body 222 of the arbor 210 has a generally cylindrical structure and includes a plurality of sections 250, 254, 258 extending axially between the shaft 214 and stem 218 along the longitudinal axis B. The illustrated body 222 includes a first section 250 adjacent the arbor shaft 214, a second section 254, and a third section 258 between the second section 254 and the arbor stem 218. The first section 250 defines an annular groove 262. The second section 254 defines a bore 266 configured to receive a set screw 270 for removably coupling the pilot bit 242 to the arbor 210. In other embodiments, the pilot bit 242 may be permanently coupled to the arbor 210. The third section 258 defines a plurality of holes 274. In the illustrated embodiment, the third section 258 includes four holes 274 spaced circumferentially about the longitudinal axis B.

Figure 10:
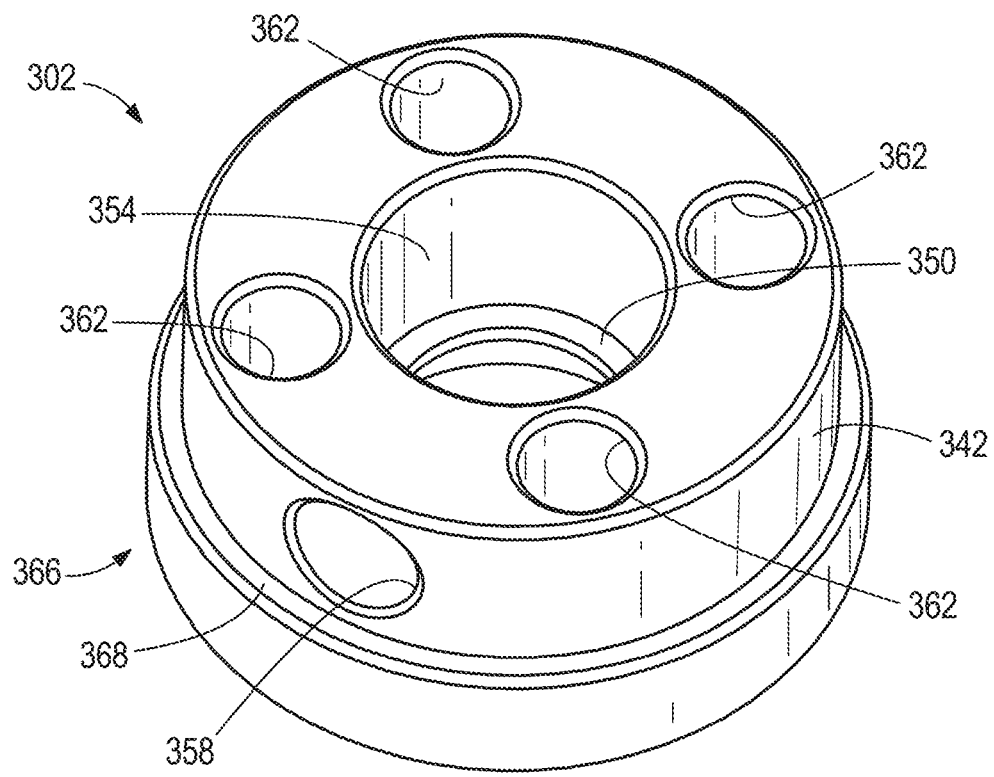
FIG. 10 is a perspective view of the collar of FIG. 9.
Figure 11:
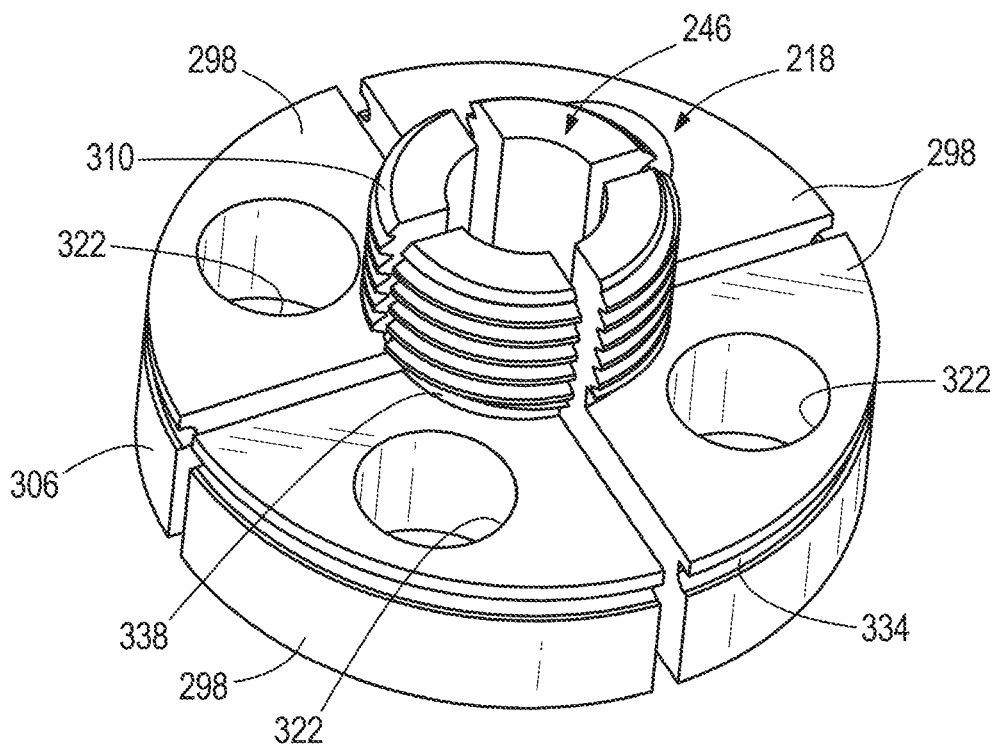
FIG. 11 is a perspective view of the plurality of arms of FIG. 9.

With reference to FIGS. 9-11, the adjustment mechanism 230 includes a plurality of arms 298 and an actuator 302. The plurality of arms 298 correspond to the plurality of holes 274 of the third section 258. In the illustrated embodiment, the adjustment mechanism includes four arms 298. In other constructions, the arbor 210 may have at least two or more holes 274 and arms 298.

With reference to FIG. 11, each arm 298 includes a base portion 306 and a threaded portion 310. The illustrated base portion 306 defines a hole 322 corresponding to each hole 274 of the third section 258 of the body 222. The threaded portion 310 of each arm 298 extends generally perpendicular from the base portion 306 along the longitudinal axis B. Furthermore, the threaded portion 310 of each arm 298 forms a part the threaded arbor stem 218. Specifically, the threaded portions 310 form the opening 246 for the pilot bit 242 to extend therethrough. A size (e.g., the circumference) of the opening 246 is adjustable by the adjustment mechanism 230, as further discussed below.

With reference to FIGS. 9 and 12A-12B, the arbor 210 includes first and second biasing members 326, 330. In the illustrated embodiment, the biasing members 326, 330 are o-rings. In other embodiments, the biasing members 326, 330 may be other types of annular elastic members or springs. The plurality of arms 298 defines an annular groove 334, and the first o-ring 326 is receivable within the groove 334. Specifically, each base portion 306 defines a portion of the groove 334 such that the first o-ring 326 surrounds each base portion 306 within the groove 334 (FIGS. 12A-12B). The second o-ring 330 is positioned around each of the threaded portions 310. Specifically, the second o-ring 330 is positioned at a bottom end 338 (FIG. 11) of each threaded portion 310 (e.g., where the threaded portion 310 extends from the base portion 306).

Figure 8:
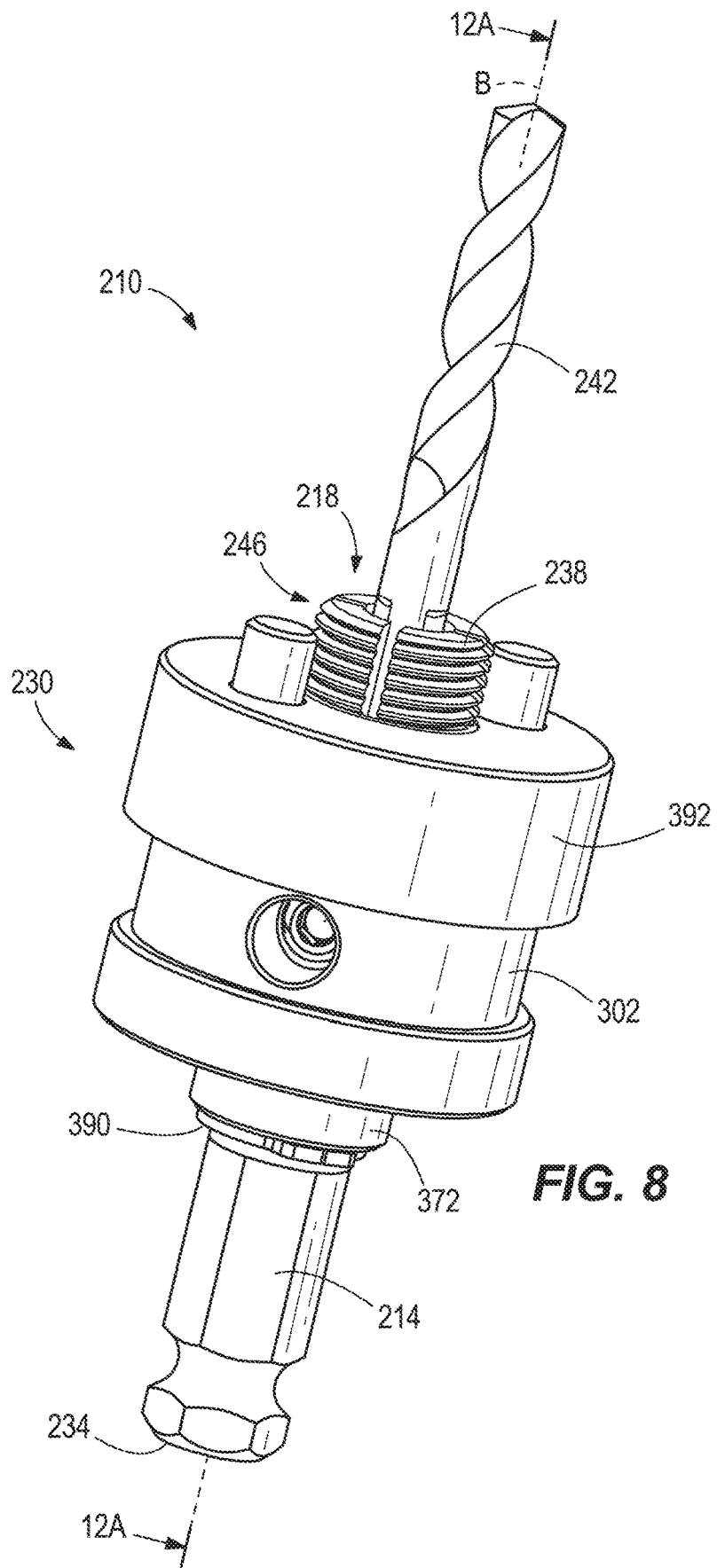
FIG. 8 is a perspective view of another arbor embodying the invention.

With reference to FIGS. 8-10, the arbor 10 includes the actuator 302. In the illustrated embodiment, the actuator 302 is a collar. The collar 302 has an annular body portion 342 surrounding an upper portion of the first section 250 of the body 222 and the second section 254 of the body 222 (FIG. 12A). The collar 302 includes an annular flange 350 (FIG. 10) extending from an inner surface 354 of the collar 302. Furthermore, the collar 302 includes a bore 358 corresponding to the bore 266 of the second section 254 of the body 222 configured to receive the set screw 270. The collar 302 further includes a plurality of holes 362 corresponding to the holes 274 of the third section 258 of the body 222 and the holes 322 of the arms 298.

The collar 302 is configured to move axially relative to the body 222 along the longitudinal axis B. In the illustrated embodiment, the collar 302 slides linearly along the body 222. In other embodiments, the collar 302 may include threads positioned on an inner diameter of the collar 302 to engage the threads of the body 222. In such embodiments, the collar 302 may move axially along the body 222 by rotating the collar 302 about the threads of the body 222. Furthermore, the illustrated collar 302 includes a grip section 366. The grip section 366 forms a portion of the annular body portion 342 of the collar 302 and defines a ledge 368 (FIG. 10). In particular, the ledge 368 is configured to provide a surface to be used by fingers of the user to help move (i.e., slide) the collar 302 on the body 222 along the longitudinal axis B. The grip section 366 or other portions of the annular body portion 342 may have a textured surface to aid the user in moving the collar 302.

With reference to FIGS. 9 and 12A-12B, the arbor 10 includes pins 370A, 370B extending axially from the collar 302. The pins 370A, 370B correspond to the holes 362 of the collar 302, the holes 274 of the third section 258 of the body 222, and the holes 322 of the arms 298. Specifically, the pins 370A, 370B are received within the holes 362 of the collar 302 and extend through the holes 274 of the third section 258 of the body 222. In addition, the pins 370A, 370B are received within the holes 322 of the arms 298 (e.g., the base portions 306). The pins 370A, 370B are fixed to the collar 302 for movement with the collar 302 relative to the body 222. In particular, movement of the collar 302 along the longitudinal axis B moves the pins 370A, 370B axially along the longitudinal axis B into or out of the holes 322 of the arms 298.

With particular reference to FIG. 9, the pins 370A, 370B have different lengths. The pins 370B have a length that is longer than a length of the pins 370A. The pins 370B extend through the holes 322 of the arms 298 such that the pins 370B form drive pins receivable in apertures defined by the hole saw. The drive pins 370B are movable with the collar 302 relative to the hole saw, as described above, such that movement of the collar 302 along the longitudinal axis B moves the drives pins 370B axially into or out of the apertures in the hole saw. When received in the apertures, the drive pins 370B inhibit rotation of the hole saw relative to the threaded arbor stem 218. Therefore, the drive pins 370B are configured to engage/disengage the hole saw by movement of the collar 302. Furthermore, each of the pins 370A, 370B includes a flange 376 receivable within the holes 322 of the arms 298. The holes 322 are tapered from a first end 324A to a second end 324B such that each flange 376 is sized to the circumference of the hole 322 at the second end 324B adjacent the threaded portion 310.

With reference to FIGS. 8, 9, and 12A-12B, the arbor 210 further includes a retaining member 372 and a spring 374. The retaining member 372 is positioned adjacent a bottom end 378 (FIG. 12A) of the collar 302. In addition, the retaining member 372 surrounds a lower portion of the first section 250 of the body 222. The collar 302 may enclose a portion of the retaining member 372 (FIG. 12B). The spring 374 is positioned in a cylindrical gap 382 defined between the first section 250 of the body 222 and an inner surface 384 of the retaining member 372. The spring 374 includes a first end 386A adjacent a bottom 388 of the retaining member 372 and a second end 386B adjacent the annular flange 350 of the collar 302. In the illustrated embodiment, the spring 374 is a coil spring wrapped around the body 222. In other embodiments, the arbor 210 may additionally or alternatively include other types of springs. The collar 302 is configured to slide axially on the body 222 parallel to the longitudinal axis B such that the spring 374 axially compresses or expands relative to the retaining member 372.

With reference to FIGS. 12A-12B, the collar 302 is adjustable between first and second positions. The spring 374 is configured to bias the collar 302 toward the first position in which the pins 370A, 370B are received within the holes 322 of the arms 98. The collar 302 is adjustable to the second position by movement of the collar 302 on the body 222 axially to the left from the frame of reference of FIG. 12A by the user such that the pins 370A, 370B are moved at least partially within the holes 322. Furthermore, each hole 322 is tapered such that when the collar 302 is in the first position, the flanges 376 of the pins 370A, 370B are positioned at the second end 324B. Alternatively, when the collar 302 is in the second position, the flanges 376 of the pins 170 are positioned closer to the first end 124A.

With reference to FIGS. 8, 9, and 12A-12B, the arbor 210 includes a retaining ring 390. Specifically, the annular groove 262 defined by the first section 250 of the body 222 receives the retaining ring 390. The retaining ring 390 is positioned adjacent the bottom 388 of the retaining member 372. The retaining ring 390 is configured to axially hold the retaining member 372 on the body 222.

With reference to FIGS. 8 and 9, the arbor 210 includes a cover 392. The illustrated cover 392 includes a top 394 and an annular side 396 extending from the top 394. The top 394 is positioned adjacent the base portion 306 of each of the arms 298. In addition, the top 394 defines an aperture 398 for the threaded portion 310 of each of the arms 298, and the pilot bit 242 to extend through. The top 394 further defines a plurality of holes 402 configured to receive the drive pins 370B. The annular side 396 is configured to surround an end of each of the base portions 306 of the arms 298. The cover 392 thereby substantially encloses other components of the adjustment mechanism 230.

In operation, the spring 274 biases the collar 302 (and the pins 370A, 370B) toward the first position (FIG. 12A), in which the pins 370A, 370B are positioned within the respective holes 322 of the arms 298. The pins 370A, 370B, and the flanges 376, hold the arms 298 in an expanded state by the bias of the spring 374 forcing the collar 302 to the right from the frame of reference of FIG. 12A. In particular, the flange 376 is at the end of the respective hole 322 of each arm 298 such that the pins 370A, 370B hold the arms 298 in the expanded state. The arbor 210 is in a resting state when the collar 302 is in the first position.

The user adjusts the collar 302 from the first position to the second position (FIG. 12B) by sliding the collar 302 on the body 222 along the longitudinal axis B. Simultaneously, the spring 374 is axially compressed by the sliding movement of the collar 302. The pins 370A, 370B, coupled to the collar 302, move axially to the left from the frame of reference of FIG. 12A with the sliding movement of the collar 302. Once the pins 370A, 370B are moved away from the end of the respective hole 322 adjacent the threaded portion 310, the first and second o-rings 326, 330 pull the arms 298 together (i.e., toward the longitudinal axis B) into a retracted or collapsed state. Specifically, each flange 376 of the pins 370A, 370B are positioned proximate the first end 324A such that the arms 298 can move radially about the pins 370A, 370B by the pull of the o-rings 326, 330.

The adjustment mechanism 230 adjusts the size (e.g., circumference) of the arbor stem 218 when the collar 302 is adjusted between the first and second positions. Specifically, the circumference of the arbor stem 218 is larger when the arms 298 are in the expanded state than when in the collapsed state. The adjustment mechanism 230 facilitates the removal of the hole saw from the arbor 210 by adjusting the circumference of the arbor stem 218. Specifically, the collapsed position of the arms 298 makes the arbor stem 218 smaller so that the hole saw can be more easily removed (e.g., unthreaded or slid off) from the arbor 210.

FIGS. 13-20B illustrate yet another arbor 410 embodying the invention. The arbor 410 includes an arbor shaft 414, an arbor stem 418, and a body 422 coupled between the arbor shaft 414 and the arbor stem 418. In the illustrated embodiment, the threaded arbor stem 418 has a ⅝"-18 thread. In other embodiments, the arbor stem 418 may have a thread of a different size. The illustrated arbor 410 further includes an adjustment mechanism 430 to facilitate the release of a hole saw from the arbor 410, similar to the arbors 10, 210 described above. The arbor 410 defines a longitudinal axis C extending from a first end 434 to a second end 438 of the arbor 410. The first end 434 has the shaft 414, and the second end 438 has the arbor stem 418.

The arbor 410 further includes a pilot bit 442 coupled to the arbor 410. The pilot bit 442 is positioned partially within and extends axially from the arbor 410 (e.g., the body 422; FIGS. 20A-20B). Furthermore, the arbor stem 418 defines an opening 446 having a circumference. The pilot bit 442 extends axially through the opening 446. In some embodiments, the pilot bit 442 may be omitted.

Figure 14:
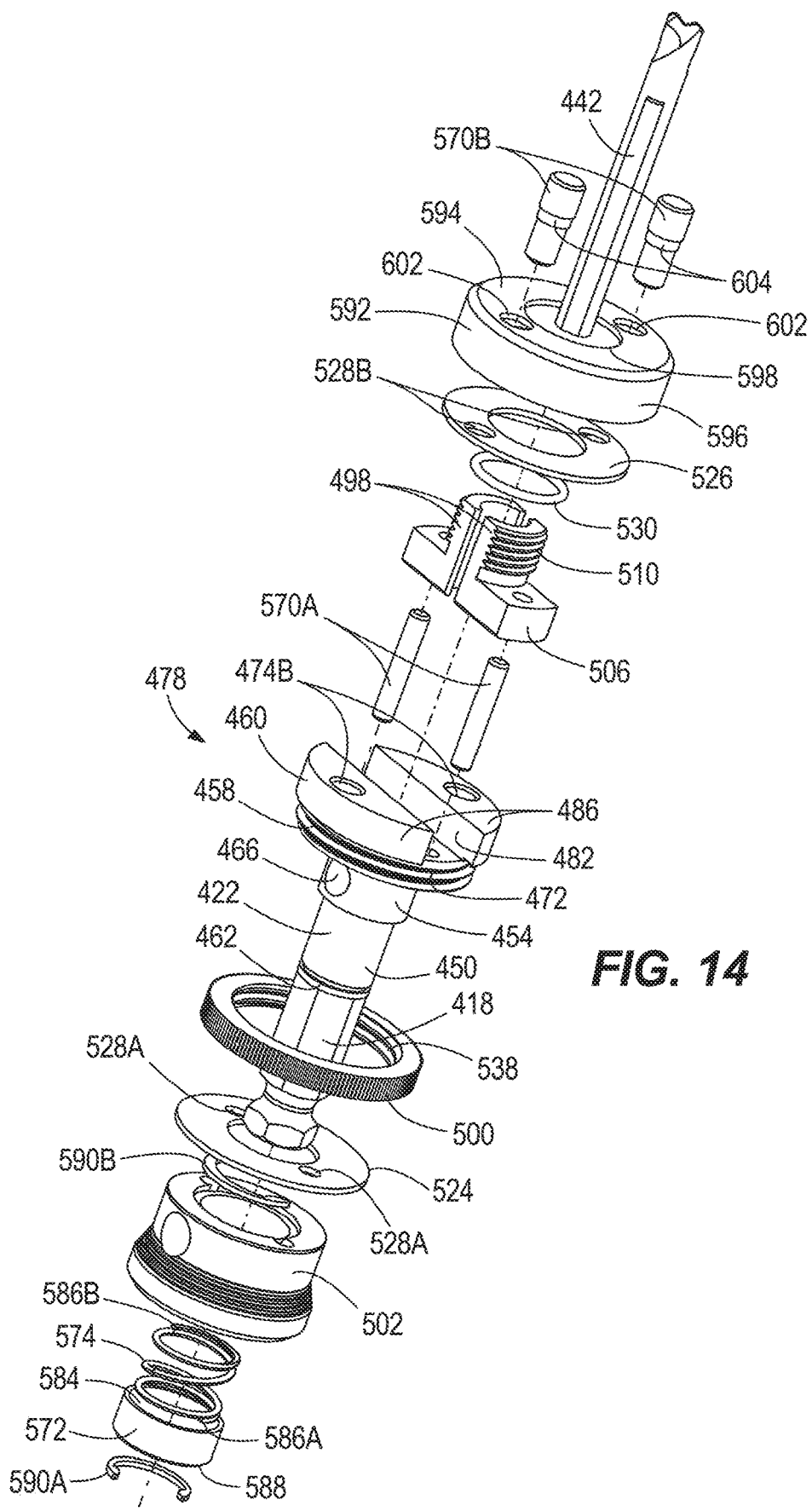
FIG. 14 is an exploded view of the arbor of FIG. 13, the arbor including a first collar, a second collar, and a plurality of arms.
Figure 18:
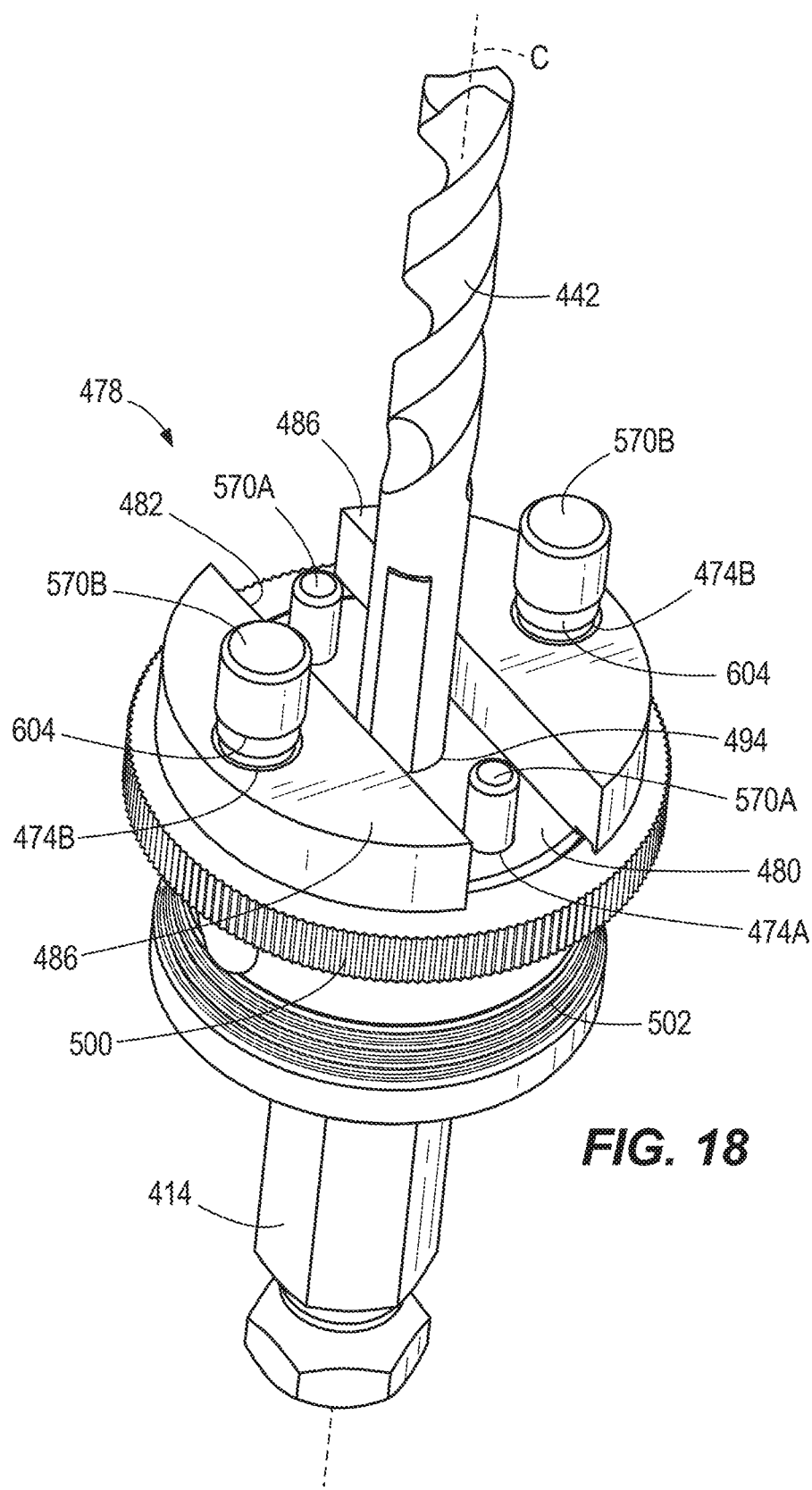
FIG. 18 is a perspective view of the arbor of FIG. 13 with portions of the arbor removed including the plurality of arms of FIG. 14.

With reference to FIG. 14, the body 422 of the arbor 410 has a generally cylindrical structure and includes a plurality of sections 450, 454, 458, 460 extending axially between the shaft 414 and stem 418 along the longitudinal axis C. The illustrated body 422 includes a first section 450 adjacent the arbor shaft 414, a second section 454, a third section 458, and a fourth section 460 between the third section 458 and the arbor stem 418. The first section 450 defines an annular groove 462. The second section 454 defines a bore 466 configured to receive a set screw for removably coupling the pilot bit 442 to the arbor 410. In other embodiments, the pilot bit 442 may be permanently coupled to the arbor 410. The third section 458 includes threads 472 and defines a plurality of holes 474A (FIG. 18). The fourth section 460 defines a plurality of holes 474B. In the illustrated embodiment, the third section 458 includes two holes 474A, and the fourth section 460 includes two holes 474B. The holes 474A, 474B are spaced circumferentially about the longitudinal axis C.

With reference to FIG. 18, the fourth section 460 includes a guide 478. The illustrated guide 478 is positioned on a top 480 of the third section 458. The guide 478 is formed by a slot 482 extending through the fourth section 460 perpendicular to the longitudinal axis C. The illustrated guide 478 includes two segments 486 to form the slot 482. Each segment 486 defines one of the holes 474B. Furthermore, the third section 458 includes an aperture 494 defined between two segments 486 of the guide 478. The pilot bit 442 is configured to extend through the aperture 494. The guide 478 is integral with the body 422.

With reference to FIGS. 14-17, the adjustment mechanism 430 includes a plurality of arms 498, a first actuator 500, and a second actuator 502. The plurality of arms 498 correspond to the plurality of holes 474A of the third section 458. In the illustrated embodiment, the adjustment mechanism 430 includes two arms 498. In other constructions, the arbor 410 may have at least two or more holes 474A and arms 498.

Figure 17:
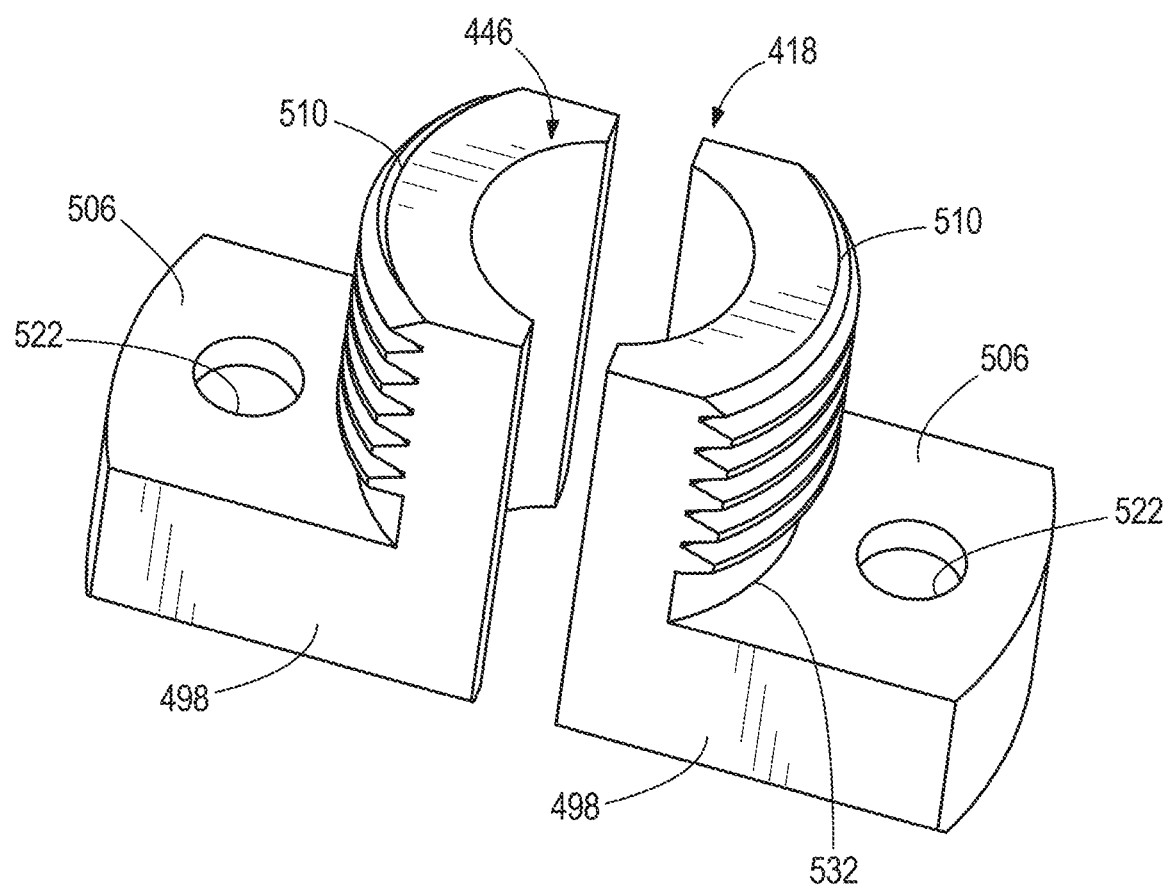
FIG. 17 is a perspective view of the plurality of arms of FIG. 14.

With reference to FIG. 17, each arm 498 includes a base portion 506 and a threaded portion 510. The illustrated base portion 506 defines a hole 522 corresponding to each hole 474A of the third section 458 of the body 422. Each base portion 506 is received within the slot 482 (i.e., received between the two segments 486). The threaded portion 510 of each arm 498 extends generally perpendicular from the base portion 506 along the longitudinal axis C. Furthermore, the threaded portion 510 of each arm 498 forms a part the threaded arbor stem 418. Specifically, the threaded portions 510 form the opening 446 for the pilot bit 442 to extend therethrough. A size (e.g., the circumference) of the opening 446 is adjustable by the adjustment mechanism 430, as further discussed below.

Figure 19:
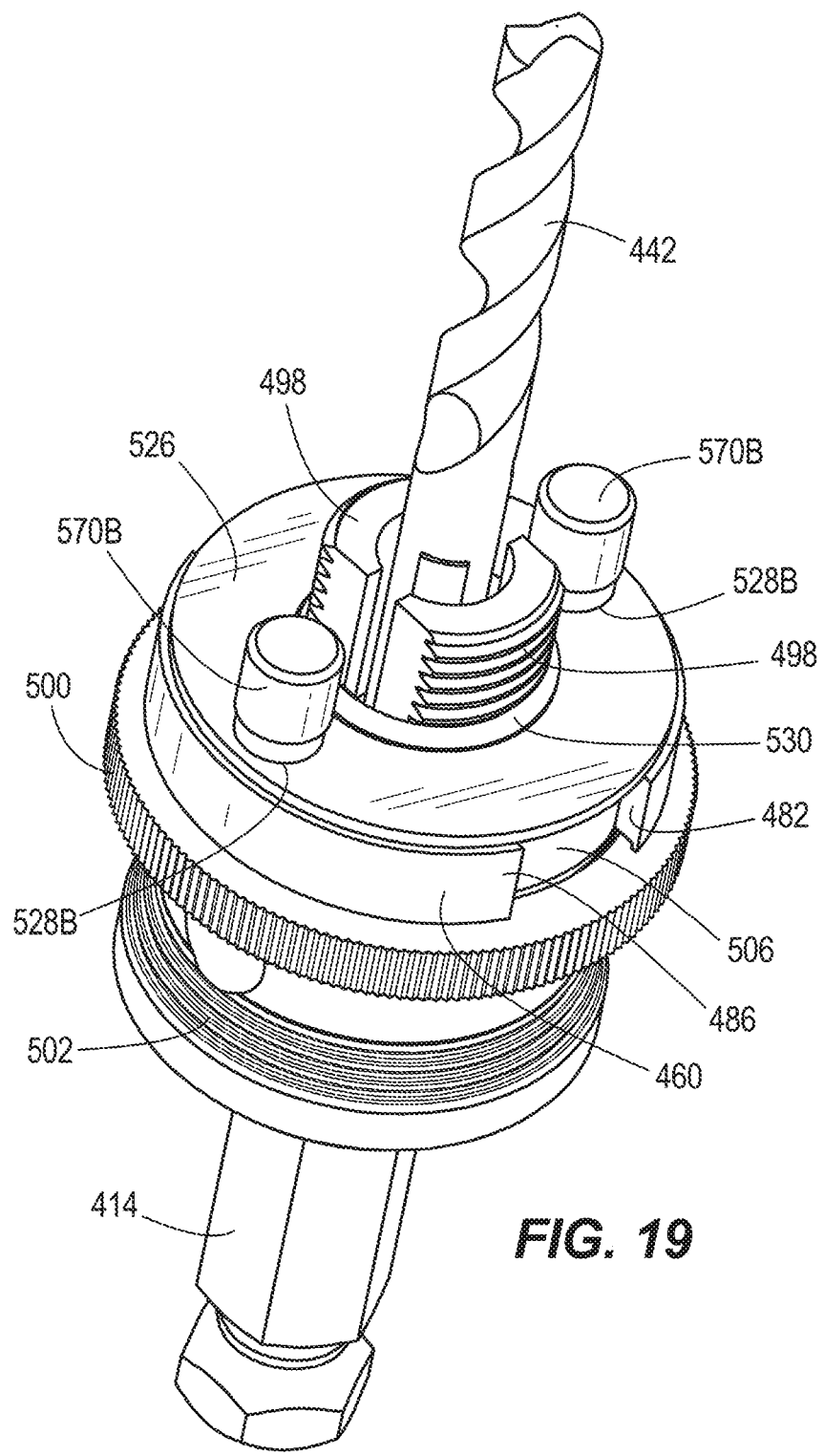
FIG. 19 is another perspective view of the arbor of FIG. 13 with portions of the arbor removed.

With continued reference to FIGS. 14, 19, and 20A-20B, the arbor 410 includes first and second annular members 524, 526. In the illustrated embodiment, the annular members 524, 526 are washers. The first washer 524 is positioned between the first and second collars 500, 502. In addition, the first washer 524 includes holes 528A corresponding to the holes 474A of the third section 458 of the body 422, and the holes 522 of the arms 498. The second washer 526 is positioned adjacent (i.e., on top of) the base portions 506 and the fourth section 460 (e.g., the two segments 486; FIG. 19). The second washer 526 is configured to axially constrain the arms 498. In addition, the second washer 526 includes holes 528B corresponding to the holes 474B of the fourth section 460 of the body 422.

With reference to FIGS. 14, 17, and 19, the arbor 410 includes a biasing member 530. In the illustrated embodiment, the biasing member 530 is an o-ring. In other embodiments, the biasing member 530 may be another type of annular elastic member or spring. The o-ring 530 is positioned around each of the threaded portions 510. Specifically, the o-ring 530 is positioned at a bottom end 532 (FIG. 17) of each threaded portion 510 (e.g., where the threaded portion 510 extends from the base portion 506; FIG. 19).

Figure 16:
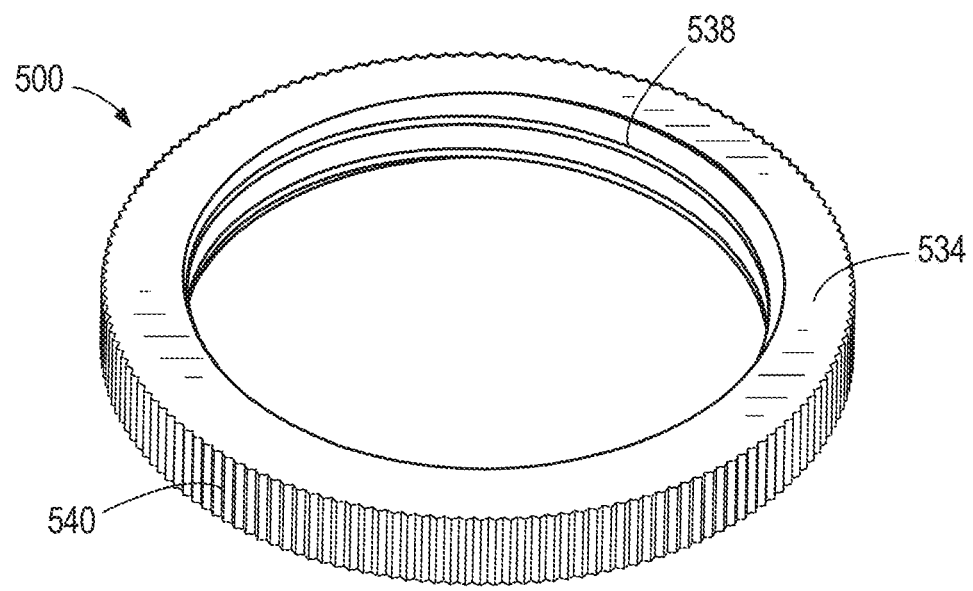
FIG. 16 is a perspective view of the second collar of FIG. 14.

With reference to FIGS. 14, 16, and 19, the arbor 410 includes the first actuator 500. In the illustrated embodiment, the first actuator 500 is a first collar. The first collar 500 has an annular body portion 534 surrounding the third section 458 of the body 422 (FIG. 20A). Specifically, the first collar 500 includes threads 538 positioned on an inner diameter of the collar 500 to engage the threads 472 of the third section 458. As such, the first collar 500 moves axially along the body 422 by rotating the first collar 500 about the threads 472 of the third section 458.

The first collar 500 is configured to move axially relative to the body 422 along the longitudinal axis C by rotation about the body 422. In the illustrated embodiment, the first collar 500 threads upward or downward about the threads 472. Furthermore, the illustrated first collar 500 includes ridges 540 forming a grip section of the first collar 500. In particular, the ridges 540 are configured to provide a textured surface to be used by fingers of the user to help move (e.g., rotate) the first collar 500 on the body 422 about the longitudinal axis C. The first collar 500 may have other textured surfaces to aid the user in moving the first collar 500.

Figure 15:
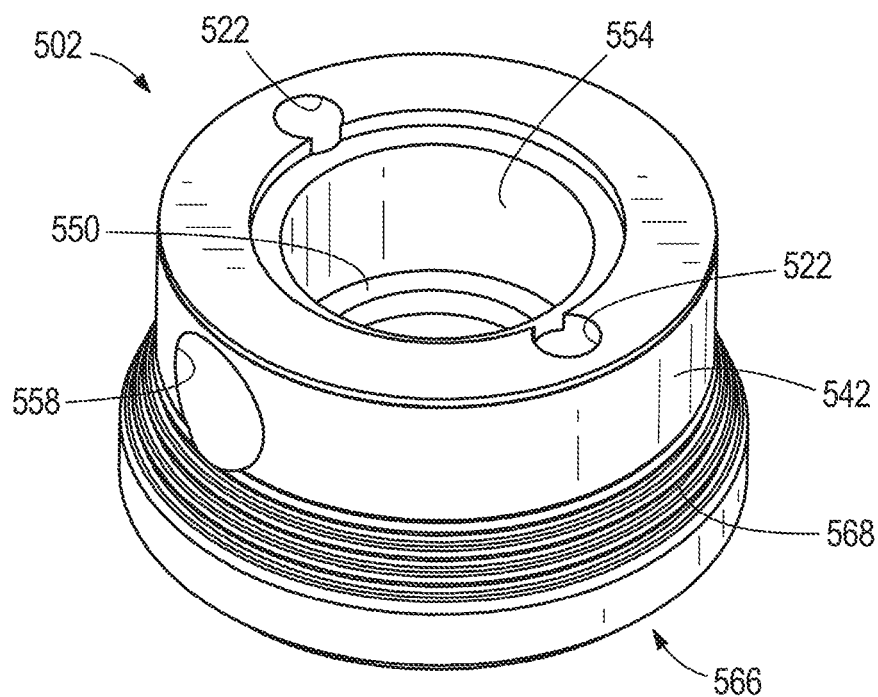
FIG. 15 is a perspective view of the first collar of FIG. 14.

With reference to FIGS. 14, 15, and 19, the arbor 410 includes the second actuator 502 proximate the first actuator 500. In the illustrated embodiment, the second actuator 502 is a second collar. The second collar 502 has an annular body portion 542 surrounding an upper portion of the first section 450 of the body 422, and the second section 454 of the body 422 (FIG. 20A). The second collar 502 includes an annular flange 550 (FIG. 15) extending from an inner surface 554 of the second collar 502. Furthermore, the second collar 502 includes a bore 558 corresponding to the bore 466 of the second section 454 of the body 422 configured to receive the set screw. The second collar 502 further includes a plurality of holes 562 corresponding to the holes 474A of the third section 458 of the body 422, the holes 522 of the arms 498, and the holes 528A of the first washer 524.

The second collar 502 is configured to move axially relative to the body 422 along the longitudinal axis C. The illustrated second collar 502 slides linearly along the body 422. In other embodiments, the second collar 502 may include threads positioned on an inner diameter of the collar 502 to engage the threads of the body 422, similar to the first collar 500. Furthermore, the illustrated second collar 502 includes a grip section 566. The grip section 566 has ridges 568 and forms a portion of the annular body portion 542 of the second collar 502. In particular, the ridges 568 are configured to provide a textured surface to be used by fingers of the user to help move (i.e., slide) the second collar 502 on the body 422 along the longitudinal axis C. The grip section 566 may have other textured surfaces to aid the user in moving the collar 502.

With reference to FIGS. 14, 18, and 20A-20B, the arbor 410 includes pins 570A, 570B. The pins 570A extend axially from the second collar 502. The pins 570A correspond to the holes 562 of the second collar 502, the holes 528A of the first washer 524, the holes 474A of the third section 458 of the body 422, and the holes 522 of the arms 498. Specifically, the pins 570A are received within the holes 562 of the second collar 502 and extend through the holes 474A of the third section 458 of the body 422, and the holes 528A of the first washer 524. In addition, the pins 570A are received within the holes 522 of the arms 498 (e.g., the base portions 506). The pins 370A are fixed to the second collar 502 for movement with the second collar 502 relative to the body 422. In particular, movement of the second collar 502 along the longitudinal axis C moves the pins 570A axially along the longitudinal axis C into or out of the holes 522 of the arms 498.

With reference to FIGS. 14, 18 and 19, the pins 570B are received within and extend axially from the holes 474B of the fourth section 460. The pins 570B correspond to the holes 474B of the fourth section 460 and the holes 528B of the second washer 526. Specifically, the pins 570B are press fit within the holes 474B of the fourth section 460 and extend through the holes 528B of the second washer 526. In addition, the pins 570B axially constrain the second washer 526 such that the arms 498 are also axially constrained. The pins 570B are not configured to move with either of the first and second collars 500, 502. The pins 570B form drive pins receivable in apertures defined by the hole saw. When received in the apertures, the drive pins 570B inhibit rotation of the hole saw relative to the threaded arbor stem 418.

With reference to FIGS. 13, 14, and 20A-20B, the arbor 410 further includes a retaining member 572 and a spring 574. The retaining member 572 is positioned adjacent a bottom end 578 (FIG. 20A) of the second collar 502. In addition, the retaining member 572 surrounds a lower portion of the first section 450 of the body 422. The second collar 502 may enclose a portion of the retaining member 572 (FIG. 20B). The spring 574 is positioned in a cylindrical gap 582 defined between the first section 450 of the body 422 and an inner surface 584 of the retaining member 572. The spring 574 includes a first end 586A adjacent a bottom 588 of the retaining member 572 and a second end 586B adjacent the annular flange 550 of the second collar 502. In the illustrated embodiment, the spring 574 is a coil spring wrapped around the body 422. In other embodiments, the arbor 410 may additionally or alternatively include other types of springs. The second collar 502 is configured to slide axially on the body 422 parallel to the longitudinal axis C such that the spring 574 axially compresses or expands relative to the retaining member 572.

With reference to FIGS. 20A-20B, the second collar 502 is adjustable between first and second positions. The spring 574 is configured to bias the second collar 502 toward the first position in which the pins 570A are received within the holes 522 of the arms 498. The second collar 502 is adjustable to the second position by movement of the second collar 502 on the body 422 axially to the left from the frame of reference of FIG. 20A by the user such that the pins 570A are moved at least partially within the holes 522. Furthermore, each hole 522 tapers from a first end 522A to a second end 522B. As such, when the collar 502 is in the first position, a top of each of the pins 570A is positioned closer to the second end 522B. Alternatively, when the collar 502 is in the second position, the top of each of the pins 570A is positioned closer to the first end 522A.

With reference to FIGS. 13, 14, and 20A-20B, the arbor 410 includes first and second retaining rings 590A, 590B. Specifically, the annular groove 462 defined by the first section 450 of the body 422 receives the first retaining ring 590A. The first retaining ring 590A is positioned adjacent the bottom 588 of the retaining member 572. The first retaining ring 590A is configured to axially hold the retaining member 572 on the body 422. The second section 454 defines another annular ring configured to receive the second retaining ring 590B. The second retaining ring 590B is positioned adjacent the first washer 524. The second retaining ring 590B is configured to axially hold the first washer 524 on the body 422, and inhibit continued axial movement of the first collar 500 to the left from the frame of reference of FIG. 20A.

Figure 13:
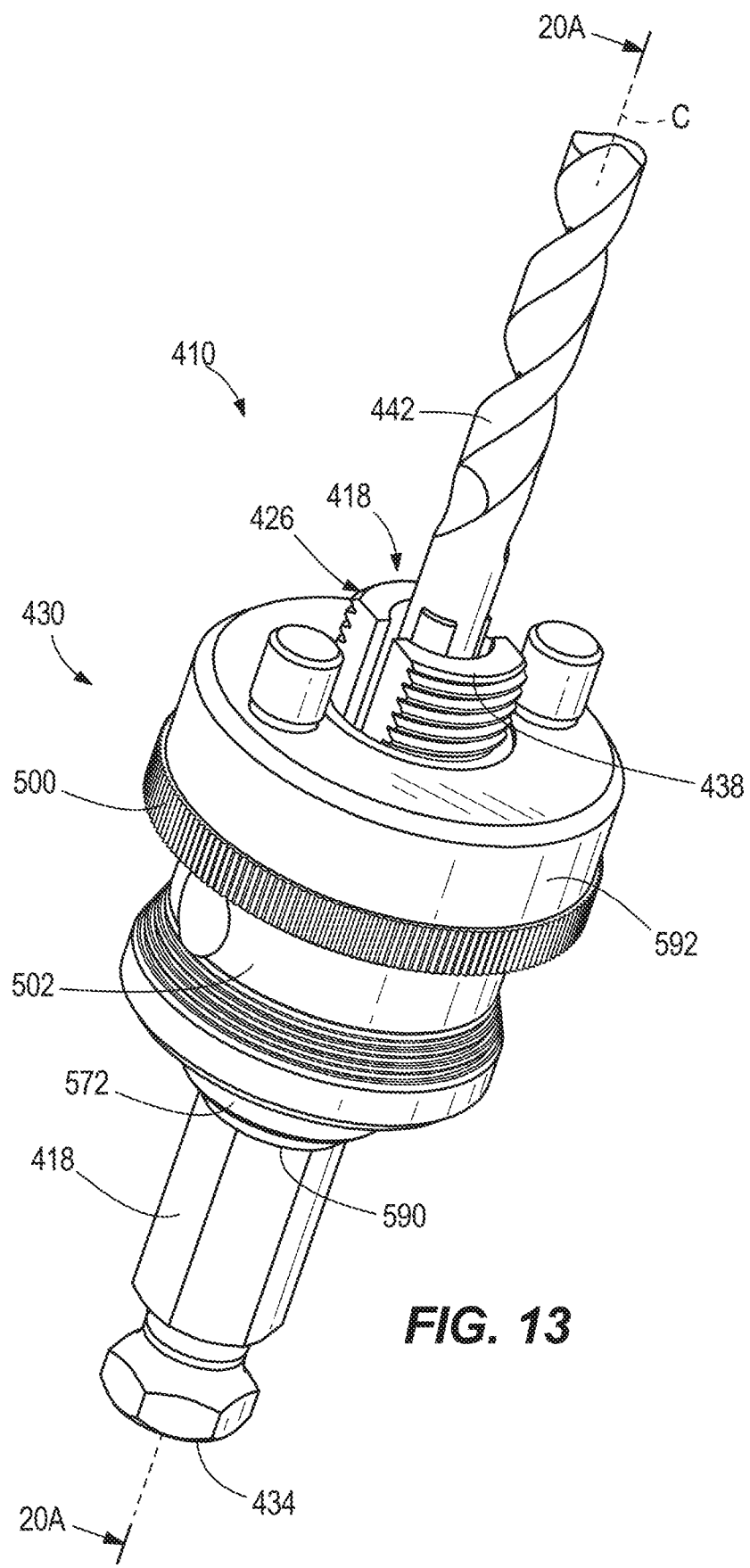
FIG. 13 is a perspective view of yet another arbor embodying the invention.

With reference to FIGS. 13 and 14, the arbor 410 includes a cover 592. The illustrated cover 592 includes a top 594 and an annular side 596 extending from the top 594. The top 594 is positioned adjacent the base portion 506 of each of the arms 498. In addition, the top 594 defines an aperture 598 for the threaded portion 510 of each of the arms 498, and the pilot bit 442 to extend through. The top 594 further defines a plurality of holes 602 corresponding to the holes 474B of the fourth section 460 of the body 422, and the holes 528B of the second washer 526. The holes 602 are configured to receive the drive pins 570B. In particular, the pins 570B include an annular groove 604 in which a portion of the cover 592 (e.g., the top 594) is received within the groove 604. Furthermore, the annular side 596 of the cover 592 is configured to surround an end of each of the base portions 506 of the arms 498. The cover 592 thereby substantially encloses other components of the adjustment mechanism 430. In addition, an end of the annular side 596 is positioned adjacent the first collar 500. As such, movement of the first collar 500 is configured to axially move the cover 592 within the groove 604 of the pins 570B.

In operation, the spring 574 biases the second collar 502 (and the pins 570A) toward the first position (FIG. 20A), in which the pins 570A are positioned within the respective holes 522 (i.e., closer to the second end 522B) of the arms 498. The pins 570A hold the arms 498 in an expanded state by the bias of the spring 474 forcing the second collar 502 to the right from the frame of reference of FIG. 20A. The arbor 410 is in a resting state when the second collar 502 is in the first position.

The user adjusts the second collar 502 from the first position to the second position (FIG. 20B) by sliding the second collar 502 on the body 422 along the longitudinal axis C. Simultaneously, the spring 574 is axially compressed by the sliding movement of the second collar 502. The pins 570A, coupled to the second collar 502, move axially to the left from the frame of reference of FIG. 20A with the sliding movement of the second collar 502. Once the pins 570B are at least partially moved within the respective holes 522 (i.e., toward the first end 522A) of the arms 498, the o-ring 530 pulls the arms 498 together (i.e., toward the longitudinal axis C) into a retracted or collapsed state. Specifically, each base portion 506 of the arms 498 slides radially along the slot 482 between the segments 486 of the guide 478.

The adjustment mechanism 430 adjusts the size (e.g., circumference) of the arbor stem 418 when the second collar 502 is adjusted between the first and second positions. Specifically, the circumference of the arbor stem 418 is larger when the arms 498 are in the expanded state than when in the collapsed state. The adjustment mechanism 430 facilitates the removal of the hole saw from the arbor 410 by adjusting the circumference of the arbor stem 418. Specifically, the collapsed position of the arms 498 makes the arbor stem 418 smaller so that the hole saw can be more easily removed (e.g., unthreaded or slid off) from the arbor 410.

The user may also adjust an axial position of the first collar 500 on the third section 458 of the body 422. Specifically, a gap may be formed between the arbor 410 and the hole saw. The gap may be as large as one thread pitch of the threaded arbor stem 418. The user rotates the first collar 500 about the threads 472 of the third section 458 of the body 422, threading the first collar 500 to the right from the frame of reference of FIG. 20A. The cover 592, adjacent the first collar 500, axially moves along the longitudinal axis C with the movement of the first collar 500, eliminating the gap.

Figure 22:
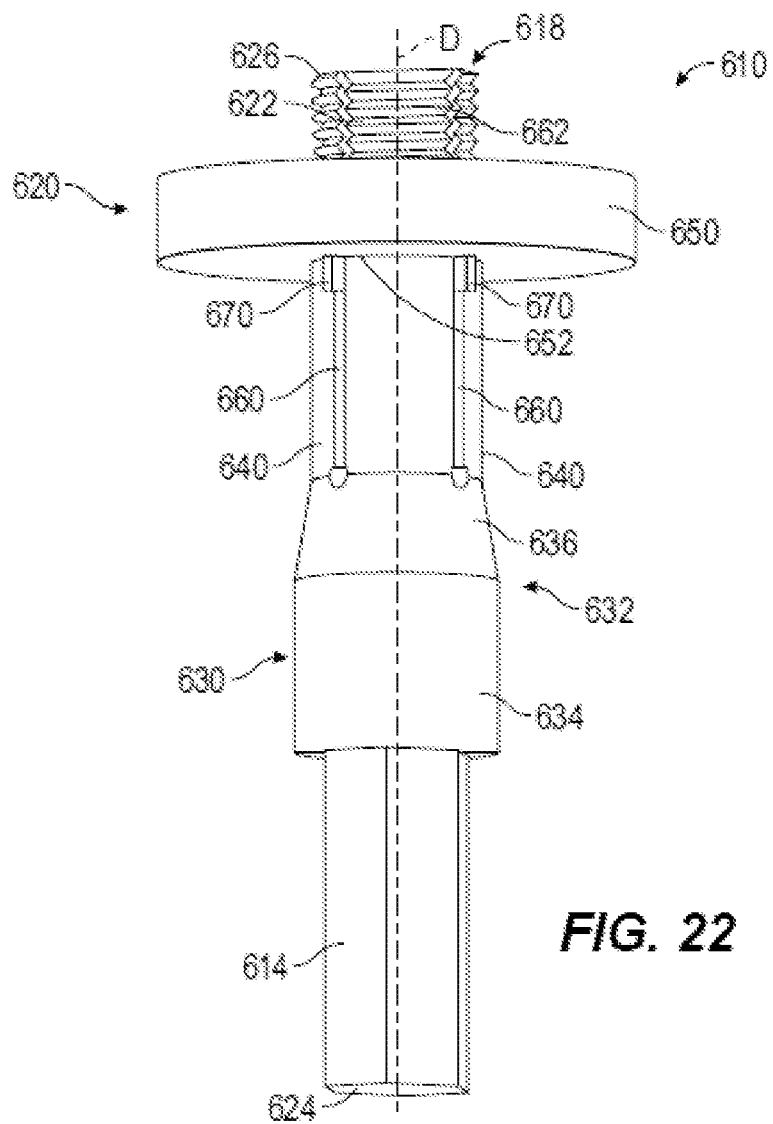
FIG. 22 is a side view of an arbor embodying the invention.

FIG. 22 illustrates still yet another arbor 610 embodying the invention. The arbor 610 includes an arbor shaft 614, an arbor stem 618, and a body 630 coupled between the arbor shaft 614 and the arbor stem 1618. The arbor 610 further defines a longitudinal axis D extending from a first end 624 to a second end 626 of the arbor 610. The first end 1624 has the arbor shaft 614. The second end 626 has the arbor stem 618. Similar to the arbors 10, 210, 410 described above, the illustrated arbor 610 includes an adjustment mechanism 620 to facilitate the release of a hole saw from the arbor 610. Furthermore, the body 630 has a generally cylindrical structure and includes a plurality of segments 634, 636 extending axially from the shaft 614 along the longitudinal axis D. The illustrated body 630 includes a first segment 634 adjacent the arbor shaft 614 and a second segment 636 between the first segment 634 and the arbor stem 618.

The arbor stem 618 includes slots 1660 separating the arbor stem 618 into arms 160. The illustrated arbor stem 618 includes four slots 660 and four arms 640. In other constructions, the arbor 610 may include at least two slots 660 and two arms 640. The arms 640 are fixed at a first end adjacent the second segment 636 of the body 630 and are at least slightly movable relative to each other at a second end distal from the body 630. In other words, the arms 640 are cantilevered from the second segment 636 of the body 630. The slots 660 are configured to receive projections 670, as further discussed below.

The arms 640 further include threaded portions 662, as illustrated in FIG. 22. The threaded portion 662 of each arm 640 forms threads 622 on the arbor stem 618. In other words, the arbor stem 618 is separated by the slots 660 into the arms 640 having the threaded portions 662. Specifically, the threaded portion 662 of each arm 640 has the threads 622 that are receivable within the aperture of the hole saw.

The illustrated arbor 610 also includes an actuator 650. In the illustrated embodiment, the actuator 650 is a collar 650 that surrounds a portion of the arms 640. The collar 650 is configured to move axially relative to the arbor stem 618 along the longitudinal axis D. In some embodiments, the collar 650 may include threads positioned on an inner diameter 652 of the collar 650 to engage the threads 622 of the arbor stem 618. In such embodiments, the collar 650 may move axially along the arbor stem 618 by rotating the collar 650 about the threads 622 of the arbor stem 618. In other embodiments, the collar 650 may slide linearly along the arbor stem 618. The collar 650 is configured to engage the projections 670 positioned within the slots 660 during the axial movement.

The projections 670 are received in the slots 660 defined by the arbor stem 618. Furthermore, the projections 670 extend substantially orthogonally in the slots 660 from the longitudinal axis D. Each projection 670 includes a first end adjacent the threaded arbor stem 618 and a second end opposite the first end. The projections 670 extend axially in the slots 660 from the first end to the second end. Furthermore, the projections 670 are tapered from the second end to the first end such that the projections 670 form "wedges" in the slots 660. The tapered shapes of the projections 670 allow displacement (i.e., movement) of the projections 670 within the slots 660 in response to movement of the collar 650.

Movement of the collar 650 along the longitudinal axis D moves the collar 650 axially relative to the threads 622 of the arms 640. As the collar 650 moves, the collar 650 engages and disengages the projections 670 such that the projections 670 are displaced in the slots 660. The displacement of the projections 670 forces the arms 640 having the threads 622 to move radially inward or outward relative to the longitudinal axis D. The adjustment mechanism 620 utilizes this movement of the arms 640 to facilitate disengaging the hole saw. Specifically, movement of the arms 640 changes an outer circumference of the arbor stem 618 by radial displacement of the projections 670 within the slots 660 between the arms 640.

In operation, as the collar 650 moves from the first ends to the second ends of the projections 670, the projections 670 are displaced radially inwards relative to the longitudinal axis D. As the projections 670 move inwards, the arms 640, including the threads 622 of the arbor stem 618, move radially outward relative to the longitudinal axis D.

Conversely, as the collar 650 moves from the second ends to the first ends of the projections 670, the projections 670 move radially outwards relative to the longitudinal axis D. As the projections 670 move outwards, the arms 640 return to a resting or "collapsed" position (i.e., the arms 640 move radially inward). Therefore, the collar 650 is operable to displace the adjustment mechanism 620 in an outwardly fixed position when the collar 650 is generally closer to the second ends of the projections 670 and in a collapsed position when the collar 650 is generally closer to the first ends of the projections 670.

The adjustment mechanism 620 adjusts the size (e.g., circumference) of the arbor stem 618. The circumference of the arbor stem 618 is larger when in the outwardly fixed position than when in the collapsed position. The adjustment mechanism 620 facilitates the removal of the hole saw from the arbor 610 by adjusting the circumference of the arbor stem 618. Specifically, the collapsed position of the arms 640 makes the arbor stem 618 smaller so that the hole saw can be more easily removed (e.g., unthreaded or slid off) from the arbor 610.

Figure 24:
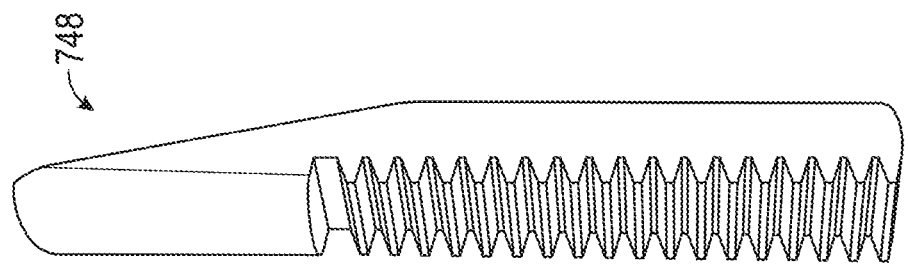
FIG. 24 is a perspective view of the jaw of FIG. 23.
Figure 23:
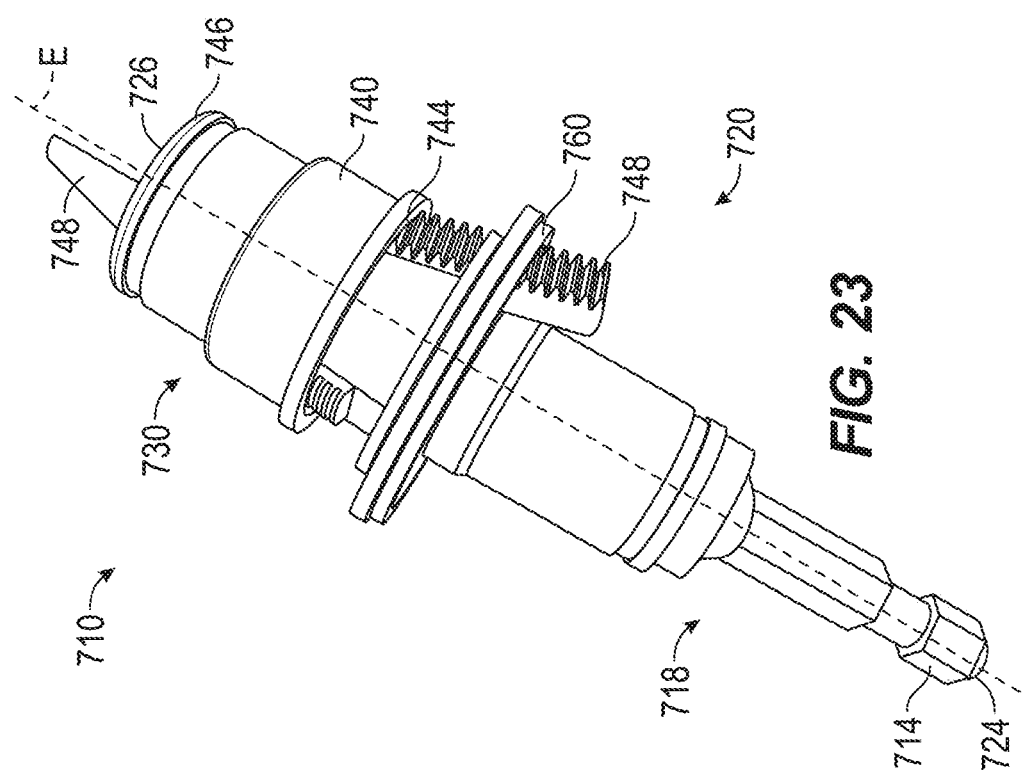
FIG. 23 is a perspective view of a chuck including a jaw.
Figure 25:
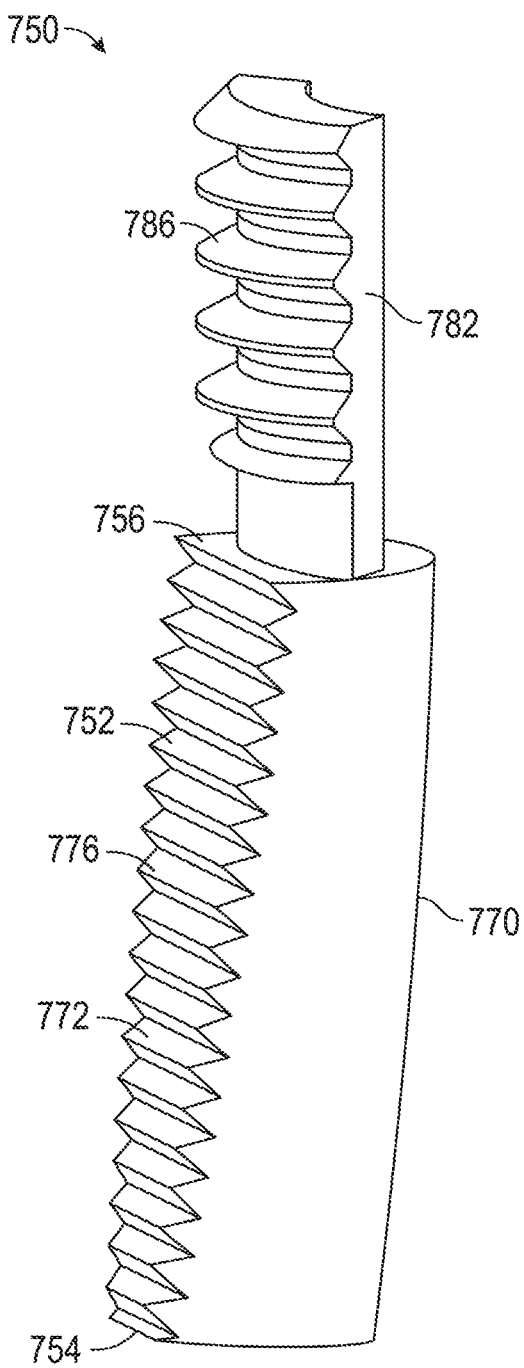
FIG. 25 is a perspective view of another jaw for use with an arbor embodying the invention.

FIGS. 23-25 illustrate another arbor 710 embodying the invention. The illustrated arbor 710 is configured as a drill chuck, but it should be apparent based on the following description that the arbor 710 can be reconfigured to releasably attach to a hole saw. Similar to the arbors 10, 210, 410, 610 described above, the illustrated arbor 710 includes an adjustment mechanism 720 to facilitate the release of a hole saw from the arbor 710. The arbor 710 includes an arbor shaft 714, a body 718 coupled to the shaft 714, and a nose 730 coupled to the body 718. The arbor 710 has a first end 724 including the body 718 and the shaft 714, and a second end 726 including the nose 730. The arbor 710 further defines a longitudinal axis E extending from the first end 724 to the second end 726. The body 718 and the nose 730 extend axially relative to the longitudinal axis E. Furthermore, the illustrated body 718 has a generally cylindrical structure.

The illustrated arbor 710 further includes a sleeve 740 (FIG. 23). The sleeve 740 has a generally cylindrical shape and is positioned on the nose 730 of the body 718. The sleeve 740 includes a first side 744 and a second side 746. The second side 746 corresponds to the second end 726 of the arbor 710. The sleeve 740 is configured to enclose the nose 730 at the second end 726 of the arbor 710.

The illustrated arbor 710 further includes jaws 750 positioned within the sleeve 740. FIG. 24 illustrates a conventional jaw 748 to be used with a drill chuck. FIG. 25 illustrates the jaw 750 for use with the arbor 710 embodying the invention. As shown in FIG. 25, each jaw 750 includes a first portion 752 having a first end 754 and a second end 756. The first end 754 extends outward from the first side 744 of the sleeve 740. The second end 756 is positioned near the second side 746 of the sleeve 740. Furthermore, the first portion 752 of each jaw 750 includes an inner surface 770 facing toward the longitudinal axis E of the arbor 710 and an outer surface 772 facing away from the longitudinal axis E. The outer surface 772 of the first portion 752 includes threads 776. Each jaw 750 further includes a second, threaded portion 782 extending from the second end 756. The threaded portions 782 include threads 786. Specifically, the threads 786 of the second portions 782 of the jaws 750 are receivable within the aperture of the hole saw.

The first portion 752 of each jaw 750 is coupled to the second portion 782 such that the first portion 752 extends at an angle from the second portion 782 relative to the longitudinal axis E. In particular, the second portion 782 of each jaw 750 extends generally parallel to the longitudinal axis E, while the first portion 752 of each jaw 750 extends radially outwardly from the second portion 782 at an oblique angle relative to the longitudinal axis E. The angled configuration of the first portions 752 relative to the second portions 782 allows the second portions 782 to spread apart from each other when the first portions 752 are compressed together, and allows the second portions 782 to move toward each other when the first portions 752 are spread apart.

As shown in FIG. 23, the arbor 710 includes a collar 760 positioned around the first portions 752 of the jaws 750 near the first ends 754. The collar 760 is configured to move axially along the body 718 of the arbor 710 relative to the longitudinal axis E. In some embodiments, the collar 760 may include threads positioned on an inner diameter of the collar 760 that engage the threads 776 of the first portion 752 the jaws 750. In such embodiments, the collar 760 may move axially along the body 718 by rotating about the threads 776 of the jaws 750. In other embodiments, the collar 760 may slide linearly along body 718.

Axial movement of the collar 760 along the first portions 752 of the jaws 750 causes radial movement of the second portions 782. As the collar 760 moves axially along the jaws 750, the jaws 750 move radially inward and outward. The adjustment mechanism 720 utilizes the movement of the jaws 750 to facilitate disengaging the hole saw. Specifically, the movement of the jaws 750 changes an outer circumference formed by the second, threaded portions 782 of the jaws 750.

In operation, as the collar 760 moves from the first ends 754 to the second ends 756 of the first portions 752 of the jaws 750, the second portions 782 of the jaws 750 collapse radially inwards towards each other relative to the longitudinal axis E. Therefore, the second portions 782 of the jaws 750 are in a collapsed position when the collar 760 is generally closer to the second ends 754 of the first portions 752 of the jaws 750.

Conversely, as the collar 750 moves from the second ends 756 to the first ends 754 of the jaws 750, the second portions 782 of the jaws 750 are spread radially outwardly away from each other. Therefore, the second portions 782 of the jaws 750 are held in an outwardly fixed position when the collar 760 is generally closer to the first ends 754 of the first portions 752 of the jaws 750.

The adjustment mechanism 720 adjusts the size (e.g., circumference) of the second portions 782 of the jaws 750. The circumference of the second portions 782 is generally larger when in the outwardly fixed position than when in the collapsed position. The adjustment mechanism 720 facilitates the removal of the hole saw from the second portions 782 of the jaws 750 of the arbor 710 by adjusting the circumference of the second portions 782. Specifically, the collapsed position of the jaws 750 makes the circumference of the second portions 782 smaller so that the hole saw can be more easily removed (e.g., unthreaded or slid off) from the second portions 782 of the jaws 750.

FIGS. 26-31 illustrate yet another arbor 810 embodying the invention. The arbor 810 includes an arbor shaft 814, an arbor stem 818 opposite the shaft 814, and a body 830 coupled between the arbor shaft 814 and the arbor stem 818. The illustrated arbor 810 further includes an adjustment mechanism 820 to facilitate the release of a hole saw from the arbor 810, similar to the arbors 10, 210, 410, 610, 710 described above. The arbor 810 defines a longitudinal axis F extending from a first end 824 to a second end 826 of the arbor 810. The first end 824 has the shaft 814, and the second end 86 has the arbor stem 818.

With reference to FIGS. 26-29, the illustrated body 830 has a generally cylindrical structure and includes a top surface 836 positioned at the second end 826 of the arbor 810 adjacent the arbor stem 818. The body 830 extends axially from the top surface 836 towards the first end 824. Furthermore, drive pins 878 extend axially from the top surface 836 towards the arbor stem 818. The drive pins 878 correspond to holes defined on the hole saw.

Figure 28:
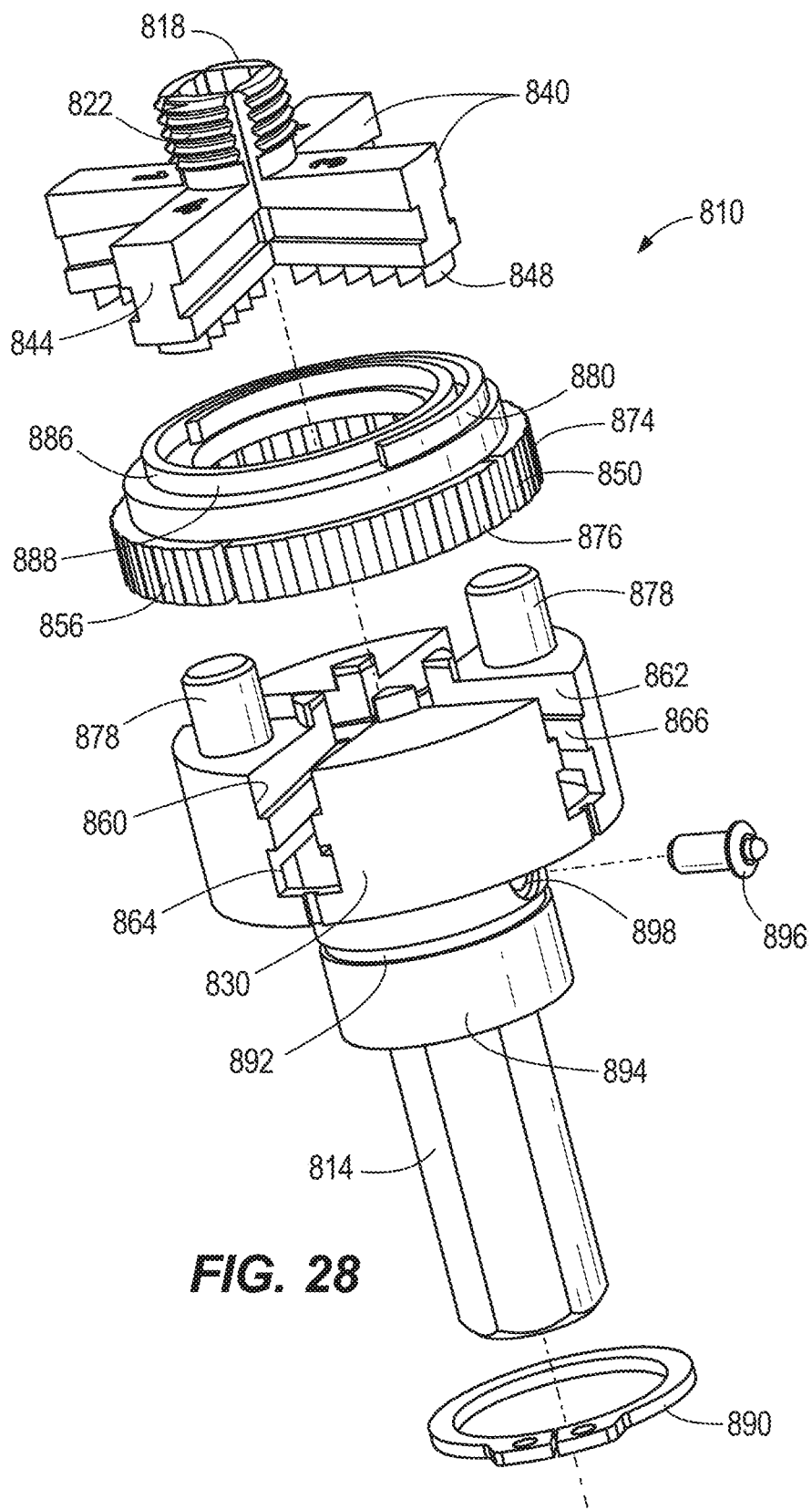
FIG. 28 is an exploded view of the arbor of FIG. 26, the arbor including a body, arms, and a collar.
Figure 29:
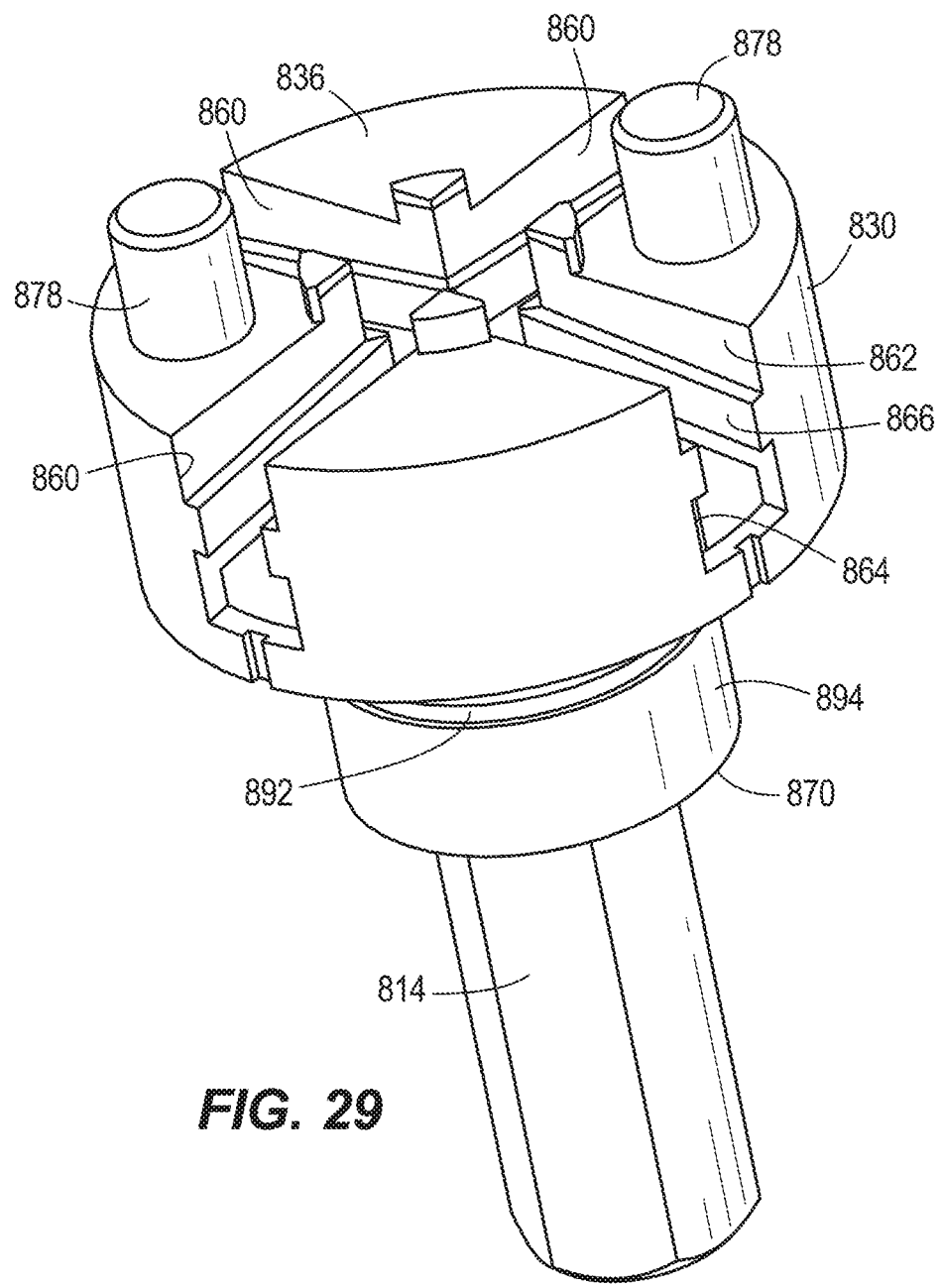
FIG. 29 is a perspective view of the body of the arbor shown in FIG. 28.
Figure 30:
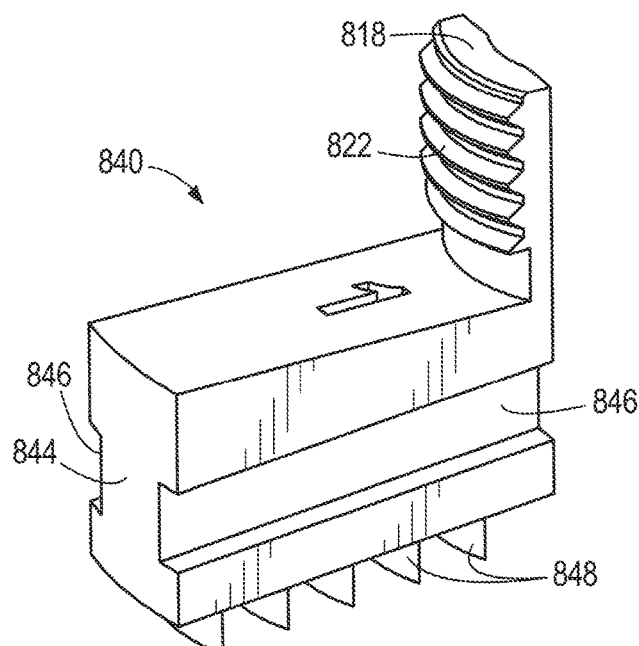
FIG. 30 is a perspective view of one of the arms of the arbor shown in FIG. 28.

With reference to FIGS. 28 and 29, the body 830 defines a plurality of channels 860 positioned radially around the longitudinal axis F. The channels 860 extend axially from the top surface 836 of the body 830 towards the first end 824. Each channel 860 has a first side surface 862 and a second side surface 864 opposite the first side surface 862. The first and second side surfaces 862, 864 are generally parallel and extend radially outward from the longitudinal axis F. Moreover, each of the first and second side surfaces 862, 3864 includes a track 866 extending generally orthogonally from the first and second side surfaces 862, 864. The channels 860 are used with the adjustment mechanism 820, as further discussed below.

Figure 26:
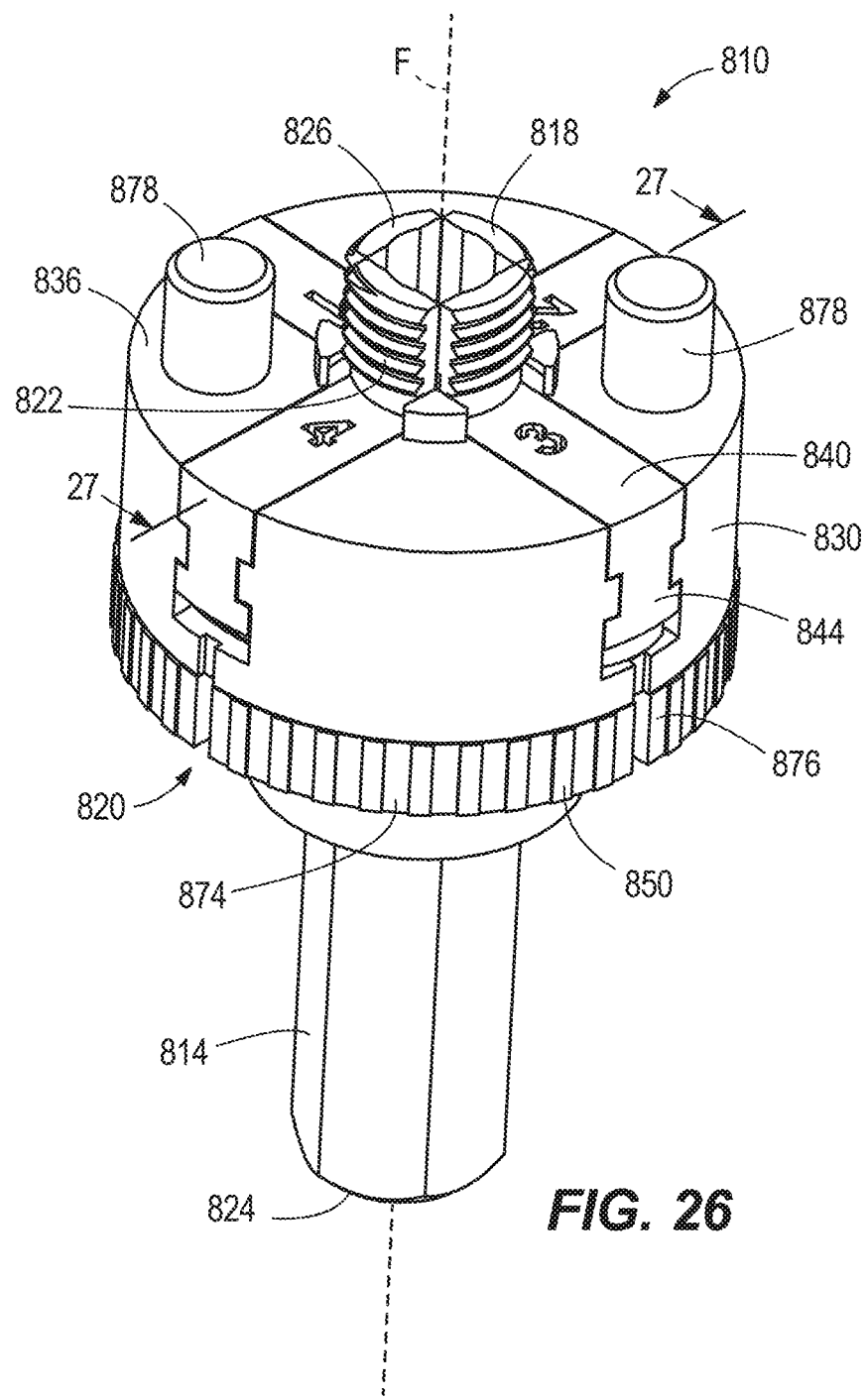
FIG. 26 is a perspective view of another arbor embodying the invention.
Figure 27:
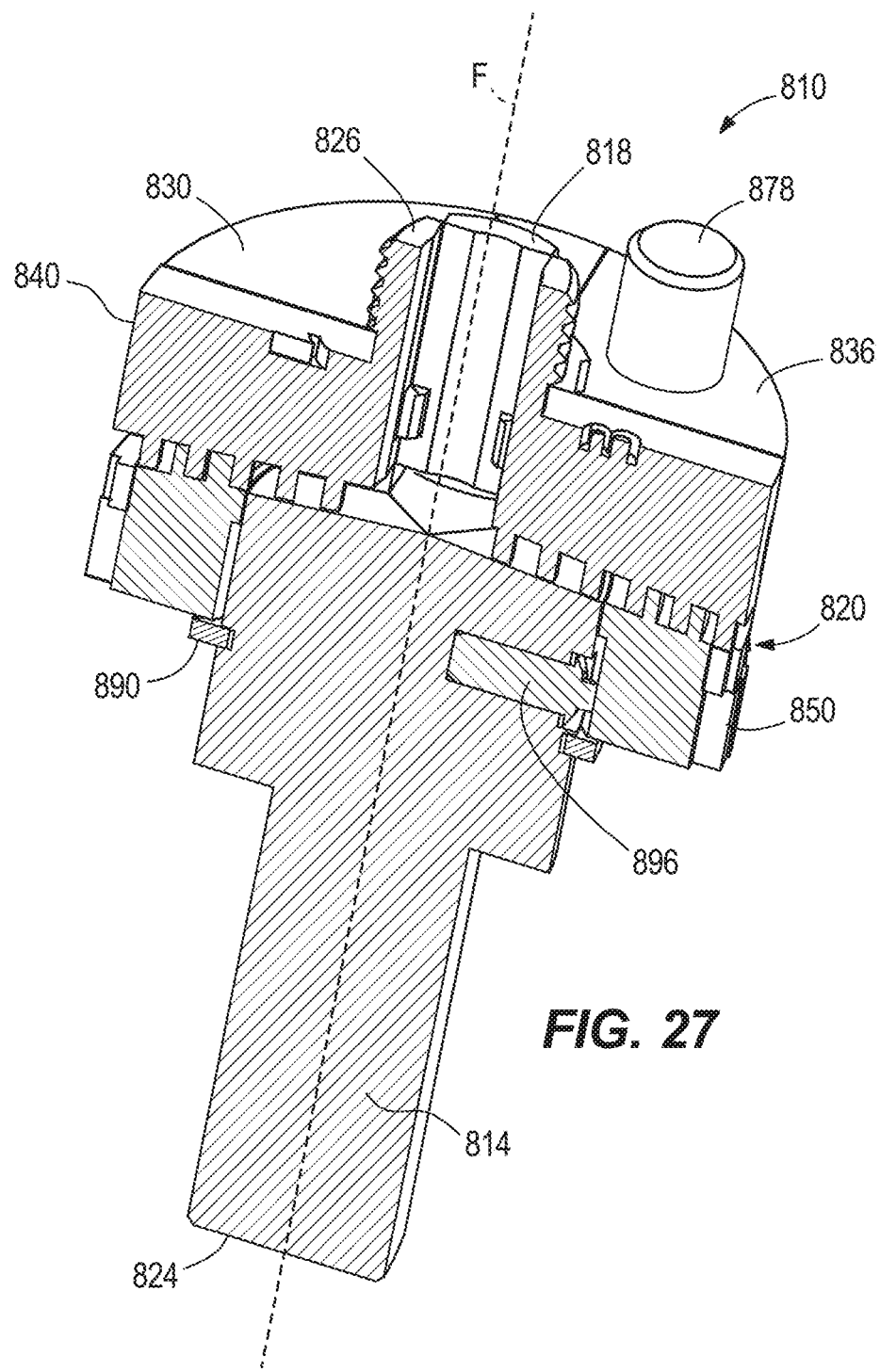
FIG. 27 is a perspective cross-sectional view of the arbor taken along line 27-27 of FIG. 26.

With reference to FIGS. 26-28, the adjustment mechanism 820 includes a plurality of arms 840 and a scroll gear 880. The plurality of arms 840 correspond to the plurality of channels 860 defined by the body 830. The illustrated arbor 810 includes four channels 860 and four arms 840 receivable in the channels 860 (FIG. 26). In other constructions, the arbor 810 may have at least two or more channels 860 and arms 840.

With reference to FIGS. 30A-30B, each arm 840 includes a base portion 844 and a threaded portion 822. The illustrated base portion 844 defines two recesses 846. The recesses 846 receive the tracks 866 positioned on the first and second sides 862, 364 of each channel 860. The threaded portion 822 extends generally perpendicularly from the base portion 844. Furthermore, the threaded portion 822 of each arm 840 forms a part the arbor stem 818, as shown in FIG. 26. The arbor stem 818 is receivable by the aperture of the hole saw.

With reference to FIGS. 28 and 30A-30B, each arm 840 includes a plurality of protrusions 848 extending from an opposite side of the body than the threaded portion 822. The protrusions 848 extend axially toward the scroll gear 880. In the illustrated embodiment, each arm 840 includes six protrusions 848. In other embodiments, each arm 840 may include fewer or more protrusions 848. As shown in FIG. 30B, the illustrated protrusions 848 have generally curved shapes, and are narrower at the ends of the protrusions 848 than at the middle.

Figure 31:
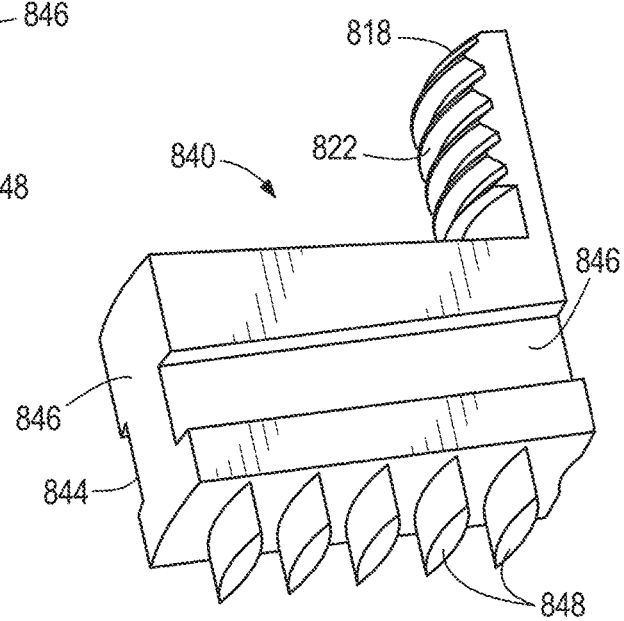
FIG. 31 is another perspective view of the arm of FIG. 30.
Figure 32:
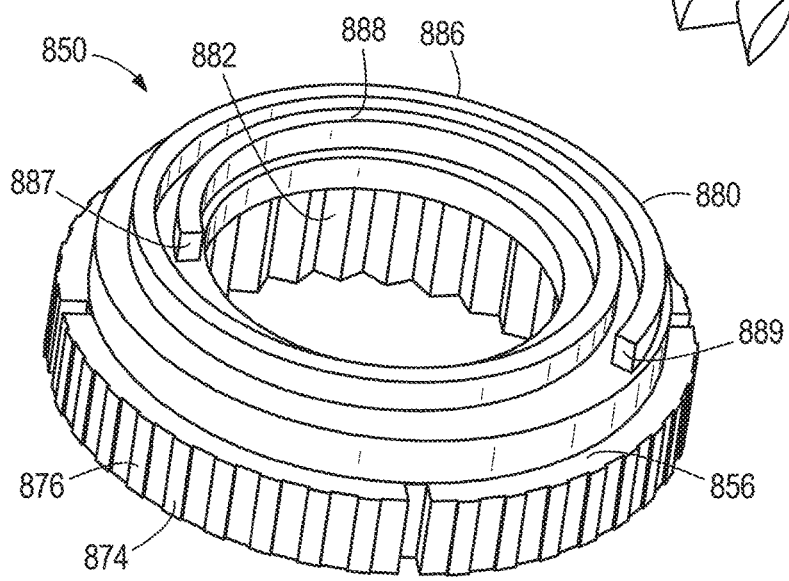
FIG. 32 is a perspective view of the collar of the arbor shown in FIG. 28.
Figure 33:
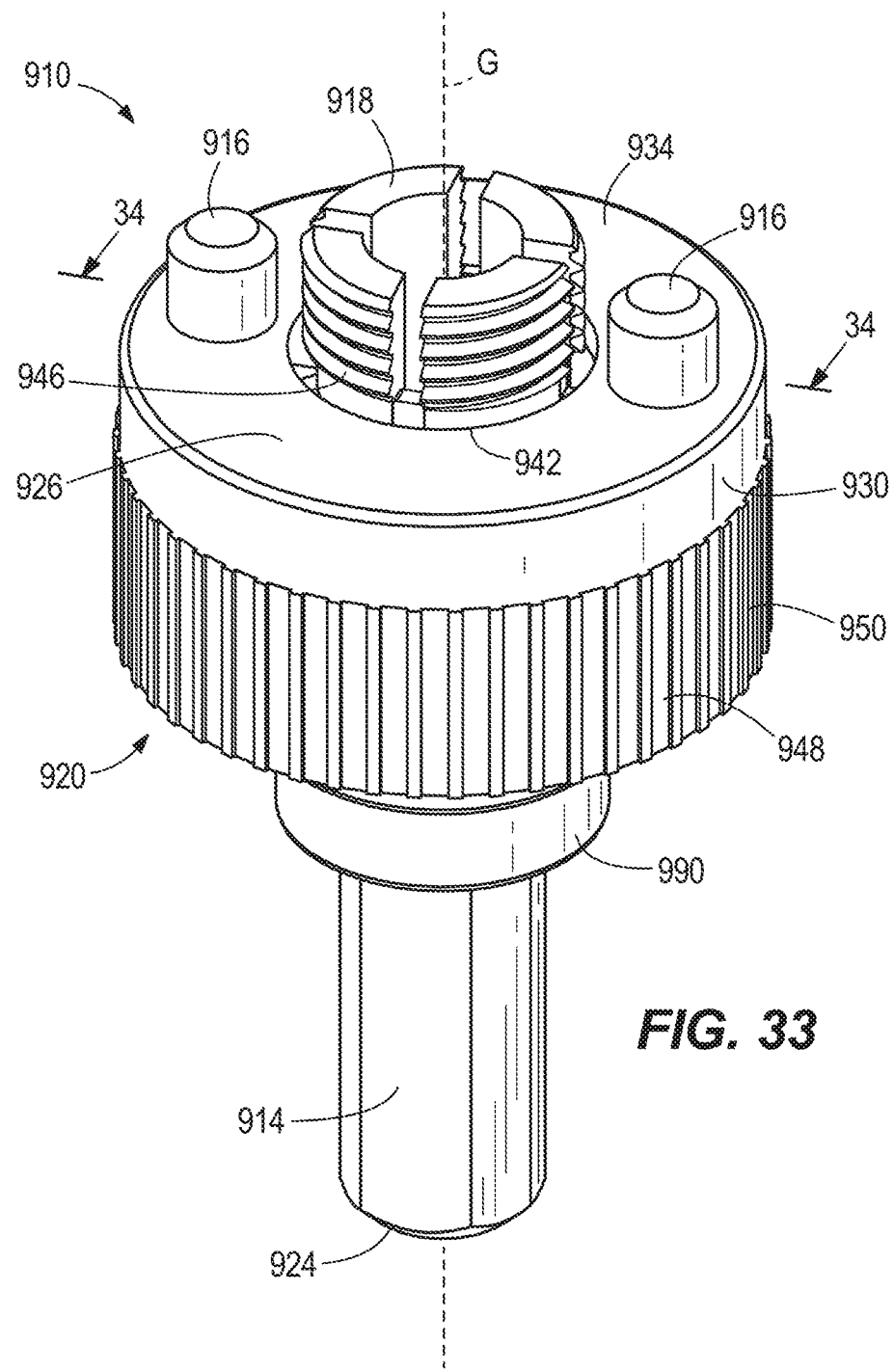
FIG. 33 is a perspective view of yet another arbor embodying the invention.

As illustrated in FIGS. 28 and 31, the arbor 810 includes an actuator 850 positioned on the body 830. In the illustrated embodiment, the actuator 850 is a collar. The collar 850 includes an annular body portion 856 having a grip surface 874. The illustrated grip surface 874 has ridges 876 positioned on the collar 850 (FIG. 31). The collar 850 rotates on the body 830 about the longitudinal axis F. In particular, the ridges 876 are configured to provide a textured surface to be used by fingers of the user to help rotate the collar 850. The grip surface 874 may have other textured surfaces to aid the user in rotation of the collar 850.

As illustrated in FIG. 31, the collar 850 further includes a spiral segment 886 extending axially from the body portion 856 toward the top surface 836 of the body 830. In the illustrated embodiment, the spiral segment 886 of the collar 850 has a continuous wall 888 that spirals radially outward from an inner end 887 to an outer end 889. Specifically, the spiral segment 886 receives the protrusions 848 formed on the base portion 844 of the arms 840.

With continued reference to FIG. 31, the spiral segment 886 forms the scroll gear 880. The protrusions 848 formed on the arms 840 are engaged between gaps of the continuous wall 888 of the spiral segment 886. As the spiral segment 886 rotates, the protrusions 848 follow the spiraling continuous wall 888. The arms 840 move radially (e.g., outward or inward) relative to the longitudinal axis F due to the spiral movement of the spiral segment 886. Furthermore, the arms 840 move radially on the tracks 866 formed in the channels 860. The adjustment mechanism 820 utilizes this movement of the arms 840 to facilitate disengaging the hole saw from the arbor stem 818. Specifically, the movement of the arms 840 changes an outer circumference of the threaded segments 822 of the arbor stem 818 by radial displacement of the arms 840 due to the rotation of the collar 850 having the scroll gear 880.

With reference to FIGS. 28-29, the body 830 includes an annular groove 892 defined by a surface 894 of the body 830. The annular groove 892 receives a retaining ring 890 positioned adjacent the collar 850. The retaining ring 890 is configured to hold the collar 850 on the body 830 while allowing the collar 850 to rotate about the body 830.

With reference to FIG. 28, the body 830 defines a bore 898. The bore 898 receives a plunger 896 of the arbor 810. The plunger 896 may include, for example, a ball detent mechanism that engages an inner surface 882 (FIG. 31) of the collar 850. The ball detent mechanism is configured to inhibit the collar 850 from spinning freely during use of the adjustment mechanism 820. Furthermore, the ball detent mechanism may hold the collar 850 in discrete radial positions.

In operation, as the collar 850 rotates in one direction, the protrusions 848 of the arms 840 follow the scroll gear 880 radially outward from the inner end 887 to the outer end 889 of the continuous wall 888. The arms 840 move radially on the tracks 866 in the channels 860 and are displaced into an outward position by the spiral movement of the protrusions 848 engaged by the spiral segment 886 of the collar 850. As such, the threaded portions 822 of the arms 840 are spread apart.

Conversely, as the collar 850 rotates in the other direction, the protrusion 848 of the arms 840 follow the scroll gear 880 radially inward from the outer end 889 to the inner end 887 of the continuous wall 888. The arms 840 move radially on the tracks 866 in the channels 860 and are displaced into a collapsed position by the spiral movement of the protrusions 848 engaged by the spiral segment 886 of the collar 850. As such, the threaded portions 822 of the arms 840 are moved together.

The adjustment mechanism 820 adjusts the size (e.g., circumference) of the threaded portions 822 of the stem 818. The circumference of the arbor stem 818 is generally larger when in the outward position than when in the collapsed position. The adjustment mechanism 820 facilitates the removal of the hole saw from the arbor 810 by adjusting the circumference of the arbor stem 818. Specifically, the collapsed position of the arms 840 makes the arbor stem 818 smaller so that the hole saw can be more easily removed (e.g., unthreaded or slid off) from the arbor 810.

FIGS. 33-39 illustrate yet still another arbor 910 embodying the invention. The arbor 910 includes a shaft 914, a body 930 coupled to the shaft 914, and an arbor stem 918. The illustrated arbor 910 further includes an adjustment mechanism 920 to facilitate the release of a hole saw from the arbor 910, similar to the arbors 10, 210, 410, 610, 710, and 810, discussed above. The arbor 910 has a first end 924 and a second end 926. The first end 924 has the shaft 914, and the second end 926 has the arbor stem 918. The arbor 910 further defines a longitudinal axis G extending between the first end 924 and the second end 926.

Figure 34:
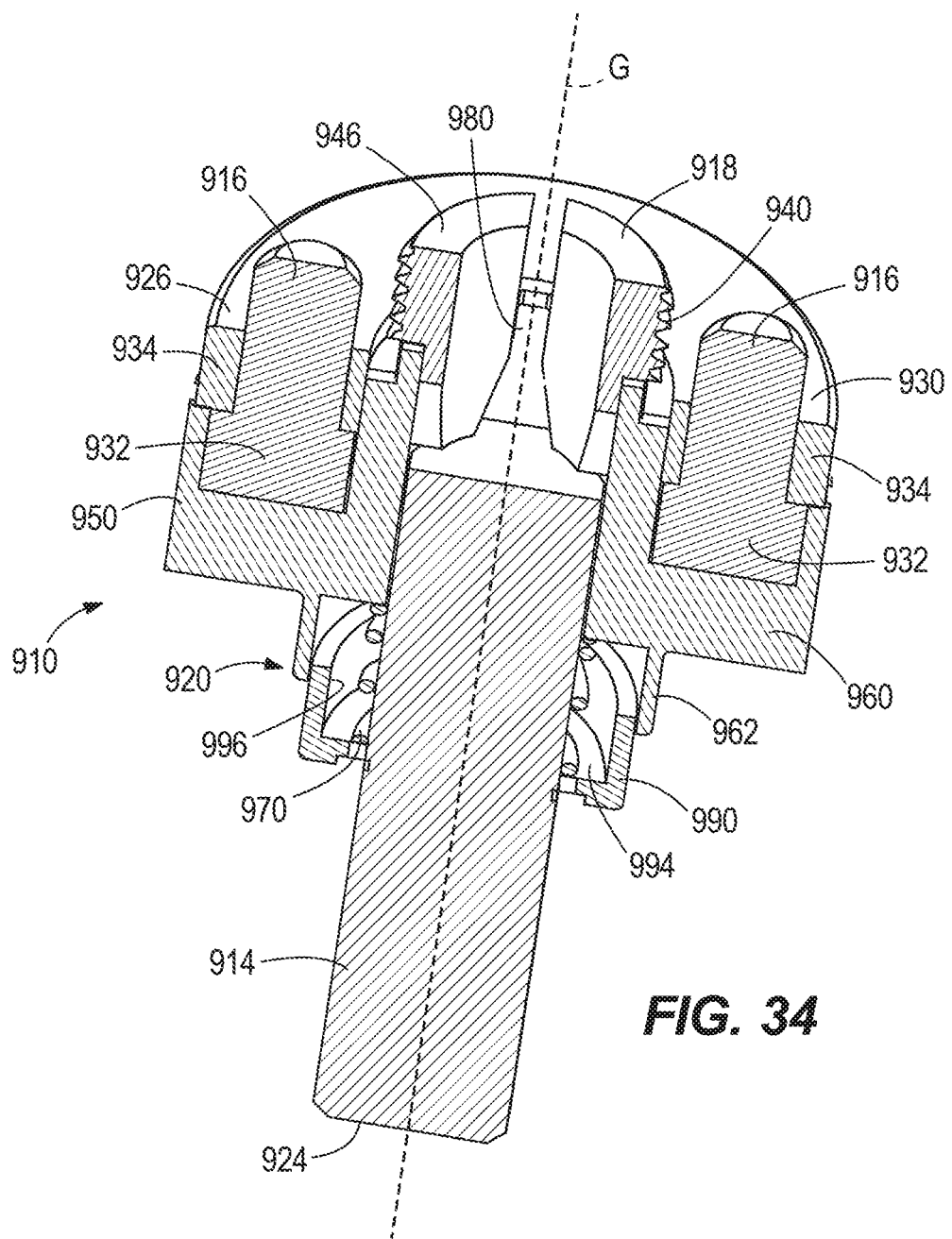
FIG. 34 is a perspective cross-sectional view of the arbor taken along line 34-34 of FIG. 33.
Figure 35:
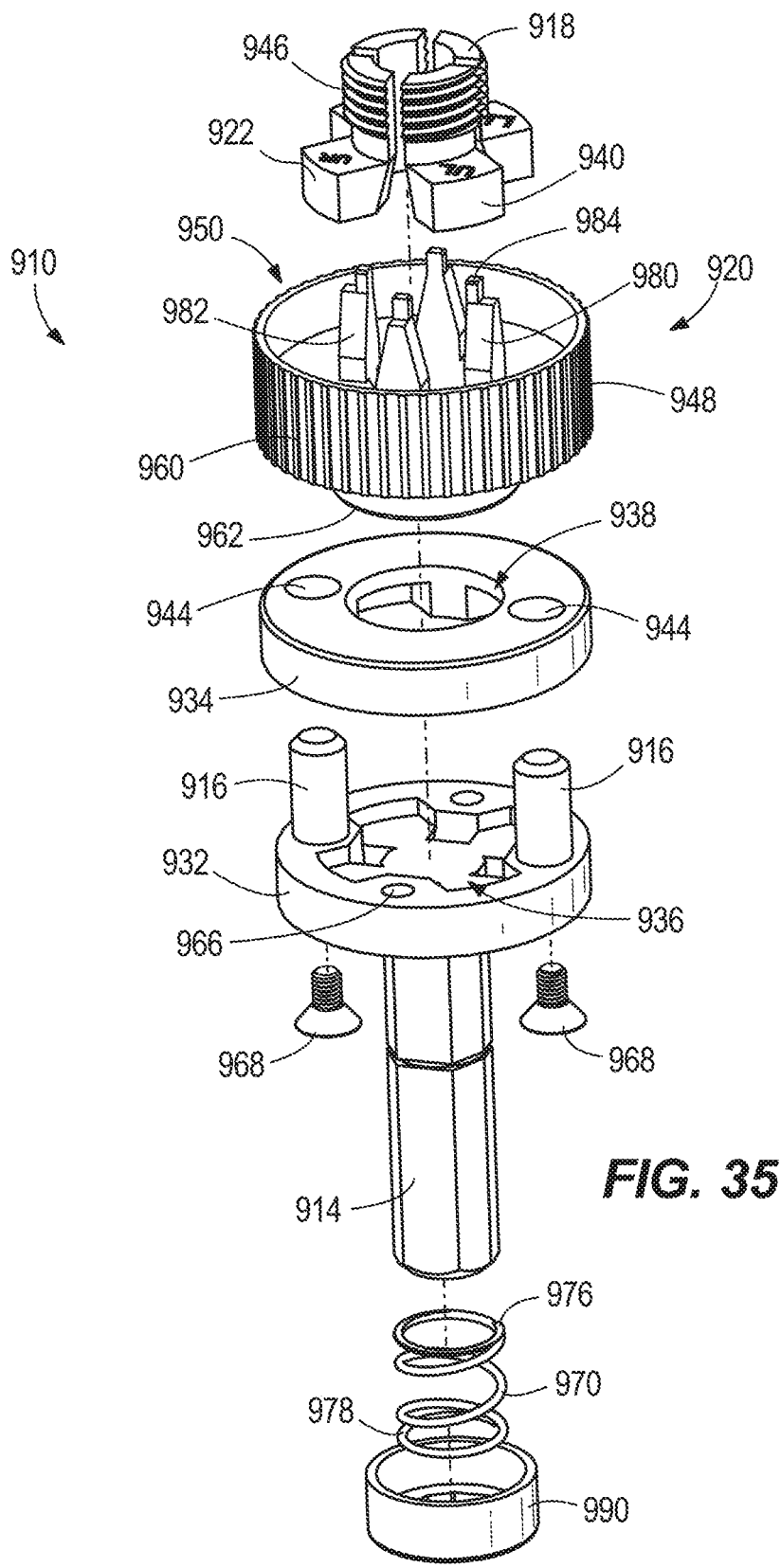
FIG. 35 is an exploded view of the arbor of FIG. 33, the arbor including a body, arms, a collar, and a spring.

With reference to FIGS. 34-35, the illustrated body 930 includes a lower portion 932 and an upper portion 934 coupled to the lower portion 932. The arbor shaft 914 extends from the lower portion 932. Drive pins 916 extend axially from a surface of the lower portion 932 in a direction opposite the arbor shaft 914. The lower portion 932 further defines a first cavity 936. In addition, the lower portion 932 defines two holes 966. Each hole 966 receives a fastener 968 (e.g., a bolt, a screw, etc.) to couple the lower and upper portions 932, 934 together. In other embodiments, the lower and upper portions 932, 934 may be coupled by other suitable means.

With continued reference to FIG. 35, the upper portion 934 of the illustrated body 930 defines a second cavity 938 corresponding to the first cavity 936 of the lower portion 932. The first and second cavities 936, 938 extend radially outward from the longitudinal axis G. Furthermore, the first and second cavities 936, 938 are used with the adjustment mechanism 920, as further discussed below. The illustrated upper portion 934 defines two apertures 944. The apertures 944 receive the drive pins 916.

With reference to FIGS. 34-35, the adjustment mechanism 920 includes a plurality of arms 940, an actuator 950 positioned on the body 930, and a spring 970 located within the collar 950. The arms 940 correspond to a shape defined by the first and second cavities 936, 938 in the body 930. The illustrated arbor 910 includes four arms 940 circumferentially spaced about the longitudinal axis G. In other constructions, the arbor 910 may have at least two arms 940.

Figure 36:
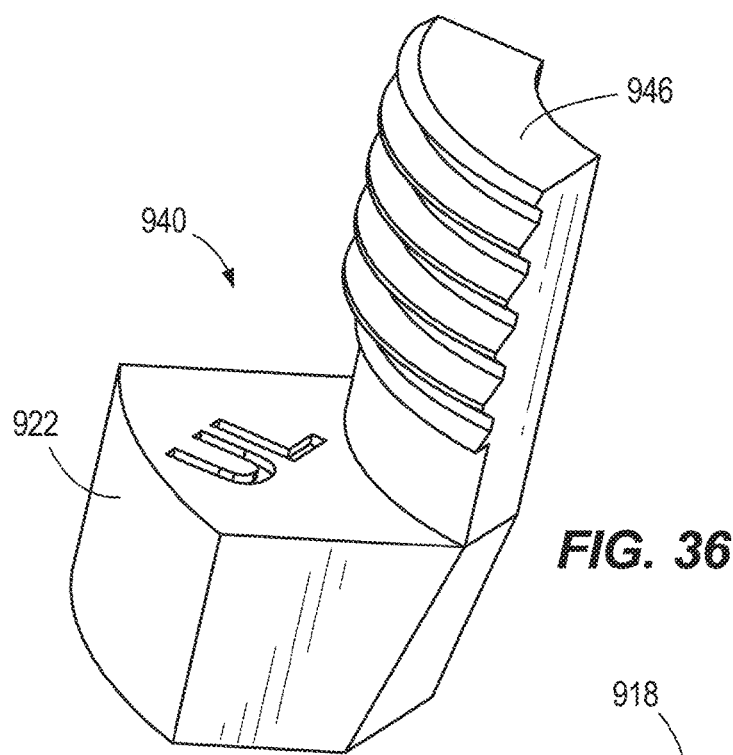
FIG. 36 is a perspective view of one of the arms of the arbor shown in FIG. 35.

With reference to FIG. 36, each arm 940 includes a main section 922 and a threaded section 946. The second cavity 938 of the upper portion 934 (FIG. 34) is configured to enclose the main sections 922 of the arms 940. The threaded sections 946 extend axially from the main sections 922 through a center aperture defined by the upper portion 934 of the body 930. The threaded sections 946 form the arbor stem 918 of the arbor 910. The arbor stem 918 corresponds to the aperture of the hole saw.

With reference to FIGS. 34-35, the actuator 950 includes a collar positioned on the body 930. The illustrated collar 950 has a main segment 960 and a lower segment 962 extending axially from the main segment 960 towards the first end 924. The main segment 960 is positioned on the lower portion 932 of the body 930. The main segment 960 further includes ridges 948 similar to the ridges 876 disclosed in the previous arbor 810. The lower segment 962 extends radially around the shaft 914 of the arbor 910 such that a cylindrical gap 996 is formed between the lower segment 962 and the shaft 914.

Figure 37:
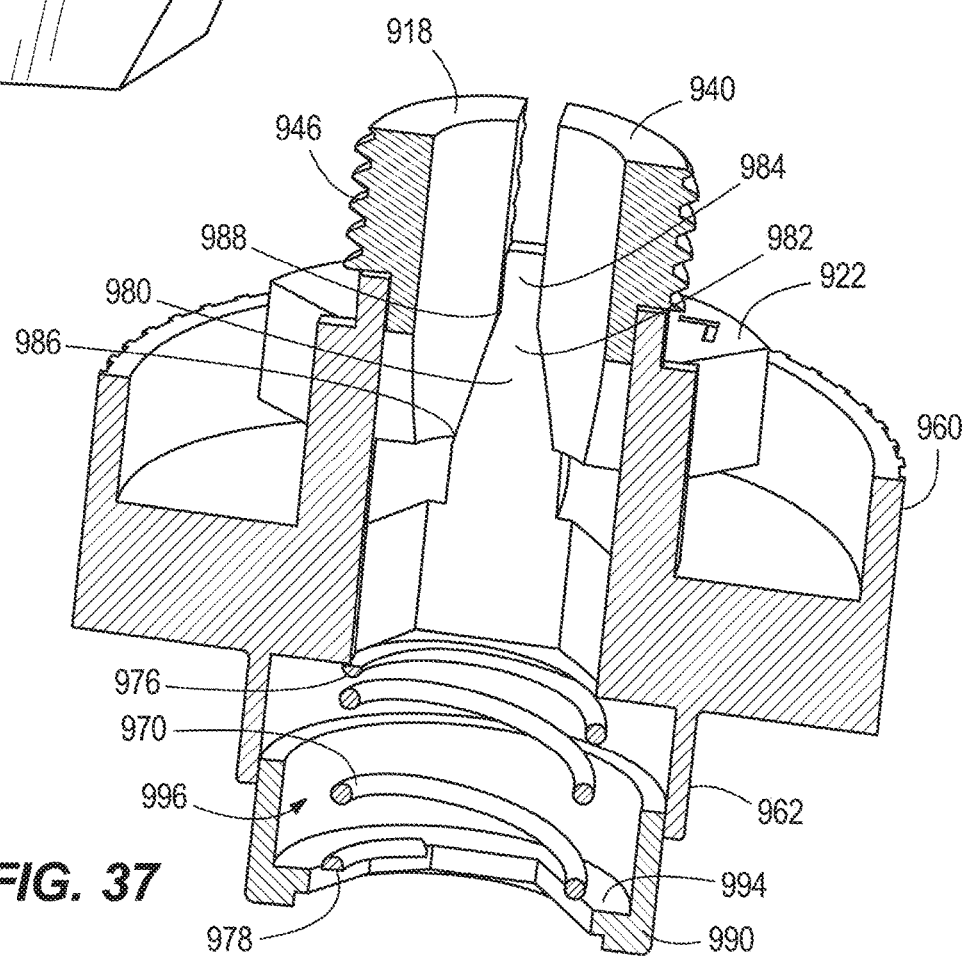
FIG. 37 is a cross-sectional view of the collar enclosing the body and the spring of the arbor.

With reference to FIGS. 35 and 37, the collar 950 includes projections 980 extending axially toward the arbor stem 918 from the main segment 960 of the collar 950. Each projection 980 includes a first portion 982 and a second portion 984 coupled to the first portion 982. The first portion 982 includes a first end 986 adjacent the collar 950 and a second end 988 opposite the first end 986. The first portion 982 is tapered from the first end 986 to the second end 988. Furthermore, the second portion 984 is coupled to the second end 988 of the first portion 982 of each projection 980. The projections 980 are positioned in between each arm 940 of the arbor 910. The projections 980 are configured to move axially with the collar 950 relative to the longitudinal axis G.

With continued reference to FIGS. 35 and 37, the arbor 910 further includes a retaining flange 990 positioned adjacent the lower segment 962 of the collar 950. The lower segment 962 may enclose a portion of the retaining flange 990. Furthermore, the retaining flange 990 has a surface 994. As shown in FIG. 37, the cylindrical gap 996 is defined between the surface 994 of the retaining flange 990 and the main segment 960 of the collar 950. The shaft 914 of the arbor 910 extends axially through a center of the retaining flange 990, the cylindrical gap 994, and the lower portion 932 of the body 930 enclosed by the collar 950.

As illustrated in FIG. 37, the spring 970 is positioned within the cylindrical gap 996 and between the shaft 914 and the lower segment 962 of the collar 950. The spring 970 includes a first end 976 adjacent the main segment 960 of the collar 950 and a second end 978 adjacent the surface 994 of the retaining flange 990. In the illustrated embodiment, the spring 970 is a coil spring wrapped around the shaft 914. In other embodiments, the adjustment mechanism 920 may additionally or alternatively include other types of springs. The collar 950 is configured to slide axially on the body 930 parallel to the longitudinal axis G such that the spring 970 axially compresses or expands relative to the retaining flange 990.

Figure 39:
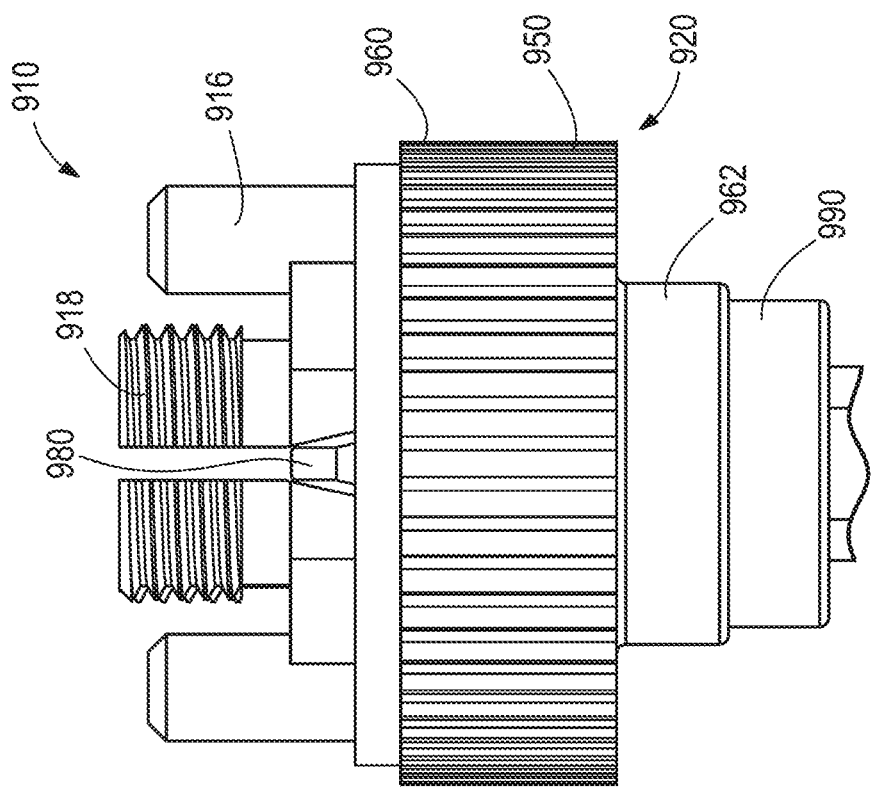
FIG. 39 is a side view of the arbor of FIG. 33 in a second position.
Figure 38:
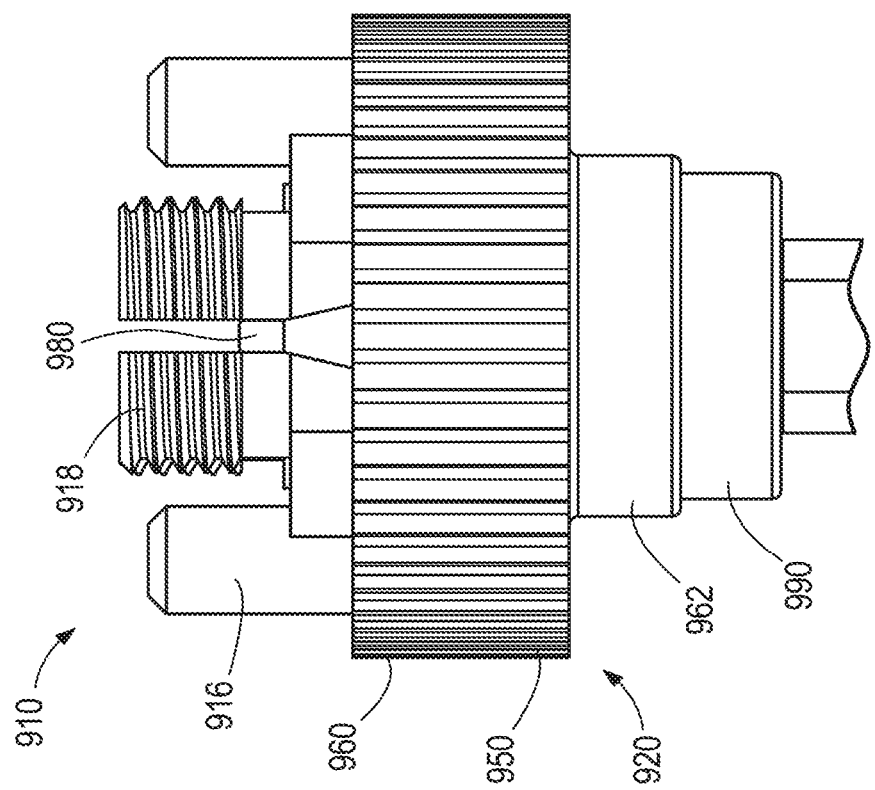
FIG. 38 is a side view of the arbor of FIG. 33 in a first position.

With reference to FIGS. 38-39, the spring 970 is axially compressed by the sliding movement of the collar 950 on the body 930. The projections 980, coupled to the collar 950, are moved axially upwards and downwards corresponding to the sliding movement of the collar 950. The projections 980 are positioned between the arms 940 such that as the projections 980 are moved upwards or downwards, the projections 980 displace the arms 940. The tapered shapes of the projections 980 allow radial displacement (i.e., movement) of the arms 940 within the first and second cavities 936, 498 in response to the movement of the collar 950. The adjustment mechanism 940 utilizes this displacement of the arms 940 to facilitate disengaging the hole saw from the arbor stem 918. Specifically, the movement of the arms 940 changes an outer circumference of the arbor stem 918 by radial displacement of the arms 940 due to the axial movement of the collar 950.

In operation, as the collar 950 axially slides in one direction, the projections 980 are driven axially upwards by the movement of the collar 950 on the body 930 (FIG. 38). The arms 940 move radially outward in the first and second cavities 936, 938 into an outward position by the axial movement of the projections 980 positioned between each arm 940.

Conversely, as the collar 950 axially slides in the other direction, the projections 980 are driven axially downwards by the movement of the collar 950 on the body 930 (FIG. 39). The arms 940 move (i.e., collapse) radially inward in the first and second cavities 936, 938 into a collapsed position when the projections 980 are driven axially downwards.

The adjustment mechanism 920 adjusts the size (e.g., circumference) of the threaded portions 946 of the arbor stem 918. The circumference of the arbor stem 918 is generally larger when in the outward position than when in the collapsed position. The adjustment mechanism 920 facilitates the removal of the hole saw from the arbor 910 by adjusting the circumference of the arbor stem 98. Specifically, the collapsed position of the arms 940 makes the arbor stem 918 smaller so that the hole saw can be more easily removed (e.g., unthreaded or slid off) from the arbor 910.

FIGS. 40-43 illustrate another arbor 1010 embodying the invention. The arbor 1010 includes an arbor shaft 1014, an arbor stem 1018 opposite the shaft 1014, and a body 1030 coupled between the arbor shaft 1014 and the arbor stem 1018. The illustrated arbor 1010 further includes an adjustment mechanism 1020 to facilitate the release of a hole saw from the arbor 1010, similar to the arbors 10, 210, 410, 610, 710, 810, 910 described above. The arbor 1010 defines a longitudinal axis H extending from a first end 1024 to a second end 1026 of the arbor 1010. The first end 1024 has the shaft 1014, and the second end 1026 has the arbor stem 1018.

Figure 40:
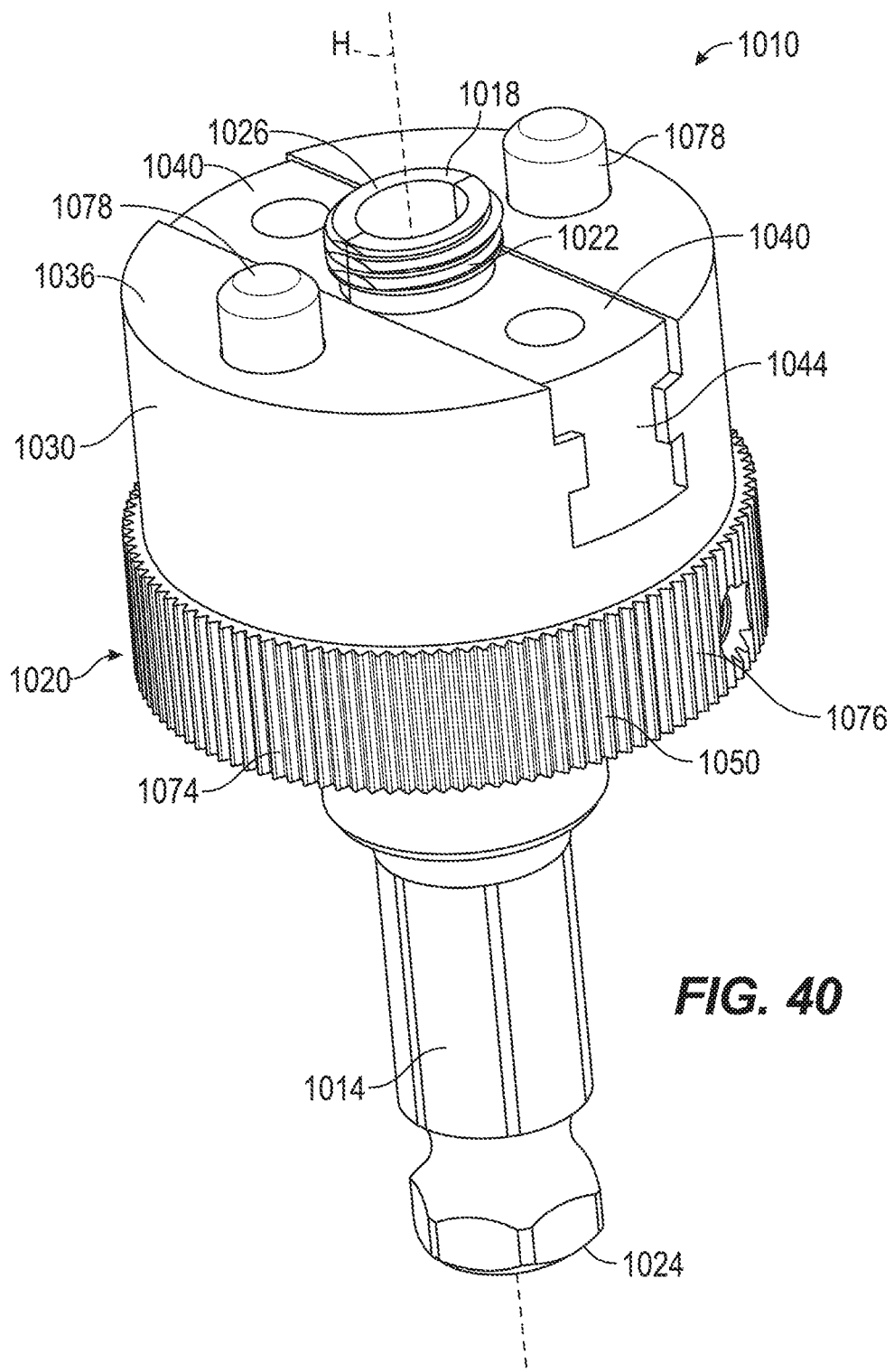
FIG. 40 is a perspective view of yet still another arbor embodying the invention.
Figure 41:
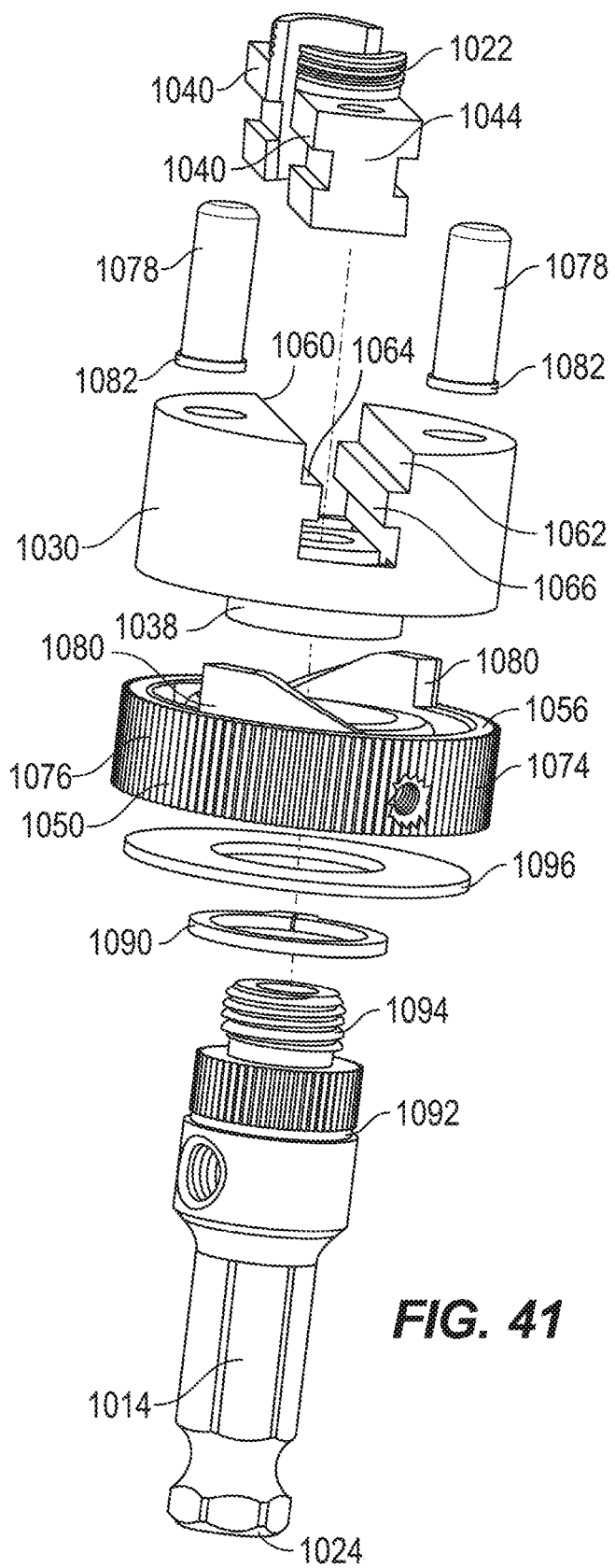
FIG. 41 is an exploded view of the arbor of FIG. 40, the arbor including a body, arms, and a collar.

With reference to FIGS. 40 and 41, the illustrated body 1030 has a generally cylindrical structure and includes a top surface 1036 positioned at the second end 1026 of the arbor 1010 adjacent the arbor stem 1018. The body 1030 extends axially from the top surface 1036 towards the first end 1024. Furthermore, drive pins 1078 are received in apertures defined by the body 1030 and extend towards the arbor stem 1018. The drive pins 1078 are movable parallel to the axis H and correspond to holes defined on the hole saw.

With reference to FIG. 41, the body 1030 includes a lower portion 1038 opposite the top surface 1036. The lower portion 1038 defines a bore having internal threads that correspond to threads 1094 on the shaft 1018. The threads of the lower portion 1038 are configured to releasably couple the body 1030 to the shaft 1014.

With continued reference to FIG. 41, the body 1030 defines a channel 1060 extending through a center of the body 1030 relative to the longitudinal axis H. The channel 1060 is formed through the top surface 1036 of the body 1030. The channel 1060 has a first side surface 1062 and a second side surface 1064 opposite the first side surface 1062. The first and second side surfaces 1062, 1064 are generally parallel and extend radially through the longitudinal axis H. Moreover, each of the first and second side surfaces 1062, 1064 includes a track 1066 extending generally orthogonally from the first and second side surfaces 1062, 1064. The channel 1060 is used with the adjustment mechanism 1020, as further discussed below.

With reference to FIGS. 40 and 41, the adjustment mechanism 1020 includes a plurality of arms 1040. The plurality of arms 1040 correspond to the channel 1060 defined by the body 1030. The illustrated arbor 1010 includes one channel 1060 and two arms 1040 receivable in the channel 1060 (FIG. 40). In other constructions, the arbor 1010 may have any number of channels 1060 and arms 1040.

Figure 43:
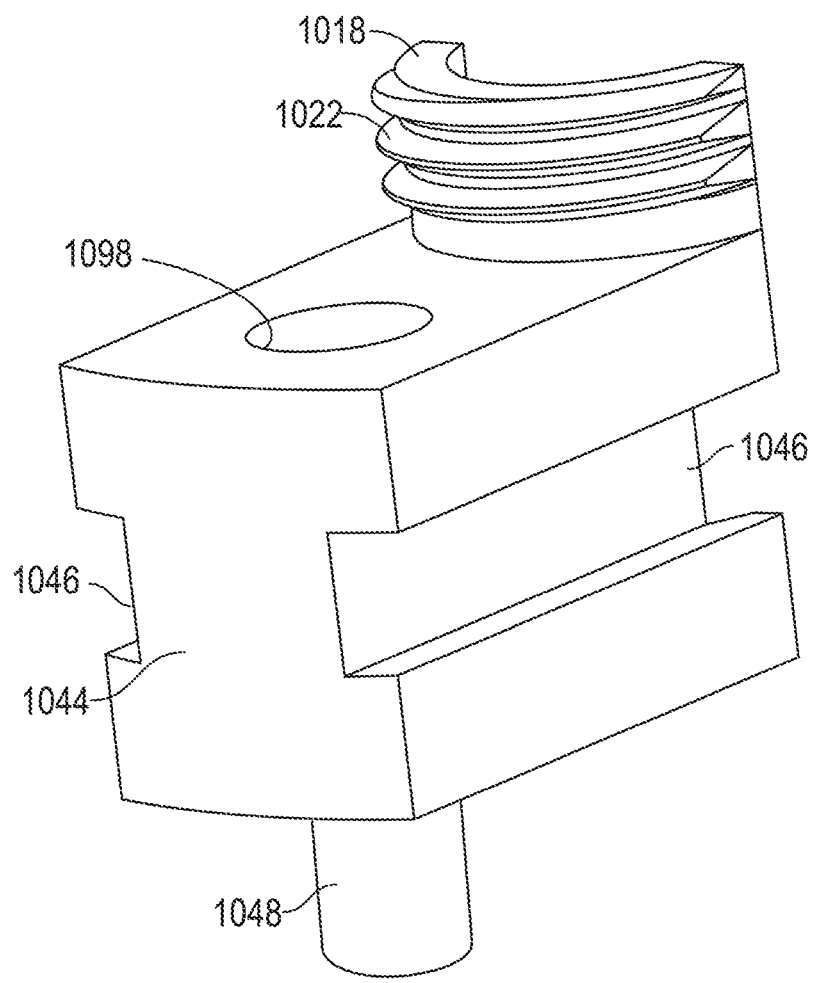
FIG. 43 is a perspective view of one of the arms of FIG. 41.

With reference to FIGS. 41 and 43, each arm 1040 includes a base portion 1044 and a threaded portion 1022. The illustrated base portion 1044 defines two recesses 1046. The recesses 1046 receive the tracks 1066 positioned on the first and second sides 1062, 1064 of each channel 1060. The threaded portion 1022 extends generally perpendicularly from the base portion 1044. Furthermore, the threaded portion 1022 of each arm 1040 forms a part the arbor stem 1018, as shown in FIG. 40. The arbor stem 1018 is receivable by the aperture of the hole saw.

With reference to FIG. 43, each arm 1040 includes a post 1048 extending from an opposite side of the base portion 1044 than the threaded portion 1022. The post 1048 extends axially toward a top surface of the collar 1050. In the illustrated embodiment, each arm 1040 includes one post 1048 having a generally cylindrical shape.

With continued reference to FIG. 43, each arm 1040 includes an aperture 1098 defined on a top surface of the arm 1040. The apertures 1098 are configured to receive magnets. The hole saw may be configured to include another magnet such that the arbor stem 1018 is magnetically coupled to the hole saw. The magnetic attraction between the arbor stem 1018 and the hole saw may facilitate the installation of the hole saw to the arbor by freeing up a hand of the user.

Figure 42:
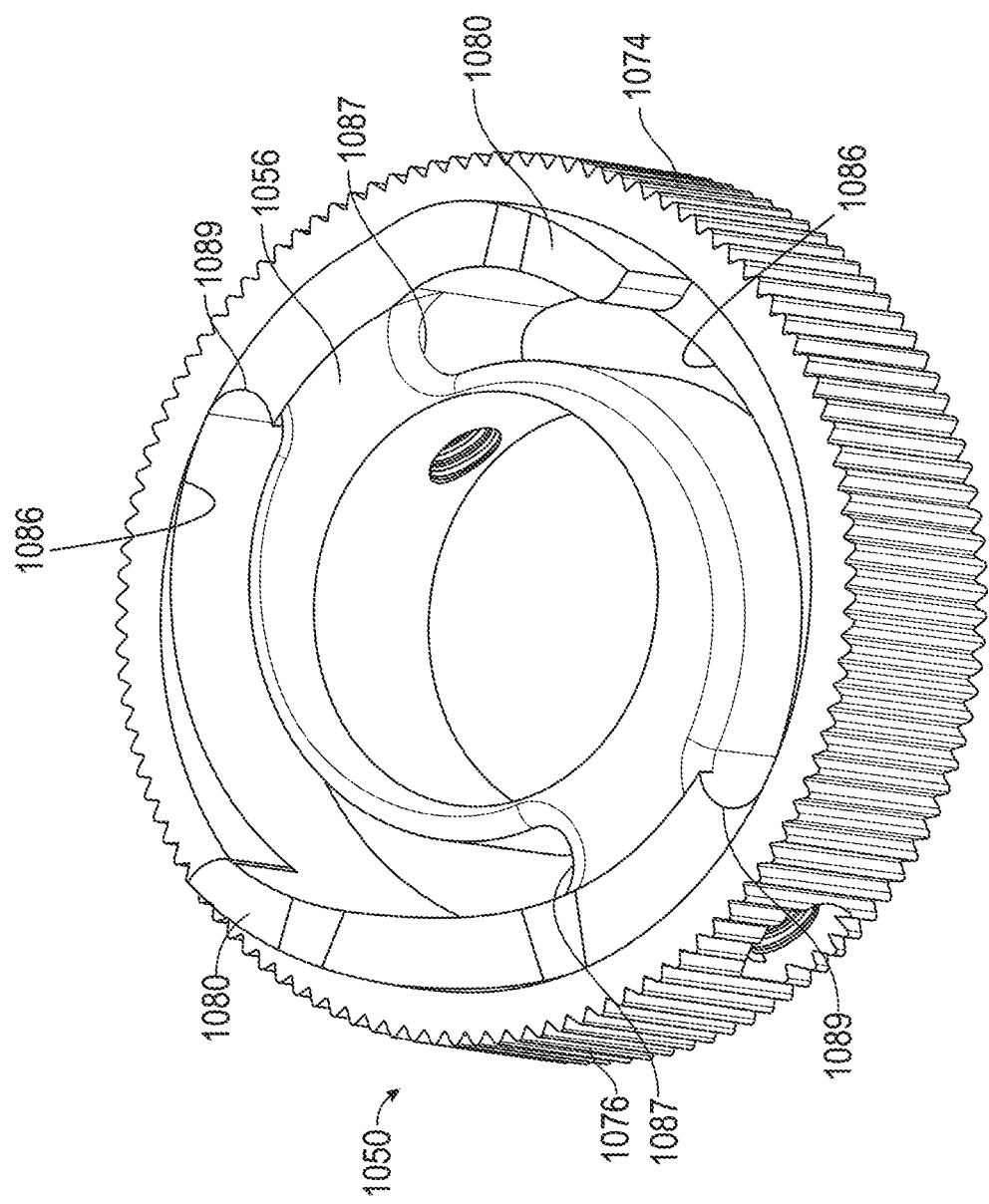
FIG. 42 is a perspective view of the collar of FIG. 41.

As illustrated in FIGS. 40-43, the arbor 1010 includes an actuator 1050 positioned adjacent the body 1030. In the illustrated embodiment, the actuator 1050 is a collar. The collar 1050 includes an annular body portion 1056 having a grip surface 1074. The illustrated grip surface 1074 has ridges 1076 positioned on the collar 1050 (FIG. 42). The collar 1050 rotates about the shaft 1014 and adjacent the body 1030 about the longitudinal axis H. In particular, the ridges 1076 are configured to provide a textured surface to be used by fingers of the user to help rotate the collar 1050. The grip surface 1074 may have other textured surfaces to aid the user in rotation of the collar 1050.

As illustrated in FIG. 42, the collar 1050 further includes two arcuate tracks 1086 defined by the body portion 1056. In the illustrated embodiment, the arcuate tracks 1086 of the collar 1050 extend radially offset about the axis H in the body portion 1056. The arcuate tracks 1086 are separate. In addition, each arcuate track 1086 includes a first end 1087 and a second end 1089.

With reference to FIGS. 42 and 43, the post 1048 of each arm 1040 is received in one of the arcuate tracks 1086. As the collar 1050 rotates, each post 1048 moves along a curved path in each arcuate track 1086 from the first end 1087 to the second end 1089. The arms 1040 move radially (e.g., outward or inward) relative to the longitudinal axis H due to the movement of each protrusion 1048 coupled to each arm 1040. Specifically, the arms 1040 move radially on the tracks 1066 formed in the channels 1060. The adjustment mechanism 1020 utilizes this movement of the arms 1040 to facilitate disengaging the hole saw from the arbor stem 1018. Specifically, the movement of the arms 1040 changes an outer circumference of the threaded segments 1022 of the arbor stem 1018 by radial displacement of the arms 1040 due to the rotation of the collar 1050 having the arcuate tracks 1086. In the illustrated embodiment, the arcuate tracks 1086 allow only about one third of a full rotation of the collar 1050.

With continued reference to FIGS. 42 and 43, the collar 1050 includes two ramps 1080 extending from a top surface of the collar 1050 toward the second end 1026 of the arbor 1010. The ramps 1080 are configured to engage the drive pins 1078 as the collar 1050 rotates. Specifically, an end 1082 of each of the drive pins 1078 moves (i.e., slides) up each ramp 1080 as the collar 1050 rotates such that the drive pins 1078 are movable in the axial direction relative to the longitudinal axis H. The movable drive pins 1078 are configured to engage holes defined on the hole saw for driving the hole saw. In some embodiments, the hole saw may have a relatively small outer diameter such that the hole saw is not driven by drive pins. In this embodiment, the collar 1050 is unable to rotate far enough for the drive pins 1078 to extend from the body 1050. Therefore, the movable drive pins 1078 remain withdrawn within the body 1030 such that the drive pins 1078 do not interfere with a hole saw not driven by drive pins.

With reference to FIG. 41, the shaft 1014 includes an annular groove 1092 defined the shaft 1014. The annular groove 1092 receives a retaining ring 1090 positioned adjacent the collar 1050. The retaining ring 1090 is configured to hold the collar 1050 adjacent the body 1030 while allowing the collar 1050 to rotate about the shaft 1014. A plate 1096 (e.g., a washer) is positioned between the retaining ring 1090 and the collar 1050 to aid in rotation.

In operation, as the collar 050 rotates in one direction, the posts 1048 of the arms 1040 follow the curved path of the arcuate tracks 1086 from the first ends 1087 to the second ends 1089. The arms 1040 move radially on the tracks 1066 in the channels 1060 and are displaced into an outward position by the radial movement of the posts 1048 received in the arcuate tracks 1086 of the collar 1050. As such, the threaded portions 1022 of the arms 1040 are spread apart.

Conversely, as the collar 1050 rotates in the other direction, the posts 1048 of the arms 1040 follow the curved path of the arcuate tracks 1086 from the second end 1089 to the first ends 1087. The arms 1040 move radially on the tracks 1066 in the channels 1060 and are displaced into a collapsed position by the radial movement of the posts 1048 received in the arcuate tracks 1086 of the collar 1050. As such, the threaded portions 1022 of the arms 1040 are moved together.

The adjustment mechanism 1020 adjusts the size (e.g., circumference) of the threaded portions 1022 of the stem 1018. The circumference of the arbor stem 1018 is generally larger when in the outward position than when in the collapsed position. The adjustment mechanism 1020 facilitates the removal of the hole saw from the arbor 1010 by adjusting the circumference of the arbor stem 1018. Specifically, the collapsed position of the arms 1040 makes the arbor stem 1018 smaller so that the hole saw can be more easily removed (e.g., unthreaded or slid off) from the arbor 1010.

Figure 21:
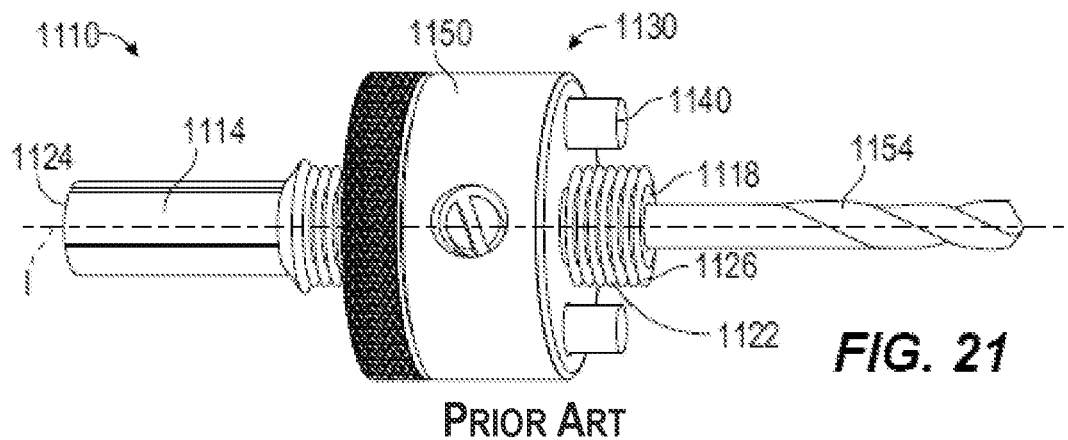
FIG. 21 is a perspective view of a conventional arbor.

FIG. 21 illustrates a conventional arbor 1110 for a hole saw. The arbor 1110 includes an arbor shaft 1114, a threaded arbor stem 1118 for coupling the hole saw to the arbor 1110, and a collar 1130 movably coupled to the arbor 1110. The arbor shaft 1114 is couplable to a power tool, such as a drill. The threaded arbor stem 1118 is couplable to the hole saw. Specifically, the threaded arbor stem 1118 includes threads 1122 that correspond to an aperture defined by the hole saw for coupling the hole saw to the arbor 1110. The arbor 1110 further includes a first end 1124 and a second end 1126 opposite the first end 1124 of the arbor 1110. The first end 1124 of the arbor 1110 has the arbor shaft 1114. The second end 1126 of the arbor 1110 has the threaded arbor stem 1118. A longitudinal axis I, defined by the arbor 1110, extends between the first end 1124 and the second end 1126 of the arbor 1110.

The illustrated arbor 1110 also includes drive pins 1140 extending from a base 1150 of the collar 1130. The drive pins 1140 are receivable in apertures defined by the hole saw. The drive pins 1140 are movable with the collar 1130 relative to the hole saw. In particular, moving the collar 1130 along the longitudinal axis I moves the drives pins 1140 axially along the longitudinal axis I into or out of the apertures in the hole saw. When received in the apertures, the drive pins 1140 inhibit rotation of the hole saw relative to the threaded arbor stem 1118. Therefore, the drive pins 1140 are configured to engage/disengage the hole saw by movement of the collar 1130.

The arbor 1110 further includes a pilot bit 1154 coupled to the arbor 1110 at the second end 1126 of the arbor 1110. The pilot bit 1154 is positioned partially within and extends axially from the threaded arbor stem 1118. The pilot bit 1154 may be permanently or removably coupled to the arbor 1110.

Thus, the invention provides, among other things, an adjustable mechanism for removably coupling a hole saw to an arbor. The adjustable mechanism may be used for arbors having a threaded arbor stem of different sizes. Various features and advantages of the invention are set forth in the following claims.

What is claimed is:

1. An arbor for a hole saw, the arbor comprising:
an arbor shaft configured to be coupled to a power tool, the arbor shaft defining a longitudinal axis;
an arbor stem supported by the arbor shaft, the arbor stem including at least one arm having a threaded portion configured to engage the hole saw;
an actuator supported by the arbor shaft,
wherein the actuator is operable to move the threaded portion of the at least one arm relative to the longitudinal axis; and
at least one pin coupled to the actuator for movement with the actuator, wherein a portion of the at least one pin is receivable within a hole of the at least one arm.

2. The arbor of claim 1, wherein the threaded portion defines a portion of a circumference of the arbor stem, and wherein a size of the circumference is adjustable by movement of the actuator.

3. The arbor of claim 1, wherein the at least one arm moves radially relative to the longitudinal axis.

4. The arbor of claim 1, wherein the actuator is movable axially along the arbor shaft toward and away from the arbor stem.

5. The arbor of claim 4, further comprising a retaining ring coupled to the arbor shaft to support the actuator on the arbor shaft.

6. The arbor of claim 1, wherein the actuator is rotatable relative to the arbor shaft about the longitudinal axis.

7. The arbor of claim 1, wherein the actuator is adjustable into a plurality of positions, wherein in a first position, the at least one arm is positioned in an expanded state such that the arbor is securely coupled to the hole saw, and wherein in a second position, the at least one arm is positioned in a collapsed state such that the arbor is releasable from the hole saw.

8. The arbor of claim 7, further comprising a biasing member coupled to the actuator to bias the actuator toward the first position.

9. The arbor of claim 8, further comprising a retaining member coupled to the arbor shaft and housing the biasing member, wherein a first end of the biasing member is coupled to a bottom of the retaining member and a second end of the spring is coupled to the actuator.

10. The arbor of claim 1, wherein the arbor stem includes a plurality of arms.

11. The arbor of claim 10, wherein the arbor stem includes four arms.

12. The arbor of claim 1, wherein the actuator is movable relative to the arbor shaft between a first position, in which the at least one pin is received in a corresponding hole of the at least one arm to maintain the threaded portion of the at least one arm away from the longitudinal axis to engage the hole saw, and a second position, in which the at least one pin is moved at least partially out of the corresponding hole of the at least one arm such that the threaded portion of the at least one arm moves toward the longitudinal axis to release the hole saw.

13. The arbor of claim 1, further comprising a biasing member coupled to the at least one arm to bias the threaded portion toward the longitudinal axis.

14. The arbor of claim 13, wherein the biasing member includes a retaining ring surrounding the at least one arm.

15. The arbor of claim 1, further comprising a cover supported by the arbor shaft to partially enclose the at least one arm, wherein the threaded portion of the at least one arm extends through the cover.

16. A method of operating an arbor for a hole saw, the arbor including an arbor shaft configured to be coupled to a power tool, the arbor shaft defining a longitudinal axis, an arbor stem supported by the arbor shaft, the arbor stem including at least one arm having a threaded portion configured to engage the hole saw, and an actuator supported by the arbor shaft, the method comprising:
threading the hole saw onto the threaded portion of the at least one arm;
actuating the actuator; and
moving the threaded portion of the at least one arm relative to the longitudinal axis in response to actuating the actuator to release the hole saw from the threaded portion of the at least one arm,
wherein actuating the actuator includes moving the actuator axially along the arbor shaft away from the arbor stem.

17. The method of claim 16, wherein the arbor further includes a biasing member coupled to the at least one arm, and wherein moving the threaded portion of the at least one arm includes biasing the threaded portion of the at least one arm toward the longitudinal axis with the biasing member.

18. An arbor for a hole saw, the arbor comprising:
an arbor shaft configured to be coupled to a power tool, the arbor shaft defining a longitudinal axis;
an arbor stem supported by the arbor shaft, the arbor stem including a plurality of arms, each arm having
a threaded portion configured to engage the hole saw,
a base portion extending from the threaded portion, and
a hole defined by the base portion;
a collar supported by and slidable along the arbor shaft;
a plurality of pins extending from the collar toward the base portions of the plurality of arms, a portion of each pin receivable within the hole of a respective arm; and
a biasing member coupled to the plurality of arms,
wherein the collar is movable relative to the arbor shaft between a first position, in which the plurality of pins is received in the holes of the plurality of arms to maintain the threaded portions of the plurality of arms away from the longitudinal axis to engage the hole saw, and a second position, in which the plurality of pins are moved at least partially out of the holes of the plurality of arms such that the biasing member moves the threaded portions of the plurality of arms toward the longitudinal axis to release the hole saw.

19. An arbor for a hole saw, the arbor comprising:
an arbor shaft configured to be coupled to a power tool, the arbor shaft defining a longitudinal axis;
an arbor stem supported by the arbor shaft, the arbor stem including at least one arm having a threaded portion configured to engage the hole saw; and
an actuator supported by the arbor shaft,
wherein the actuator is operable to move the threaded portion of the at least one arm toward and away from the longitudinal axis, and
wherein the actuator is movable axially along the arbor shaft toward and away from the arbor stem.

20. An arbor for a hole saw, the arbor comprising:
an arbor shaft configured to be coupled to a power tool, the arbor shaft defining a longitudinal axis;

an arbor stem supported by the arbor shaft, the arbor stem including at least one arm having a threaded portion configured to engage the hole saw; and an actuator supported by the arbor shaft, wherein the actuator is operable to move the threaded portion of the at least one arm relative to the longitudinal axis, and wherein the actuator is rotatable relative to the arbor shaft about the longitudinal axis.

21. An arbor for a hole saw, the arbor comprising:

an arbor shaft configured to be coupled to a power tool, the arbor shaft defining a longitudinal axis;

an arbor stem supported by the arbor shaft, the arbor stem including at least one arm having a threaded portion configured to engage the hole saw;

a biasing member coupled to the at least one arm to bias the threaded portion toward the longitudinal axis; and an actuator supported by the arbor shaft, wherein the actuator is operable to move the threaded portion of the at least one arm relative to the longitudinal axis.

22. An arbor for a hole saw, the arbor comprising:

an arbor shaft configured to be coupled to a power tool, the arbor shaft defining a longitudinal axis;

an arbor stem supported by the arbor shaft, the arbor stem including at least one arm having a threaded portion configured to engage the hole saw;

an actuator supported by the arbor shaft, wherein the actuator is operable to move the threaded portion of the at least one arm relative to the longitudinal axis; and a cover supported by the arbor shaft to partially enclose the at least one arm, wherein the threaded portion of the at least one arm extends through the cover.

23. A method of operating an arbor for a hole saw, the arbor including an arbor shaft configured to be coupled to a power tool, the arbor shaft defining a longitudinal axis, an arbor stem supported by the arbor shaft, the arbor stem including at least one arm having a threaded portion configured to engage the hole saw, and an actuator supported by the arbor shaft, the method comprising:

threading the hole saw onto the threaded portion of the at least one arm;

actuating the actuator; and moving the threaded portion of the at least one arm relative to the longitudinal axis in response to actuating the actuator to release the hole saw from the threaded portion of the at least one arm, wherein the arbor further includes a biasing member coupled to the at least one arm, and wherein moving the threaded portion of the at least one arm includes biasing the threaded portion of the at least one arm toward the longitudinal axis with the biasing member.

* * * * *